(12) United States Patent
Brent, Jr. et al.

(10) Patent No.: US 11,590,694 B2
(45) Date of Patent: Feb. 28, 2023

(54) METHODS OF MAKING A DEFLECTION MEMBER

(71) Applicant: The Procter & Gamble Company, Cincinnati, OH (US)

(72) Inventors: John L. Brent, Jr., Springboro, OH (US); Steven D. Smith, Fairfield, OH (US); Jacob R. Adams, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 249 days.

(21) Appl. No.: 16/887,229

(22) Filed: May 29, 2020

(65) Prior Publication Data

US 2020/0378067 A1 Dec. 3, 2020

Related U.S. Application Data

(60) Provisional application No. 62/855,237, filed on May 31, 2019.

(51) Int. Cl.
| | |
|---|---|
| *B29C 64/124* | (2017.01) |
| *B33Y 10/00* | (2015.01) |
| *B33Y 80/00* | (2015.01) |
| *B29C 64/321* | (2017.01) |
| *B29C 64/277* | (2017.01) |

(Continued)

(52) U.S. Cl.
CPC .......... *B29C 64/124* (2017.08); *B29C 64/129* (2017.08); *B29C 64/277* (2017.08); *B29C 64/321* (2017.08); *B33Y 10/00* (2014.12); *B33Y 70/10* (2020.01); *B33Y 80/00* (2014.12); *D21F 1/009* (2013.01); *B29K 2105/0002* (2013.01); *B29K 2105/0845* (2013.01);

(Continued)

(58) Field of Classification Search
CPC .............................. D21F 1/009; D21F 11/006; B29K 2105/0002
See application file for complete search history.

(56) References Cited

U.S. PATENT DOCUMENTS

| | | |
|---|---|---|
| 4,528,239 A | 7/1985 | Trokhan |
| 2017/0210077 A1 | 7/2017 | Ermoshkin et al. |

(Continued)

FOREIGN PATENT DOCUMENTS

WO 2016179078 A1 11/2016

OTHER PUBLICATIONS

International Search Report and Written Opinion; Application Ser. No. PCT/US2020/070087; dated Oct. 19, 2020, 12 pages.

(Continued)

*Primary Examiner* — Yung-Sheng M Tsui
*Assistant Examiner* — Melody Tsui
(74) *Attorney, Agent, or Firm* — Richard L. Alexander; Andrew J. Mueller

(57) ABSTRACT

A method for manufacturing a deflection member is disclosed. The method may include the step of incorporating a monomer, a photoinitiator system, a photoinhibitor, and/or a reinforcing member. A further step includes blending the monomer, photoinitiator, and/or photoinhibitor to form a blended photopolymer resin. Further steps may be emitting a first wavelength and emitting a second wavelength. A further step may be polymerizing the monomer to form a resinous framework comprising protuberance locked-on to the reinforcing member.

28 Claims, 22 Drawing Sheets

(51) Int. Cl.
*B29C 64/129* (2017.01)
*B33Y 70/10* (2020.01)
*D21F 1/00* (2006.01)
*B33Y 30/00* (2015.01)
*B29K 105/08* (2006.01)
*B29L 31/48* (2006.01)
*B29L 31/00* (2006.01)
*B29K 105/00* (2006.01)
*D21F 11/00* (2006.01)

(52) U.S. Cl.
CPC .............. *B29L 2031/4878* (2013.01); *B29L 2031/7406* (2013.01); *B33Y 30/00* (2014.12); *D21F 11/006* (2013.01)

(56) References Cited

U.S. PATENT DOCUMENTS

| | | |
|---|---|---|
| 2018/0119350 A1* | 5/2018 | Brent, Jr. ............... B33Y 40/00 |
| 2018/0119354 A1 | 5/2018 | Brent, Jr. et al. |
| 2018/0333913 A1 | 11/2018 | Lin et al. |
| 2019/0134888 A1 | 5/2019 | Desimone et al. |
| 2020/0188187 A1* | 6/2020 | Blomström ............. B29C 64/30 |
| 2020/0376748 A1 | 12/2020 | Brent, Jr. |

OTHER PUBLICATIONS

15559 PCT Search Report and Written Opinion for PCT/US2020/070086 dated Oct. 19, 2020, 12 pages.
All Office Actions; U.S. Appl. No. 16/887,216, filed May 29, 2020.
All Office Actions; U.S. Appl. No. 18/050,480, filed Oct. 28, 2022.
U.S. Unpublished U.S. Appl. No. 18/050,480, filed Oct. 28, 2022 to John Leslie Brent.

* cited by examiner

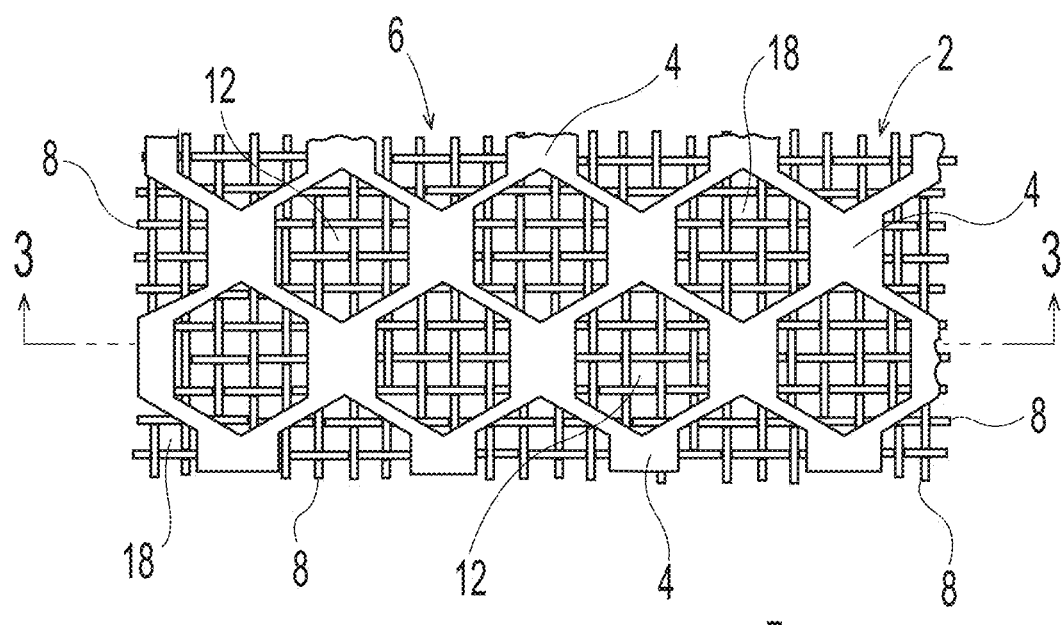
FIG. 2
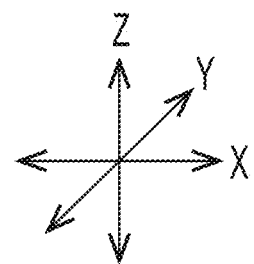

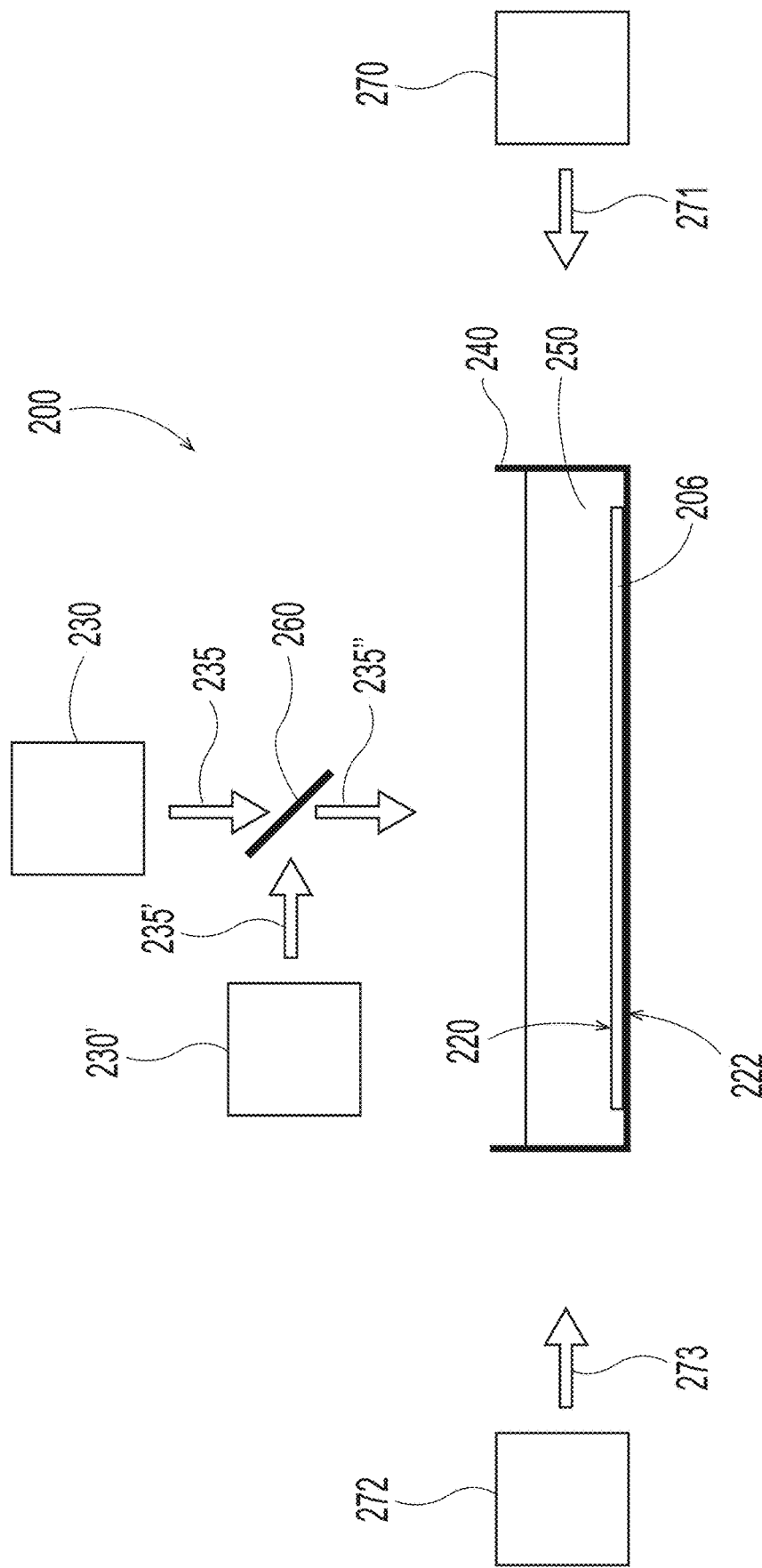

METHODS OF MAKING A DEFLECTION MEMBER

CROSS REFERENCE TO RELATED APPLICATION

This application claims the benefit of U.S. Provisional Application No. 62/855,237, filed May 31, 2019, the entire substance of which is incorporated herein by reference.

FIELD OF THE DISCLOSURE

The present disclosure is related to deflection members utilized for making soft, strong, textured and/or structured fibrous webs, such as, for example, paper products (e.g., toilet tissue and paper towels) and non-wovens (e.g., diaper top sheets). More particularly, this disclosure is directed towards methods to manufacture the deflection members used to produce such fibrous webs.

BACKGROUND OF THE INVENTION

Products made from textured and/or structured fibrous webs are used for a variety of purposes. For example, paper towels; facial tissues; toilet tissues; napkins; diaper, adult incontinence product and feminine care product topsheets and outer covers; and the like are in constant use in modern industrialized societies. The large demand for such paper and nonwoven products has created a further demand for improved versions. If such products are to perform their intended tasks and find wide acceptance, the improved versions must possess certain physical characteristics that are provided in part by new and improved fabrics/structured belts utilized in the particular papermaking process (e.g., conventional dry crepe, through air drying—i.e., "TAD", and hybrid technologies such as Metso's NTT, Georgia Pacific's ETAD, or Voith's ATMOS process) or in the particular non-woven making process (e.g., vacuum assisted spunbond fiber laydown).

As a nonlimiting example, traditional papermaking belts utilized in TAD papermaking processes have been described in commonly assigned U.S. Pat. No. 4,528,239, issued Jul. 9, 1985 to Trokhan. Trokhan teaches a belt in which a resinous framework is joined to a fluid-permeable reinforcing member such as a woven structure, or a felt. The resinous framework may be continuous, semi-continuous, comprise a plurality of discrete protuberances, or any combination thereof. The resinous framework extends outwardly from the reinforcing member to form a web-side of the belt (i.e., the surface upon which the web is disposed during a papermaking process), a backside opposite to the web-side, and deflection conduits extending there between. The deflection conduits provide spaces into which papermaking fibers deflect under application of a pressure differential during a papermaking process. Because of this quality, such papermaking belts are also known in the art as "deflection members." Such traditional deflection members may also be utilized in nonwoven making processes, where an applied pressure differential draws fibers into the deflection conduits.

The traditional deflection members taught by Trokhan are conventionally made in a process as described in commonly assigned U.S. Pat. No. 4,514,345 issued to Johnson et al. Johnson et al. teach placing a foraminous woven reinforcing member, such as a screen of woven polyester filaments, on a backing film and then supplying a single layer of liquid photosensitive resin over reinforcing member. A patterned mask is then placed over the photosensitive resin and portions of the resin are exposed through the mask to light of an activating wavelength to cure the resin in a pattern. The backing film is removed, and the uncured resin (hidden from light by the mask) is washed away from the composite leaving a deflection member.

Many improvements to the deflection members of Trokhan and the process of Johnson et al. have been made over the years, including various patterns imparted to the resinous framework (e.g., commonly assigned U.S. Pat. No. 10,132,042 to Maladen et al.) and various new iterations to the method of manufacture (e.g., commonly assigned U.S. Pat. No. 6,660,129 to Cabell et al.) Another relatively recent deflection member improvement is disclosed in commonly assigned U.S. patent application Ser. No. 15/132,291, filed Apr. 19, 2016 in the name of Manifold et al., teaching deflection members made via additive manufacturing, such as 3-D printing, to be utilized in making fibrous structures with increased surface area. Manifold et al. teach a unitary approach to manufacturing the deflection member's resinous framework and reinforcing member (i.e., the deflection member does not constitute a unit comprised of previously separate components joined together).

Although Manifold et al.'s deflection member manufacturing improvement allows for new and improved resinous framework patterns, there are concerns with deflection member durability because of the lack of a separate reinforcing member (e.g., a screen formed of strong polyester woven filaments) that largely contributes to the traditional deflection member's strength and longevity. Papermaking processes can require a deflection member to endure extreme temperatures, tensions, and pressures in a cyclic process. Nonwoven making processes can also require exposure to elevated temperatures, tensions and pressures in a cyclic process. Further, as papermaking and nonwoven processes continually increase speed to maximize machine output, such elevated/extreme temperatures, tensions and pressures also continually increase.

Accordingly, there is a continuing need for deflection members that can have any three-dimensional topography afforded by additive manufacturing on which fibrous webs can be formed, which also include a traditional separate reinforcing member to endure the evolving processing environment of a fibrous web making machine.

Additionally, there is a continuing need for methods for making deflection members that can have any three-dimensional topography afforded by additive manufacturing on which fibrous webs can be formed, which also include employing a traditional separate reinforcing member to endure the evolving processing environment of a fibrous web making machine.

Beyond the needs expressed above, it may be desirable for the deflection members of the present disclosure, and particularly the plurality of protuberances extending from the reinforcing member, to have complex shapes that may require emission of multiple wavelengths of radiation and the exposure of such to a photopolymer resin to form such complex shapes. When fibers are formed over such complex shapes of the protuberances and in-between such complex shapes, desirable properties may be formed into the resulting fibrous webs.

SUMMARY OF THE INVENTION

In an aspect of the disclosure, a method for manufacturing a deflection member comprises the steps of: a) incorporating a monomer; b) incorporating a photoinitiator system; c)

incorporating a photoinhibitor; d) incorporating a reinforcing member; e) combining the monomer, photoinitiator system, and photoinhibitor to form a photopolymer resin; f) exposing the photopolymer resin to a first wavelength; g) exposing the photopolymer resin to a second wavelength; and h) polymerizing the monomer to form a protuberance extending from the reinforcing member.

BRIEF DESCRIPTION OF DRAWINGS

FIG. 2 is a representative deflection member;
FIG. 8B is a schematic representation of system set up to employ in the additive methods as detailed herein.

DETAILED DESCRIPTION OF THE INVENTION

Figure 1:
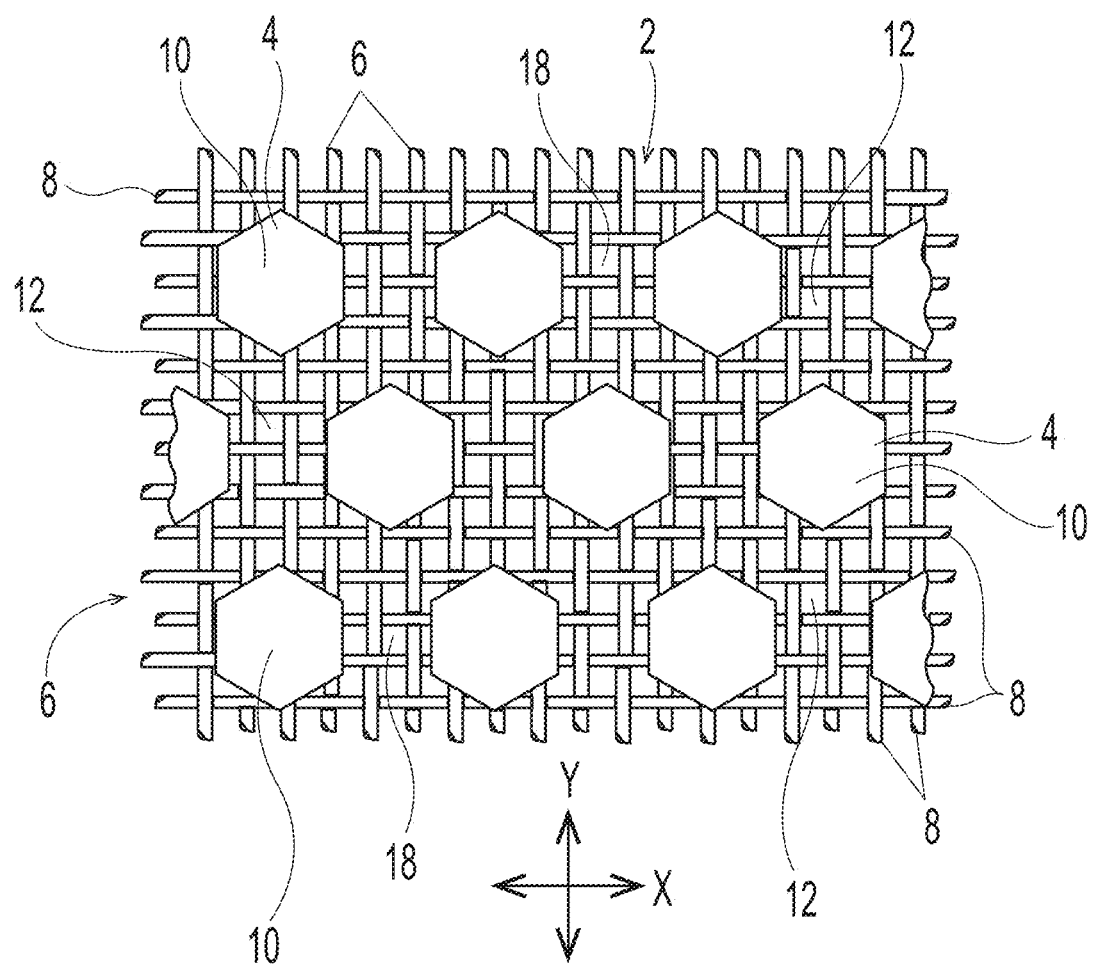
FIG. 1 is a representative deflection member.

Various non-limiting examples of the present disclosure will now be described to provide an overall understanding of the principles of the deflection members, and methods of manufacturing such deflection members, disclosed herein. One or more non-limiting examples are illustrated in the accompanying drawings. Those of ordinary skill in the art will understand that the deflection members, and methods of manufacturing such deflection members, described herein and illustrated in the accompanying drawings are non-limiting examples. The features illustrated or described in connection with one non-limiting example can be combined with the features of other non-limiting examples. Such modifications and variations are intended to be included within the scope of the present disclosure.

The present disclosure is directed to processes of using three dimensional printing technology to produce deflection members with a non-unitary reinforcing member that are intended for use in fibrous structure production (e.g., paper products and nonwovens). The process involves using computer control (which may be programmed to move reinforcing member(s) and/or radiation source(s) between or along predefined coordinates) to print a framework of polymers of specific material properties onto, into and/or around a separately manufactured reinforcing member in an additive manner to create durable deflection members with a long lifespan and unique structural and topographical profiles. The terms "three dimensional printing technology", "three dimensional printing system," "three dimensional printer," "3-D printing", "printing," "additive manufacturing", "additive manufacturing apparatus", "AM" and the like all generally describe various solid freeform fabrication techniques for using a build material or a print material to make three dimensional (3-D) objects by stereolithography (SLA), continuous liquid interface production (CLIP), selective deposition, jetting, fused deposition modeling (FDM, as marketed by Stratasys Corp., Eden Prairie, Minn.), also known as fused filament fabrication (FFF), bonded deposition modeling, selective laser melting (SLM), direct metal laser sintering (DMLS), selective laser sintering (SLS), laminated object manufacturing (LOM), and other techniques now known in the art, or that may be known in the future. Stereolithography may include the use of lasers, DLP projectors, DMD digital micro-mirror devices, SLM spatial light modulators, laser LED and DLP systems (as described in U.S. Pat. No. 10,409,148 by O. Shkurikhin et al.) and/or combinations thereof. Digital masks may be used to control the distribution and localized control of radiation exposure either as from a source such as a display (e.g., LCD, LED) or displays that regulate the passage of curing radiation from a source. The computers may be programmed to move radiation source(s) and/or reinforcing member(s) (or components housing or holding the reinforcing member(s)) to move between or along predefined coordinates to form protuberance(s)/resinous framework.

Additive manufacturing is widely used in both research and industry, such as, for example, the automotive and aviation industries, for creating components that require a high level of precision. Traditional additive manufacturing processes involve the use of CAD (Computer Aided Design) software to generate a virtual 3-D model, which is then transferred to process preparation software where the model is virtually disassembled into individual slices or layers. The model is then sent to an additive manufacturing apparatus, where the actual object in printed layer by layer. As previously detailed in the Background, current methods for additively manufacturing deflection members are unitary in nature (i.e., the deflection member does not constitute a unit comprised of previously separate components joined together) and/or don't include methods of manufacture that provide for a strong bond (i.e., "lock-on") between the resinous framework and the reinforcing member. Accordingly, currently available additively manufactured deflection members do not have the strength or longevity to be economically utilized in current papermaking or nonwoven production processes.

Deflection Member

Figure 2A:
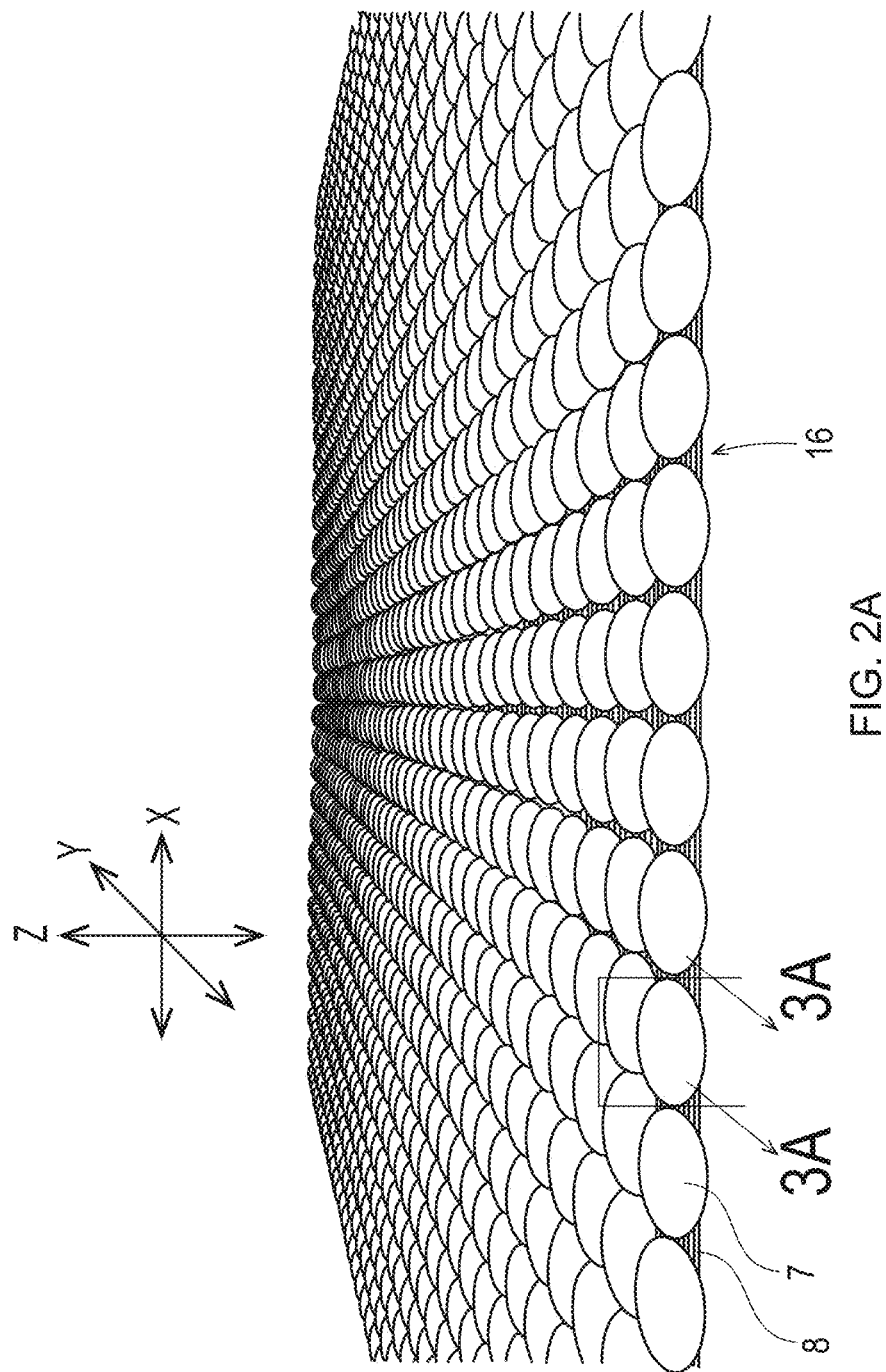
FIG. 2A is a representative deflection member.
Figure 3:
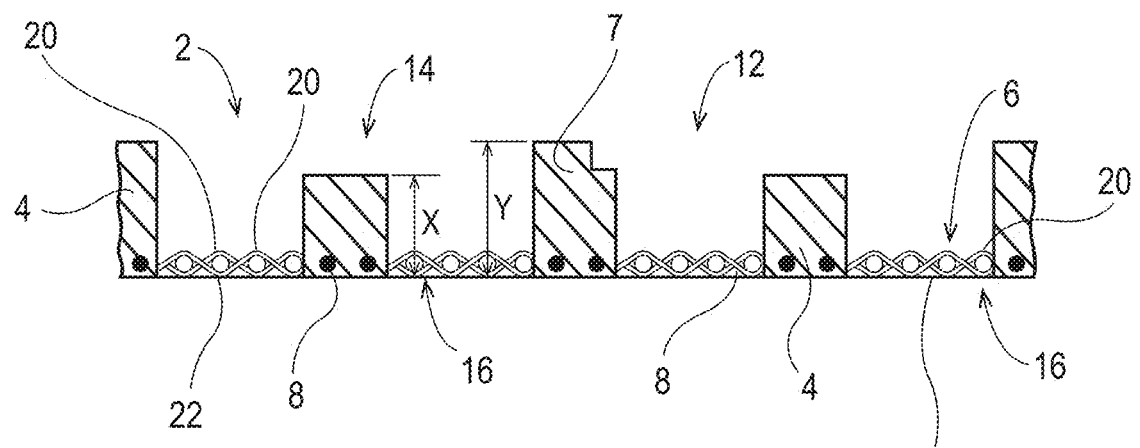
FIG. 3 is a cross-sectional view of the representative deflection member shown in FIG. 2, taken along line 3-3 of FIG. 2.

An example of a traditional deflection member of the general type useful in the present disclosure, but made according to the disclosure of U.S. Pat. No. 4,514,345, is shown in FIGS. 1-3. As illustrated, a deflection member 2 includes a resinous framework 4 attached to a permeable reinforcing member 6. Deflection members 2 may comprise elevated portions (e.g., protuberance 7) that are built from the reinforcing member 6. The elevated portions may be separated in the machine direction (MD) and/or the cross direction (CD), which is advantageous for creating knuckles and pillows in a fibrous sheet formed therefrom—the knuckles formed against the protuberances and the pillows formed between the protuberances. As shown in FIG. 3, protuberances 7 making up the resinous framework 4 may be at different elevations or heights, such that a first portion of the protuberances 7 may be at a first elevation or height "X" and a second portion of the protuberances 7 may be at a second elevation or height "Y," such that "X" is less than "Y," and more particularly, that the first portion of protuberances extend from a surface such as a reinforcing member less than the second portion of protuberances. Resinous framework 4 may comprise cross-linkable polymers or alternatively composite materials that include cross-linkable polymers and filler materials. For example, in some forms detailed herein, the resinous framework 4 includes cross-linkable polymers selected from light activated polymers (e.g., UV light activated, e-beam activated, etc.), heat activated polymers, multipart polymers, moisture activated polymers, chemically activated polymers, and combinations thereof. In some deflection members, the utilized resinous framework may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In other deflection members, the utilized resinous framework may include any of the cross-linkable polymers as described in U.S. Pat. No. 7,445,831 issued Nov. 4, 2008 in the name of Ashraf et al. Other suitable cross-linkable and filler materials known in the art may also be used as resinous framework.

The pattern of resinous framework 4 can be structured in any decorative pattern known in the art of papermaking belts (micro patterns, i.e., the structure of an individual protuberance 7 within the resinous framework and/or macro patterns, i.e., a pattern including multiple protuberances 7, or the overall deflection member belt pattern including many protuberances 7). In particular, patterns that are not able to be manufactured in traditional deflection member production processes, such as taught by Johnson et al., are of the most interest. For example, the resinous framework patterns taught by Manifold et al. in U.S. patent application Ser. No. 15/132,291 are of high interest.

Reinforcing Member

Reinforcing member 6 can be made of woven filaments 8 as are known and are common in the art of papermaking belts. In such non-limiting forms, woven filaments can be made of natural fibers, cotton fibers, coated fibers, genetically engineered fibers, synthetic fibers, metallic fibers, carbon fibers, silicon carbide fibers, fiberglass, mineral fibers, and/or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamides (aramids) such as Twaron®, Kevlar® and Nomex®; polytetrafluoroethylene such as Teflon® commercially available from DuPont®; polyethylene (PE), including with extremely long chains/HMPE (e.g. Dyneema or Spectra); polyphenylene sulfide ("PPS"); and/or elastomers. In one non-limiting form, the woven filaments of the reinforcing member are filaments as disclosed in U.S. Pat. No. 9,453,303 issued Sep. 27, 2016 in the name of Aberg et al.

The woven filaments may be translucent, partially translucent, or opaque to assist and/or deter curing of the resinous framework. The reinforcing member may include woven filaments that exhibit a diameter of about 0.20 mm to about 1.2 mm, or about 0.20 mm to about 0.55 mm, or about 0.35 mm to about 0.45 mm. The reinforcing member may be manufactured by traditional weaving processes, or may be manufactured through other processes such as additive manufacturing, e.g., 3-D printing—but in such embodiments, the reinforcing member is not made in a unitary manner with the resinous framework.

The reinforcing member may also be made of any other permeable material known in the art. The term "permeable" may be used to refer generally to a material or structure that allows a liquid state cross-linkable polymer being utilized to build the resinous framework of the deflection member to pass at least partially through or be at least partially absorbed. Such permeable materials can be a porous material such as textiles, fabrics, knits, woven materials, mesh, polymers, rubbers, foams, etc. The porous materials can be in the form of a flexible cloth, a sheet, a layer and other structures.

Whether formed or woven filaments, reinforcing members may be of an endless or seamless design. Optionally, the reinforcing member may be cut or from stock of finite or infinite length. Once made, the deflection member may need to be seamed, sewn, fastened or fixed as is common in the art of papermaking or non-woven manufacture.

Whether formed of woven filaments and/or other permeable materials, reinforcing member 6 may include voids (i.e., spaces naturally occurring in a woven product between filaments) and/or foramina (i.e., perforations formed in a previously non-perforated reinforcing member). Reinforcing member 6 may also be formed from impermeable or semi-impermeable materials known in the art, such as various plastics, metals, metal impregnated plastics, etc., that include voids and/or foramina. Whether permeable, impermeable, or semi-impermeable, the reinforcing member may be translucent, partially translucent, or opaque to assist and/or deter curing of the resinous framework.

The particular deflection member structure shown in FIG. 1 includes discrete cured resin elements 10 and a continuous deflection conduit 12 (i.e., the space between the cured resin elements that allows a pressure differential to flow through voids 18 in woven reinforcing member 6). The particular deflection member structure shown in FIG. 2 includes a resinous framework 4 that is structured in a continuous pattern with discrete deflection conduits 12 (i.e., the space surrounded by the continuous cured resin element that allows a pressure differential to flow through voids 18 in woven reinforcing member 6). In non-illustrated embodiments, the resinous framework can also be structured to be a semi-continuous pattern on reinforcing member 6. The illustrated patterns include a resinous framework that includes either discrete cured resin elements or deflection conduits in a hexagon shape when viewed from above or below. The deflection members created by the additive manufacturing processes detailed herein may have an identical or similar resinous framework structure. However, the deflection members created by the additive manufacturing processes detailed herein may have a resinous framework that may have any shape or structure known in the art of papermaking and nonwoven making belts.

Figure 4:
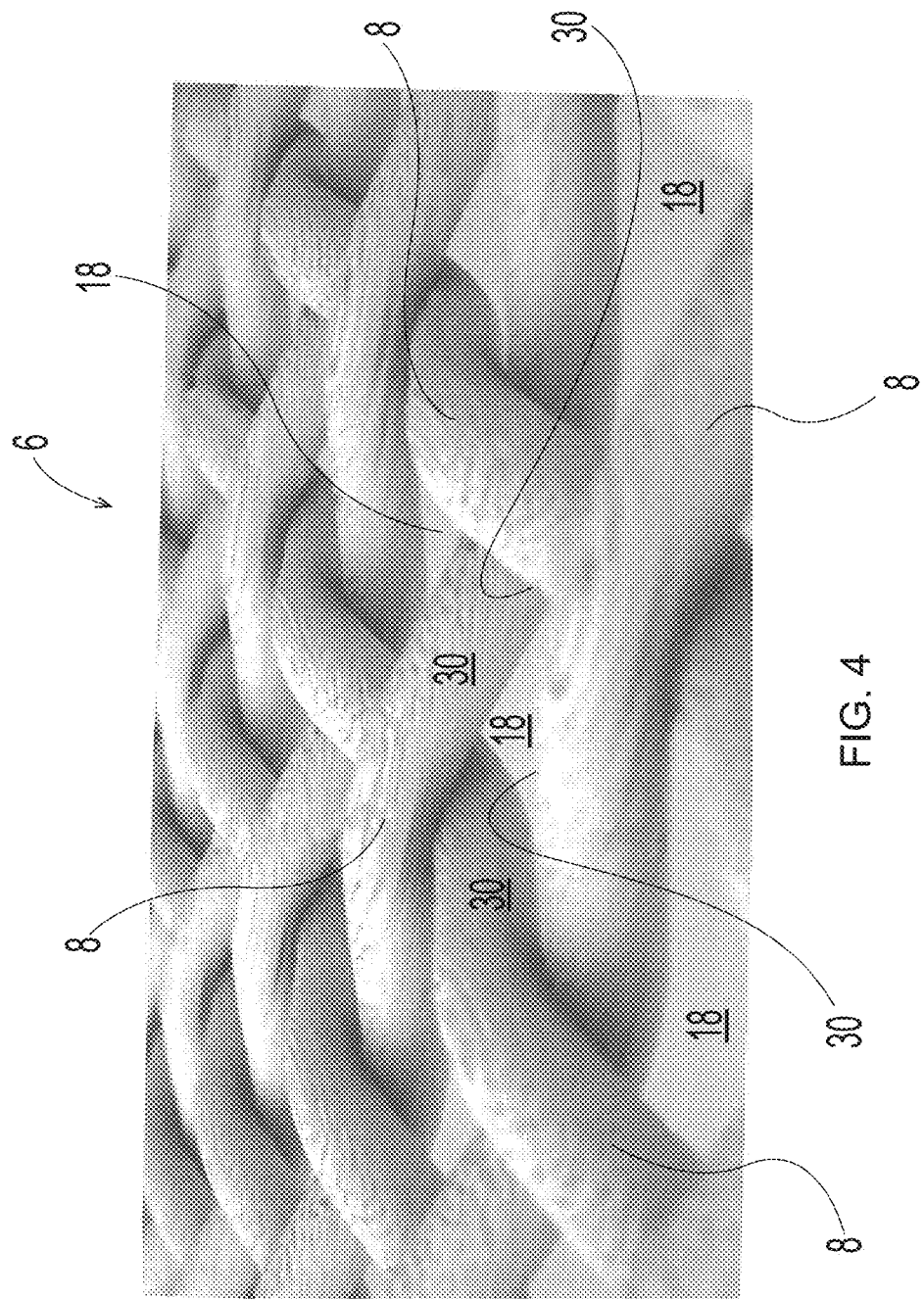
FIG. 4 is a close up view of the filaments in a representative woven reinforcing member.

FIG. 4 illustrates a close up of a nonlimiting embodiment of a woven reinforcing member 6. Filaments 8 are woven together to form voids 18 between the filaments. As can be observed, each void 18 is framed by four surrounding filaments 8. Accordingly, in the non-limiting illustrated embodiment, each void has four side surfaces 30, with each side surface being formed by the portion of the filament that faces inward towards the void. In other non-illustrated embodiments, the woven filaments may be woven in a different pattern, and thus, voids 18 may have more than four side surfaces, or as few as three or substantially two side surfaces.

In other non-illustrated embodiments, the reinforcing member can be a material that is not a woven reinforcing member (e.g., a permeable or non-permeable material as detailed above). Such material may be a sheet or film and may be translucent, partially translucent, or opaque to assist and/or deter curing of the resinous framework. Such reinforcing member may include foramina. The foramina will function like the voids in a woven reinforcing member by also allowing a pressure differential to flow through the deflection conduits during the papermaking and/or nonwoven making processes. The voids/foramina provide an open area in the reinforcing member sufficient to allow water and/or air to pass through during papermaking and nonwoven making processes, but nevertheless preventing fibers from being drawn through. As fibers are molded into the deflection member during production of fibrous substrates, the reinforcing member serves as a "backstop" to prevent or minimize fiber loss through the deflection member.

Figure 5:
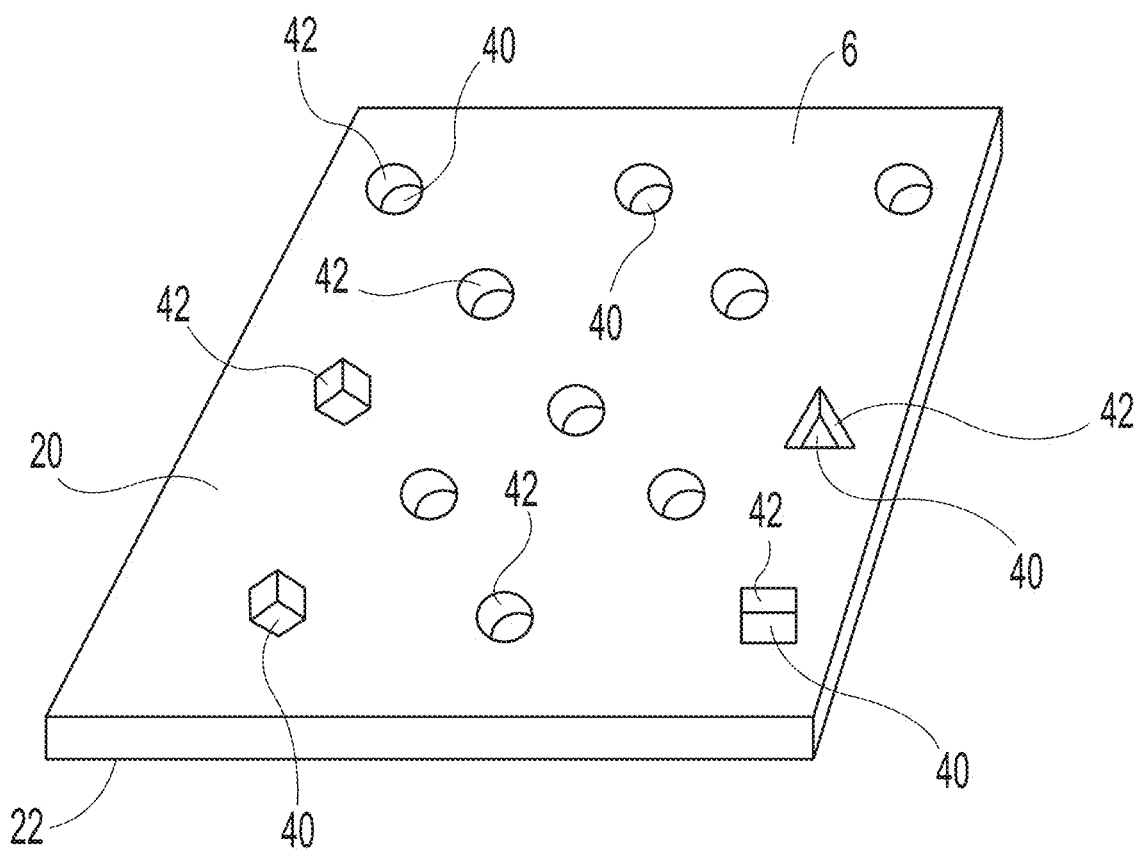
FIG. 5 is a schematic representation of a reinforcing member.

FIG. 5 illustrates a close up of a nonlimiting embodiment of a reinforcing member 6 that is not a woven reinforcing member and includes foramina 40. Foramina 40 may be included in reinforcing member 6 in any number and/or size and/or regular or irregular shape (e.g., circles, ovals, triangles, squares, hexagons, octagons, etc.) and/or pattern. Foramina 40 each include at least one sidewall surface 42. The side wall surface(s) 42 is/are the surface(s) that extend between the substantially planar upper surface 20 and the substantially planar lower surface 22 of reinforcing member 6. For example, in foramina 40 that are of a circular or oval shape when viewed from above, there is a single continuous sidewall surface 42. In foramina that are square in shape when viewed from above, there are four sidewall surfaces 42.

FIG. 3 is a cross-sectional view of FIG. 2 taken along line 3-3. As illustrated, overall deflection member 2, as well as resinous framework 4, have a substantially planar upper surface 14 and a substantially planar lower surface 16. In some embodiments, the deflection member and the resinous framework may have an upper surface and a lower surface that are not substantially planar. In such embodiments, the upper surface is considered to be an X-Y plane, wherein X and Y can correspond generally to the cross-direction (CD) and the machine direction (MD) respectively, that intersects the portion of the resinous framework that is the furthest distance above the reinforcing member in the Z direction. In the same embodiment, the lower surface is considered to be an X-Y plane that intersects the portion of the resinous framework that is the furthest distance below the reinforcing member in the Z direction.

One skilled in the art will appreciate that the symbols "X," "Y," and "Z" designate a system of Cartesian coordinates, wherein mutually perpendicular "X" and "Y" define a reference plane formed by a flat, level surface upon which lower surface 16 of deflection member 2 sits, and "Z" defines a direction orthogonal to the X-Y plane. Accordingly, the term "X-Y plane" used herein refers to a plane that is parallel to the reference plane formed by the flat, level surface upon which lower surface 16 of deflection member 2 sits. The person skilled in the art will also appreciate that the use of the term "plane" does not require absolute flatness or smoothness of any portion or feature described as planar. In fact, the lower surface 16 of deflection member 2 can have texture, including so-called "backside texture" which is helpful when the deflection member is used as a papermaking belt on vacuum rolls in a papermaking process as described in Trokhan or Cabell et al. As used herein, the term "Z direction" designates any direction perpendicular to the X-Y plane. Analogously, the term "Z dimension" means a dimension, distance, or parameter measured parallel to the Z-direction and can be used to refer to dimensions such as the height of protuberances 7 or the thickness, or caliper, of the unitary deflection member. It should be carefully noted, however, that an element that "extends" in the Z-direction does not need itself to be oriented strictly parallel to the Z-direction; the term "extends in the Z direction" in this context merely indicates that the element extends in a direction which is not parallel to the X-Y plane. Analogously, an element that "extends in a direction parallel to the X-Y plane" does not need, as a whole, to be parallel to the X-Y plane; such an element can be oriented in the direction that is not parallel to the Z direction.

Figure 3A:
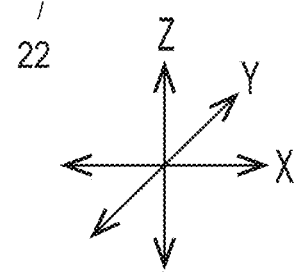
FIG. 3A is a cross-sectional view of the representative deflection member shown in FIG. 2A, taken along line 3A-3A of FIG. 2A.
Figure 3A:
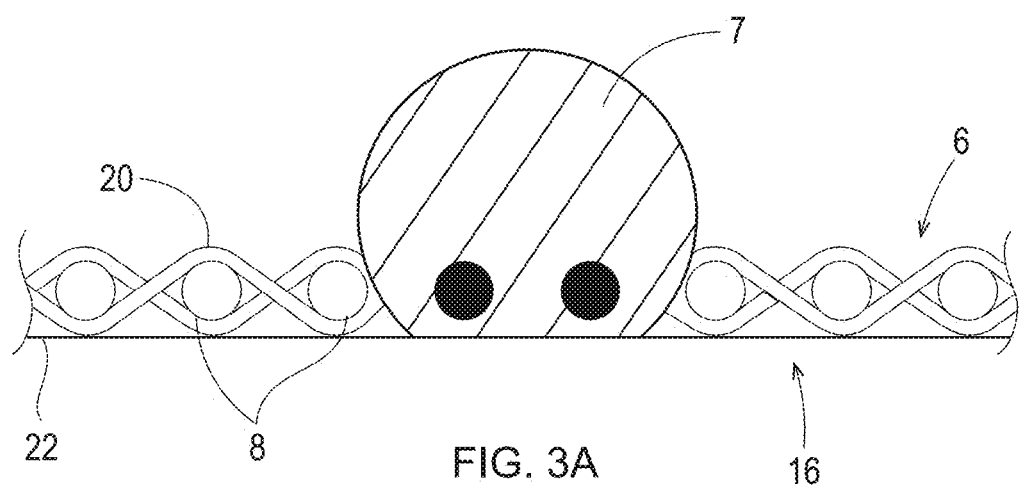
Figure 3B:
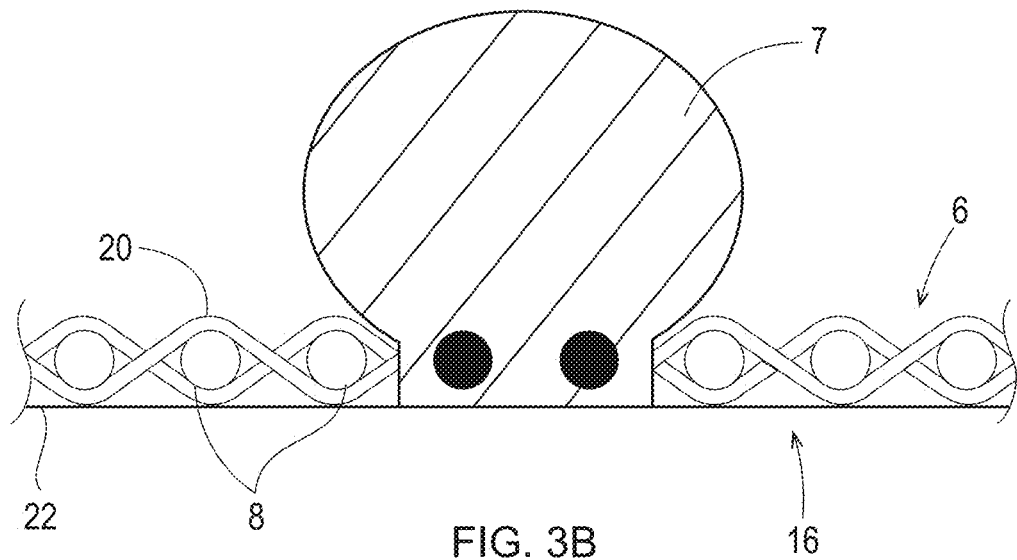
FIG. 3B is a cross-sectional view of a representative deflection member that is an alternative to the cross-sectional views illustrated in FIGS. 3 and 3A.
Figure 3C:
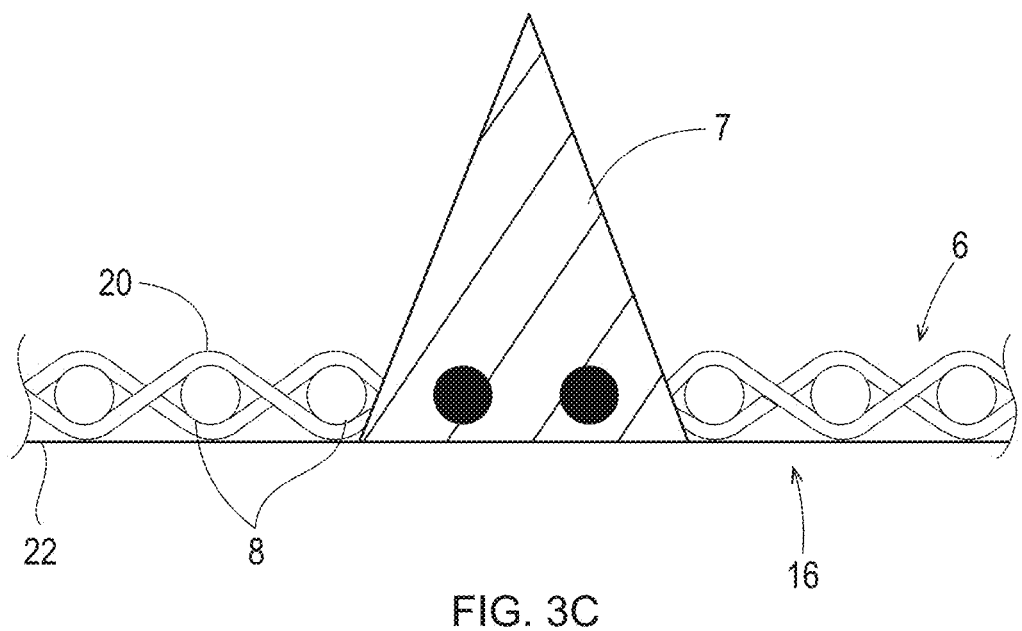
FIG. 3C is a cross-sectional view of a representative deflection member that is an alternative to the cross-sectional views illustrated in FIGS. 3, 3A, and 3B.
Figure 3D:
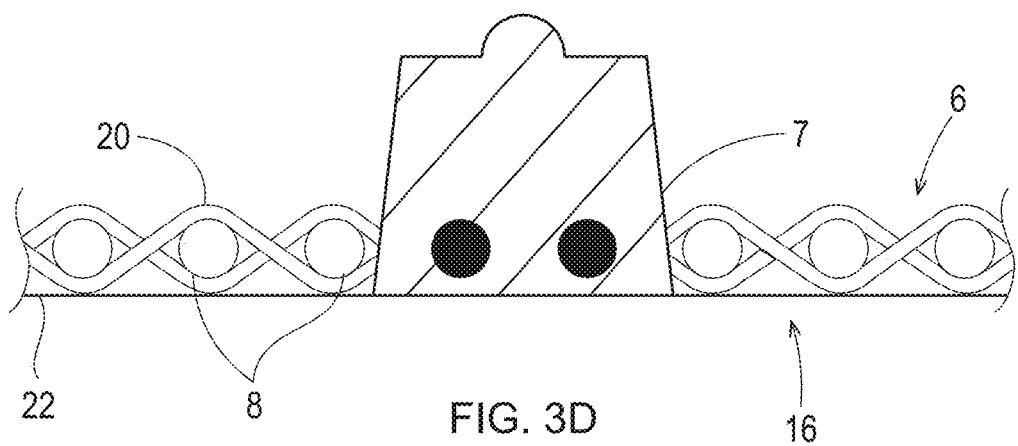
FIG. 3D is a cross-sectional view of a representative deflection member that is an alternative to the cross-sectional views illustrated in FIGS. 3, 3A, 3B, and 3C.

When viewed in cross-section, the illustrated deflection members include a resinous framework that includes either discrete cured resin elements or discrete deflection conduits with substantially planar upper and lower surfaces in common with the substantially planar upper and lower surfaces of the deflection member. Further, the wall surfaces that span the distance between the upper and lower surfaces of the resinous framework are substantially flat and perpendicular to both the upper and lower surfaces. The deflection members created by the additive manufacturing processes detailed herein may have an identical or similar resinous framework structure. However, the deflection members created by the additive manufacturing processes detailed herein may have a resinous framework that can have any shape or structure known in the art of papermaking and nonwoven making belts. For example, the wall surfaces can be straight or curved, perpendicular or angled to the upper and lower surfaces, and the upper and lower surfaces can be flat, textured, patterned, consistent, irregular, stepped, cantilevered, overhanging, porous and/or angled. FIG. 2A is a deflection member comprising a plurality of bulbous shaped protuberances 7. FIG. 3A is cross-section view of one of the protuberances 7 of FIG. 2A along line 3A-3A. Each protuberance 7 of FIG. 2A may be discrete, unattached to any other protuberance 7 or may be attached to each other along the Y axis and/or the X axis. In FIG. 2A, the individual protuberances 7 are discrete from each other along the X axis. FIGS. 3B-3D illustrate cross-sections of shapes of the protuberances 7 that may be substituted for the protuberance 7 shapes illustrated in FIGS. 2, 2A, 3, and 3A. The shapes of the protuberances 7 in FIGS. 3A-D may be referred to as complex shapes and may be formed using various 3-D printing techniques explained in more detail below, some of which include the emission of two different wavelengths, one that cures a photopolymer resin and one that inhibits curing of the photopolymer resin. As used herein, "different wavelengths" may be different by at least 1 nm. "Different wavelength ranges" may also be different by at least 1 nm. A "wavelength range" can be as small as 0.1 nm or 0.01 nm or 0.001 nm and may be larger.

Further, as illustrated in FIG. 3, reinforcing member 6 may have a substantially planar upper surface 20 and a substantially planar lower surface 22. In embodiments that have a woven reinforcing member, such reinforcing member may have macroscopically substantially planar upper and lower surfaces, while also having a microscopically non-substantially planar upper and lower surfaces. As used herein, the terms containing "macroscopical" or "macroscopically" refer to an overall geometry of a structure under consideration when it is placed in a two-dimensional configuration. In contrast, "microscopical" or "microscopically" refer to relatively small details of the structure under consideration, without regard to its overall geometry. For example, in the context of the reinforcing member, the term "macroscopically substantially planar" means that the reinforcing member, when it is placed in a two-dimensional configuration, has—as a whole—only minor deviations from absolute planarity, and the deviations do not adversely affect the reinforcing member's performance. At the same time, the reinforcing member can have a microscopical non-substantially planar upper and lower surfaces due to the three-dimensional pattern of woven filaments, as illustrated herein in FIGS. 1, 2, and 3.

In embodiments of deflection member that include a woven reinforcing member, upper surface 20 of reinforcing member 6 is considered to be an X-Y plane (i.e., a plane that is parallel to a reference plane formed by the flat, level surface upon which lower surface 16 of deflection member 2 sits) that intersects with the portion of the reinforcing member that is the furthest distance in the Z direction above lower surface 16 of deflection member 2. Lower surface 22 of reinforcing member 6 is considered to be an X-Y plane that intersects the portion of the reinforcing member that is the furthest distance in the Z direction below upper surface 14 of deflection member 2.

Process for Making Deflection Members

The additive manufacturing processes detailed below may be used to produce deflection members of the general type (including specific deflection members disclosed in the incorporated references) detailed above that include a resinous framework and a non-unitary reinforcing member. The types of additive manufacturing apparatuses that are employable in the methods detailed here are any type now known in the art, or that may be known in the future. Non-limiting examples of applicable additive manufacturing apparatuses include SLA, CLIP, LAMP, HARP, DLP-SLA, 3D-nanoprinting, 3D-fabrication by tomographic back projection techniques and g-DLP as are currently known in the art of additive manufacturing and described as stereolithography apparatus (SLA) in U.S. Pat. No. 5,236,637 by C. W. Hull et. al.; continuous liquid interface printing (CLIP) as described in U.S. Pat. No. 10,144,181B2 by J. M. DeSimone et. al., U.S. Pat. No. 9,205,601B2 by J. M. DeSimone et. al., and U.S. Publication No. 2018/0243976A1 by B. Feller; large area maskless photopolymerization (LAMP) as described in WO 2019/161299A1 by S. Das et. al.; high area rapid printing (HARP) as described in U.S. Publication No. 2019/0160733A1 by C. Mirkin et. al.; two wavelength negative imaging with DLP-SLA as described in U.S. Publication No. 2020/0001531A1 by B. D. Moran; continuous 3D-nanoprinting as described in U.S. Publication No. 2018/0015661A1 by X. Xu et. al.; computed axial lithography (CAL) as described in U.S. patent Ser. No. 10/647,061B2 by B. Kelly et. al.; tomographic back projection as described in WO 2019/043529A1 by D. Loterie et. al.; and grayscale digital light projection (g-DLP) as described in Grayscale digital light processing 3D printing for highly functionally graded materials, Science Advances 5(5): eaav5790 by X. Kuang et. al. on May 9, 2019. Regardless of the particular type of additive manufacturing apparatus employed, the apparatus may include at least one radiation source and a vat containing a photopolymer resin.

Radiation Sources

The at least one radiation source may include one, two, three, four, five, six, seven, eight, nine, ten, or more individual radiation sources. The at least one radiation source may include between 1 and about 50 individual radiation sources, between 1 and about 20 individual radiation sources, or between 1 and about 15 individual radiation sources, or between 1 and about 10 individual radiation sources, or between 1 and about 5 individual radiation sources, or between 1 and about 3 individual radiation sources. In some embodiments detailed below, such as methods for continually printing deflection members, the at least one radiation source may include 50 or more individual radiation sources, or between about 50 and about 50,000 individual radiation sources, or between about 50 and about 900 individual radiation sources, or between about 50 and about 220 individual radiation sources, or between about 50 and about 100 individual radiation sources, or between about 50 and about 75 individual radiation sources. These radiation sources may be oriented in the cross-direction (CD) and/or machine direction (MD) at one or more locations along the length of a deflection member. The at least one radiation source may include one or more individual radiation sources located at an upper location on the additive manufacturing apparatus (i.e., upper radiation source(s)) and/or include one or more individual radiation sources located at a lower location on the additive manufacturing apparatus (i.e., lower radiation source(s)). The radiation may be directed orthogonally towards the surface of the deflection member and/or reinforcing member, or may be angled towards, or may be reflected towards the surface of the deflection member and/or reinforcing member (i.e., directed in a non-orthogonal manner).

The at least one radiation source emits radiation that is utilized in the curing and/or prevention of curing when the photopolymer resin is exposed to it. The at least one radiation source can generate actinic radiation from an ultraviolet (UV) laser, a visible (VIS) laser, an infrared (IR) laser, a DLP projector, an LED array or display, an LCD panel or display, fiber optic bundles or assemblies thereof, or any other radiation type now known in the art, or that may be known in the future. In additive manufacturing apparatuses that include multiple radiation sources, the radiation sources may be all be of the same type, wavelength, and/or output strength, or the radiation sources may be any combination of types, wavelength, and/or output strengths. A non-limiting example of a UV laser can be constructed starting with a laser diode, such as a 375 nm (70 mW maximum power) available from ThorLabs (part number L375P70MLD) or less expensive VIS lasers operating at 405 nm (available in 20 mW to 1W maximum power, L405P20 and L405G1 respectively from ThorLabs). Other non-limiting examples may include argon-ion lasers which can, depending on the type, emit at a variety of wavelengths in UV, VIS and IR: 351.1 nm, 363.8 nm, 454.6 nm, 457.9 nm, 465.8 nm, 476.5 nm, 488.0 nm, 496.5 nm, 501.7 nm, 514.5 nm, 528.7 nm, 1092.3 nm. Commercial examples of applicable 405 nm lasers include the Form series of SLA printers available from FormLabs such as the Form 1+ and Form 2 (250 mW maximum power with a 140 micron spot size). Still another example of a laser applicable to the methods detailed herein is a VIS laser (532 nm, maximum 6W), as detailed by M. Shusteff et al. in U.S. Patent Publication No. 2018/001567, taught to be effective at volumetric curing of resin via multiple orthogonal beams when interested in shapes from intersecting extruded profiles. Energy is provided and/or controlled in sufficient quantity to promote curing and thereby exceeding thresholds provided by dissolved oxygen or other photoinhibitors such as those consistent with the publications: Continuous AM by Volumetric Polymerization Inhibition Patterning, Jan. 11, 2019 by M. P. de Beer et al.; *Science Adv. 5:eaau*8723+ *Supplementary Materials*; WO 2019/164808A1; U.S. patent Ser. No. 10/213,956B2 and U.S. patent Ser. No. 10/667,525B2 to K. Willis and B. J. Adzima; and U.S. Patent Publication Nos. 2019/0134888 and 2019/0126534 to DeSimone et al. and WO2014/126837 to DeSimone et al. and U.S. Patent Publication No. 2017/0120515 to J. P. Rolland et al.

Radiation sources of the present disclosure may move relative to a vat and/or over a reinforcing member to emit radiation to form protuberance(s)/resinous framework. The movement(s) of the radiation source may include rotating around the vat and/or the reinforcing member, and/or moving in the X, Y, and/or Z directions relative to the reinforcing member. More particularly, radiation sources may move between or along predefined coordinates (which may be programmed).

Vat

The vat containing photopolymer resin may be of any size to accommodate the printing of deflection members. The vat may be clear, translucent, or opaque, and constructed of plastic, stainless steel or any other material known in the art that is deep enough to hold the required amount of photopolymer resin. The vat may be lined with a minimally or non-reflective surface such black Formica. The volume of resin in the vat is controlled to incrementally or wholly deliver the final thickness in the finished deflection member. Vats of the present disclosure may move relative to the radiation sources. For example, the vat may rotate while the radiation source(s) remain stationary or the vat may rotate while the radiation source(s) counter rotate or while the radiation source(s) move in an X, Y, and/or Z direction relative to a reinforcing member within the vat. The vat may move in an X, Y, and/or Z direction relative to a reinforcing member within the vat to bring the reinforcing member closer to radiation source(s). More particularly, the vat may move between or along predefined coordinates (which may be programmed). Multiple vats may be used or the resin in the vat may be replaced to deliver different material properties or control depth of cure due to resin absorption properties at the radiation wavelength.

Dead Zone

A dead zone may be created between the actinic source and the build surface to prevent curing, partially cure, slow curing, weaken adhesion, provide a barrier to adhesion, or combinations thereof. The volumetric shape of the dead zone may be of uniform thickness (i.e., a static or moving solid film or liquid; molecularly or chemically balanced with photoinhibitors such as dissolved solids, liquids or gases). Similar mechanisms can be employed to affect a non-uniform volume or three-dimensional shape of the dead zone with designs or patterns that are can be symmetric, random or repeating. The dead zone may be oriented near a top, side or bottom plane of a build surface. In some cases, a dead zone may be formed from a group as described in Continuous AM by Volumetric Polymerization Inhibition Patterning, Jan. 11, 2019 by M. P. de Beer et. al.; *Science Adv. 5:eaau*8723+ *Supplementary Materials*; a group as described in WO 2019/164808A1; U.S. patent Ser. No. 10/213,956B2 and U.S. patent Ser. No. 10/667,525B2 to K. Willis and B. J. Adzima; and U.S. Patent Publication Nos. 2019/0134888 and 2019/0126534 to DeSimone et al.; WO2014/126837 to DeSimone et al. and U.S. patent Ser. No. 10/647,873B2 issued May 12, 2020 to J. P. Rolland et. al.; and barriers such as those described as a dewetting phase (e.g. solid, aqueous solid, ice, solid tetraethylene glycol, solid PEG-200, solid PEG-400, solid PEG-600, solid polyethylene glycol, per-fluorinated solid, per-fluorinated solid comprising a solid perfluoropolyether, fluoro-gel comprises 2-(per-fluoroheyxl)ethyl acrylate swelled with perfluoropolyether, fluorinated based liquids, perfluoro-n-alkanes, perfluoropolyethers, perfluoralkylethers, co-polymers of substantially fluorinated molecules, fluid with contact angle above 60° or above 90°, silicone liquids, liquid polymerized siloxanes, silicon oils, fluorinated oils, organic oils, oils, immiscible fluids with respect to photopolymer resin, insoluble fluids with respect to the photopolymer resin, densified salt solutions, densified sugar solutions, silicon-gel, organo-gel, aqueous hydro-gel, fluoro-gel, agar, agarose gels, polyacrylamide gels, starch gels, cationic gels, anionic gels, surfactants, fluorinated acrylic polymers (such as Capstone FS-22 and Capstone FS-83 from Dupont (Wilmington, Del., USA)), ionic surfactants, CTAB (hexadecyl-trimethylammonium bromide), CPC (cetylpyridinium chloride), DOAB (dimethyldioctadecylammonium bromide), SDS (sodium dodecyl sulfonate), SDBS (sodium dodecyl-benzenesulfonate), non-ionic surfactants, hexaethylene glycol mono-n-dodecyl ether, polyoxyethylene (2) sorbitan monolaurate (Tween-20; Polysorbate 20), Tyloxapol, or when present as liquid, optionally mobile or flowing; and combinations thereof) that is optionally optically transparent allowing 1% to 100% transmittance of actinic radiation, that is optionally cooled, that is optionally oxygenated; and combinations thereof) in US Publication No. 2019/0160733 A1 filing May 31, 2017 in the name of Mirkin et al.

A dead zone may extend wholly or partially through a reinforcing member thereby controlling lock-on. Further, a functionalized photopolymer resin may be used that can be custom formulated a priori or in vivo to photopolymerization (via resin batching or in-line mixing and active delivery to the vat at programmed and time sequenced locations). Active delivery can be managed simultaneously by control and sensing systems. Control approaches can manage time and spatial controlled energy delivered by at least one wavelength specific actinic radiation source.

Photopolymer Resin

As detailed above, the photopolymer resin(s) applicable for the additive manufacturing methods detailed herein may include cross-linkable polymers selected from light activated polymers (e.g., UV light activated, e-beam activated, etc.). The photopolymer resins may be blended with other resins (e.g. epoxy or epoxies) to have hybrid curing systems similarly described in UV- and thermal curing behaviors of dual-curable adhesives based on epoxy acrylate oligomers by Y.-J. Park et. al. in Int. J. Adhesion & Adhesives 2009 710-717. The photopolymer resin may include any of the cross-linkable polymers as described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the cross-linkable polymers as described in U.S. Pat. No. 7,445,831 issued Nov. 4, 2008 in the name of Ashraf et al., described in WO Publication No. 2015/183719 A1 filed on May 22, 2015 in the name of Herlihy et al., and/or described in WO Publication No. 2015/183782 A1 filed on May 26, 2015 in the name of Ha et al., and/or described in US Publication No. 2019/0160733 filed May 31, 2017 in the name of Mirkin et al. Other suitable cross-linkable and filler materials known in the art may also be employed as the photopolymer resin as described in US Publication No. 2015/0160733 filed on May 31, 2017 in the name of Mirkin et al, and/or as described in U.S. Pat. No. 10,245,785 issued Apr. 2, 2019 in the name of Adzima.

Photopolymer resins of the present disclosure may comprise a blend of one or more monomers, one or more photoinitiators, one or more photoinhibitors, one or more photoabsorbers, one or more stabilizers, one or more excipients, and/or one or more solvents to form a blended photopolymer resin. The blended photopolymer resin may be a suspension or a solution.

Photopolymer resins of the present disclosure may have a viscosity from about 100 cP to about 2000000 cP, from about 1000 cP to about 100000 cP, or from about 4000 cP to about 500000 cP, or from about 8000 cP to 250000 cP, specifically reciting all viscosity (cP, centipoise) increments within the above-recited ranges and all ranges formed therein or thereby. Viscosity can be expressed in other units such as mPa–s (millipascal-seconds), Pa-s (Pa-seconds) by using engineering conversions of 1 cP=1 mPa-s or 1 cP=0.001 Pa-s; or as kinematic viscosity when fluid viscosity is divided by the fluid density and expressed in stokes or centistokes. Methods of measuring viscosity or other material properties like density can be consistent with ASTM International (D7867-13, D1725, D1545, D6267, D2556, D2196, D4212-16, D1475-13, D1963, D899, D1963-85, D1875-03 or similar to those skilled in the art).

Monomers

In the present disclosure, a monomer is any polymerizable material or blend of polymerizable materials and can include prepolymers, oligomers as well as low weight materials otherwise known as monomers; and monomer is one or more materials selected from the group consisting of di-functional monomers, tri-functional monomers, multi-functional monomers, monomethacrylates, dimethacrylates, trimethacrylates, multi-functional methacrylates, monoacrylates, diacrylates, triacrylates, multi-functional acrylates, epoxy acrylates, acrylate functional polyether polyols, methacrylate functional polyether polyols, acrylate functional polyester polyols, methacrylate functional polyester polyols, acrylate functional polyurethanes, methacrylate functional polyurethanes; prepolymers; oligomers; phosphorus containing monomers; and combinations thereof. Monomers of the present disclosure may, when exposed to certain wavelengths of radiation, be functional such that they provide chemical linkages to enable multiple similar and/or varied molecular weight mono- and multifunctional chemical compounds to combine as is and/or in combination with mono- and multifunctional oligomers to create a polymeric chain and/or polymeric network—it may be desirable to have a crosslinked network.

Non-limiting examples of di-functional monomers include one or more of the following: 1,5-pentanediol diacrylate, ethylene glycol diacrylate, 1,4-butanediol diacrylate, diethylene glycol diacrylate, hexamethylene glycol diacrylate, 1,3-propanediol diacrylate, decamethylene glycol diacrylate, decamethylene glycol dimethacrylate, 1,4-cyclohexanediol diacrylate, 2,2-dimethylolpropane diacrylate, glycerol diacrylate, tripropylene glycol diacrylate, 2,2-di(p-hydroxyphenyl)-propane diacrylate, 2,2-di-(p-hydroxyphenyl)-pro pane dimethacrylate, triethylene glycol diacrylate, polyoxy ethyl-2,2-di-(p-hydroxyphenyl)-propane dimethacrylate, di(3-methacryloxy-2-hydroxypropyl)ether of bisphenol-A, di(2-methacryloxyethyl) ether of bisphenol-A, di-(3-acryloxy 2-hydroxypropyl) ether of bisphenol-A, di-(2-acryloxyethyl) ether of bisphenol-A, di-(3-methacryloxy-2-hydroxypropyl) ether of tetrachloro-bisphenol-A, di-(2-methacryloxyethyl) ether of tetrachloro-bisphenol-A, di-(3-methacryloxy-2-hy droxypropyl) ether of tetrabromo-bisphenol-A, di-(2-meth acryloxyethyl) ether of tetrabromo-bisphenol-A, di-(3-meth acryloxy-2-hydroxypropyl) ether of 1,4-butanediol, di-(3-methacryloxy-2-hydroxypropyl) ether of diphenolic acid, triethylene glycol dimethacrylate, ethylene glycol dimethacrylate, butylene glycol dimethacrylate, 1,3-pro panediol dimethacrylate, 2,2,4-trimethyl-1,3-pentanediol dimethacrylate, 1-phenyl ethylene-1,2-dimethacrylate, trimethylol propane trimethacrylate, 1,5-pentanediol dimethacrylate, 1,4-diisopropenylbenzene, diallyl fumarate, 1,4-benzenediol dimethacrylate, prepolymers with two polymerizable groups, oligomers with two polymerizable groups, monomers with two polymerizable groups, and combinations thereof.

Non-limiting examples of tri-functional monomers include one or more of the following: glycerol triacrylate, trimethylolpropane triacrylate, pentaerythritol triacrylate, polyoxyethylated trimethylolpropane triacrylate, polyoxyethylated trimethylolpropane trimethacrylate, 1,2,4-butanetriol trimethacrylate, pentaerythritol trimethacrylate, and 1,3,5-triisopropenylbenzene, prepolymers with three polymerizable groups, oligomers with three polymerizable groups, monomers with three polymerizable groups. Non-limiting examples of multi-functional monomers include one or more of the following: pentaerythritol tetraacrylate, pentaerythritol tetramethacrylate, bis-pentaerythritol hexaacrylate, bis-pentaerythritol hexamethacrylate, prepolymers with four or more polymerizable groups, oligomers with four or more polymerizable groups, monomers with four or more polymerizable groups.

Monomers of the present disclosure may be selected from monoacrylates, monomethacrylates, (C1) —$C_{18}$ alkyl acrylates and (C1) —$C_{18}$ methacrylates, such as ethylhexyl acrylate, butyl acrylate, hexyl acrylate, octyl acrylate, nonyl acrylate, decyl acrylate, isodecyl acrylate, tetradecyl acrylate, benzyl acrylate, nonyl phenyl acrylate, methyl methacrylate, ethyl methacrylate, hexyl methacrylate, 2-ethylhexyl methacrylate, octyl methacrylate, nonyl methacrylate, decyl methacrylate, isodecyl methacrylate, dodecyl methacrylate, tetradecyl methacrylate, and octadecyl methacrylate. Further examples of monomers of the present disclosure may include prepolymers with one or more polymerizable functionalities (suitable functionalities include acrylates, methacrylates, urethanes, polyester oligomers, etc). Further examples of monomers are described in U.S. Pat. No. 4,514,345 issued Apr. 30, 1985 in the name of Johnson et al., and/or as described in U.S. Pat. No. 6,010,598 issued Jan. 4, 2000 in the name of Boutilier et al. In addition, the photopolymer resin may include any of the monomers (e.g. cross-linkable polymers) and amounts as described in U.S. Pat. No. 7,445,831 issued Nov. 4, 2008 in the name of Ashraf et al.; U.S. Pat. No. 7,527,915B2 issued May 5, 2009 in the name of T. Mutoh; and U.S. Pat. No. 7,618,766B2 issued Nov. 17, 2009 in the name of T. Mutoh.

Examples of crosslinking monomers of the present disclosure may comprise monomers comprising two or more activated acrylate, methacrylate groups, or combinations thereof. Nonlimiting examples of this group include 1,6-hexanedioldiacrylate, 1,4-butanedioldimethacrylate, trimethylolpropane triacrylate, trimethylolpropane trimethacrylate, 1,1 2-dodecyldimethacrylate, 1,14-tetradecanedioldimethacrylate, ethylene glycol dimethacrylate, neopentyl glycol diacrylate (2,2-dimethylpropanediol diacrylate), hexanediol acrylate methacrylate, glucose pentaacrylate, sorbitan pentaacrylate, pentaerythritol tetraacrylate, pentaerythritol tetramethacrylate and the like. Other examples of crosslinkers may comprise a mixture of acrylate and methacrylate moieties, such as ethylene glycol acrylate-methacrylate and neopentyl glycol acrylate-methacrylate. The ratio of methacrylate:acrylate group in the mixed crosslinker may be varied from 50:50 to any other ratio as needed. Monomer and crosslinker examples useful in the present disclosure are as described in U.S. Pat. No. 9,056,412B2 issued Jun. 16, 2015 in the name of Merrigan and DesMarais; US Publication No. 2009/0247660 A1 filed Mar. 31, 2009 in the name of Park et al.; U.S. Pat. No. 5,236,637 in the name of C. W. Hull et. al.; U.S. patent Ser. No. 10/144,181B2 in the name of J. M. DeSimone et. al., U.S. Pat. No. 9,205,601B2 in the name of J. M. DeSimone et. al.; U.S. Publication No. 2018/0243976A1 in the name of B. Feller; International Publication WO 2019/161299A1 in the name of S. Das et. al.; U.S. Publication No. 2019/0160733A1 in the name of C. Mirkin et. al.; U.S. Publication No. 2020/0001531A1 in the name of B. D. Moran; U.S. Publication No. 2018/0015661A1 in the name of X. Xu et. al.; U.S. patent Ser. No. 10/647,061B2 in the name of B. Kelly et. al.; International Publication WO 2019/043529A1 in the name of D. Loterie et. al.; Grayscale digital light processing 3D printing for highly functionally graded materials, Science Advances 5(5): eaav5790 by X. Kuang et. al. on May 9, 2019; Photopolymerization in 3D printing, ACS Applied Polymer Materials 1(4):593-611 by A. Bagheri and J. Jin on Feb. 20, 2019; and U.S. patent Ser. No. 10/213,956B2 and U.S. patent Ser. No. 10/667,525B2 in the name of K. Willis and B. J. Adzima. In some cases, it may desirable to add a substantially water-insoluble monomer to the oil phase in weight percentages of from about 0% to about 75% by weight of the oil phase, to modify properties of the product.

Monomers of the present disclosure may be present in the photopolymer resin in an amount from about 10 wt. % to about 99.5 wt %, from about 25 wt. % to about 99.5 wt. %, or from about 50 wt. to about 99.5 wt. %. The monomers of the present disclosure may be present in the photopolymer resin at an amount greater than or equal to about 1 wt. %, 2 wt. %, 3 wt. %, 4 wt. %, 5 wt. %, 6 wt. %, 7 wt. %, 8 wt. %, 9 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, 65 wt. %, 70 wt. %, 75 wt. %, 80 wt. %, or more. The monomers may be present in the photopolymer resin at an amount less than or equal to about 80 wt. %, 75 wt. %, 70 wt. %, 65 wt. %, 60 wt. %, 55 wt. %, 50 wt. %, 45 wt. %, 40 wt. %, 35 wt. %, 30 wt. %, 25 wt. %, 20 wt. %, 15 wt. %, 10 wt. %, 9 wt. %, 8 wt. %, 7 wt. %, 6 wt. %, 5 wt. %, 4 wt. %, 3 wt. %, 2 wt. %, 1 wt. %, or less. In some cases, the photopolymer resin may not have any monomers. In such a scenario, the mixture may have one or more oligomers and as described in U.S. patent Ser. No. 10/245,785B2 issued Apr. 2, 2019 in the name of Adzima.

Photoinitiators

A photoinitiator is a molecule that, when exposed to certain wavelengths of radiation (UV, visible, or IR) from about 100 nm to 1400 nm wavelength, is functional such that it creates reactive species (free radicals, cations or anions). The photoinitiator reactive species reacts with a monomer to initiate a polymerization reaction. A photoinhibitor is a molecule that absorbs a photon of light and creates a reactive species and thereby delays or prevents photopolymerization. This reactive species serves to react with reactive species of either a photoinitiator or a growing polymer chain which had previously been initiated by the photoinitiator.

A photoinitiator system is comprised of at least a photoinitiator and include a co-initiator. Photoinitiator systems may comprise a component selected from the group of acylphosphine oxides, bis-acyl phospine oxides, camphorquinone, benzophenone, alkyl ethers of benzoin, diphenoxybenzophenone, benzildimethylketal, halogenated functional benzophenones, amino functional benzophenones, benzils, benzimidazozles, 2-hydroxy-2-methylphe nol-1-propanone, fluorenone, fluorenone derivatives, 2,2-di ethoxyacetophenone, benzoin, 9,10-phenanthrenequinone, anthraquinone derivatives, 2-benzyl-2-N,N-dimethylamino 1-(4-morpholinophenyl)butanone, Zanthone, Zanthone derivatives, halogenated acetophenone, halogenated acetophenone derivatives, thioxanthone, thioxanthone derivatives, Sulfonyl chlorides of aromatic compounds, diacetyl, furil, anisil, 4,4'-dichlorobenzil, 4,4'-dialkoxyben Zil, phenylpropanedione, acylphosphine oxides, 2-(dimethylamino) ethyl methacrylate, diphenyliodonium hexafluorophosphate, diphenyliodonium chloride, (dimethylamino)benzoate, an iodonium salt, an iodonium salt selected from the group of diphenyliodonium hexafluorophosphate and diphenyliodonium chloride.camphorquinone, ethyl-4-(dimethy lamino) benzoate, and diphenyliodonium hexafluorophos phate or camphorquinone, 2-(dimethylamino)ethyl methacrylate, diphenyliodonium hexafluorophosphate, 7-diethyamino-3-thenoylcoumarin (DETC) or combinations thereof and photoinitiators as described in: US Publication No. 2009/0247660 filed Mar. 31, 2009 in the name of Park et al., U.S. Pat. No. 5,236,637 in the name of C. W. Hull et. al., U.S. patent Ser. No. 10/144,181B2 in the name of J. M. DeSimone et. al., U.S. Pat. No. 9,205,601B2 in the name of J. M. DeSimone et. al., U.S. Publication No. 2018/0243976A1 in the name of B. Feller, International Publication WO 2019/161299A1 in the name of S. Das et. al., U.S. Publication No. 2019/0160733A1 in the name of C. Mirkin et. al., U.S. Publication No. 2020/0001531A1 in the name of B. D. Moran, U.S. Publication No. 2018/0015661A1 in the name of X. Xu et. al., U.S. patent Ser. No. 10/647,061B2 in the name of B. Kelly et. al., International Publication WO 2019/043529A1 in the name of D. Loterie et. al., Grayscale digital light processing 3D printing for highly functionally graded materials, Science Advances 5(5): eaav5790 by X. Kuang et. al. on May 9, 2019, Photopolymerization in 3D printing, ACS Applied Polymer Materials 1(4):593-611 by A. Bagheri and J. Jin on Feb. 20, 2019, U.S. patent Ser. No. 10/213,956B2 and U.S. patent Ser. No. 10/667,525B2 in the name of K. Willis and B. J. Adzima, U.S. Pat. No. 7,527,915B2 issued May 5, 2009 in the name of T. Mutoh, and U.S. Pat. No. 7,618,766B2 issued Nov. 17, 2009 in the name of T. Mutoh.

A photoinitiator system of the present disclosure may be present in the photopolymer resin in an amount from about 0.001 wt. % to about 20 wt. %, from about 0.01 to about 10 weight percent, from about 0.1 to about 5 weight percent, or from about 1 to about 2 weight percent.

The photoinitiator may be present in the mixture at an amount greater than or equal to about 0.001 wt. %, 0.002 wt. %, 0.003 wt. %, 0.004 wt. %, 0.005 wt. %, 0.006 wt. %, 0.007 wt. %, 0.008 wt. %, 0.009 wt. %, 0.01 wt. %, 0.02 wt.

%, 0.03 wt. %, 0.04 wt. %, 0.05 wt. %, 0.1 wt. %, 0.5 wt. %, 1 wt. %, 5 wt. %, or more. The photoinitiator may be present in the mixture at an amount less than or equal to about 5 wt. %, 1 wt. %, 0.5 wt. %, 0.1 wt. %, 0.05 wt. %, 0.04 wt. %, 0.03 wt. %, 0.02 wt. %, 0.01 wt. %, 0.009 wt. %, 0.008 wt. %, 0.007 wt. %, 0.006 wt. %, 0.005 wt. %, 0.004 wt. %, 0.003 wt. %, 0.002 wt. %, 0.001 wt. %, or less.

The photoinitiation system may be a mixture and may further comprise a co-initiator configured to initiate formation of the polymeric material from the polymeric precursor. In some cases, the co-initiator is present in the mixture at an amount from about 0.01 wt. % to about 10 wt. %. The co-initiator may be present in the mixture at an amount greater than or equal to about 0.01 wt. %, 0.02 wt. %, 0.03 wt. %, 0.04 wt. %, 0.05 wt. %, 0.06 wt. %, 0.07 wt. %, 0.08 wt. %, 0.09 wt %, 0.1 wt %, 0.2 wt, 0.3 wt. %, 0.4 wt. %, 0.5 wt. %, 1 wt. %, 2 wt. %, 3 wt. %, 4 wt. %, 5 wt. %, 6 wt %, 7 wt. %, 8 wt. %, 9 wt. %, 10 wt. %, or more. The co-initiator may be present in the mixture at an amount less than or equal to about 10 wt. %, 9 wt %, 8 wt. %, 7 wt. %, 6 wt %, 5 wt. %, 4 wt. %, 3 wt %, 2 wt. %, 1 wt. %, 0.5 wt. %, 0.4 wt. %, 0.3 wt %, 0.2 wt. %, 0.1 wt. %, 0.09 wt. %, 0.08 wt. %, 0.07 wt. %, 0.06 wt. %, 0.05 wt. %, 0.04 wt. %, 0.03 wt. %, 0.02 wt. %, 0.01 wt. %, or less. The co-initiator may be configured to initiate formation of the polymeric material comprises one or more functional groups that act as a co-initiator. The one or more functional groups may be diluted by being attached to a larger molecule. In such cases, the co-initiator may be present in the mixture at an amount greater than or equal to about 0.01 wt. %, 0.02 wt. %, 0.03 wt. %, 0.04 wt. %, 0.05 wt. %, 0.06 wt. %, 0.07 wt. %, 0.08 wt. %, 0.09 wt. %, 0.1 wt. %, 0.2 wt. %, 0.3 wt. %, 0.4 wt. %, 0.5 wt. %, 1 wt. %, 2 wt. % 3 wt. %, 4 wt. % wt. %, 6 wt. %, 7 wt. %, 8 wt. %, 9 wt. %, 0.10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, 25 wt. %, or more. The co-initiator may be present in the mixture at an amount less than or equal to about 25 wt. %, 24 wt. %, 23 wt. %, 22 wt. %, 21 wt. %, 20 wt. %, 19 wt. %, 18 wt. %, 17 wt. %, 16 wt. %, 15 wt. %, 14 wt. %, 13 wt. %, 12 wt. %, 11 wt. %, 10 wt. %, 9 wt. %, 8 wt. %, 7 wt. %, 6 wt. %, 5 wt. %, 4 wt. %, 3 wt. %, 2 wt. % wt. %, 0.5 wt. %, 0.4 wt. %, 0.3 wt. %, 0.2 wt. %, 0.1 wt. %, 0.09 wt. %, 0.08 wt. %, 0.07 wt. %, 0.06 wt. %, 0.05 wt. %, 0.04 wt. % 0.03 wt. %, 0.02 wt. %, 0.01 wt. %, or less Photoinhibitors A photoinhibitor is a molecule that, when exposed to certain wavelengths of radiation, is functional such that it absorbs a photon of light and creates a reactive species and thereby delays or prevents photopolymerization. This reactive species serves to react with reactive species of either a photoinitiator or a growing polymer chain which had previously been initiated by the photoinitiator. Photoinhibitors of the present disclosure may provide unbridged and bridged HABI as described in International Publication No. WO 2019/164808A1 in the name of T. F. Scott et. al. where bridged HABI comprises a bond linking imidazolyl moieties, bridged HABI comprises a naphthalene-bridged HABI, bridged HABI comprises a [2.2]paracyclophane-bridged HABI, bridged HABI comprises a 1,1'-bi naphthol bridged HABI, bridged HABI comprises any organic connector, and bridged HABI comprises any heteroatom connector. In some embodiments, the technology relates to use of a bridged HABI. See, e.g., Iwahori et al. (2007) "Rational design of a new class of diffusion-inhibited HABI with fast back-reaction" J Phys Org Chem 20: 857-63; Fujita et al. (2008) "Photochromism of a radical diffusion-inhibited hexaarylbiimidazole derivative with intense coloration and fast decoloration performance" Org Lett 10: 3105-08, Kishimoto and Abe (2009) "A fast photochromic molecule that colors only under UV light" J Am Chem Soc 13L 4227-29: Harada et al. (2010) "Remarkable acceleration for back-reaction of a fast photochromic molecule" J Phys Chem Lett L 1112-15; Mutoh et al. (2010) "An efficient strategy for enhancing the photosensitivity of photochromic [2.2]paracyclophane-bridged imidazole dimers" J Photopolym Sci Technol 23: 301-06; Kimoto et al. (2010) "Fast photochromic polymers carrying [2.2]paracyclophane-bridged imidazole dimer" Macromolecules 43: 3764-69; Hatano et al. (2010) "Unprecedented radical-radical reaction of a [2.2]paracyclophane derivative containing an imidazolyl radical moiety" Org Lett 12: 4152-55; Hatano et al. (2011) "Reversible photogeneration of a stable chiral radical-pair from a fast photochromic molecule" J Phys Chem Lett 2 2680-82; Mutoh and Abe (2011) "Comprehensive understanding of structure-photosensitivity relationships of photochromic [2.2]paracyclophane-bridged imidazole dimers" J Phys Chem A 115: 4650-56, Takizawa et al. (2011) "Photochromic organogel based on [2.2]paracyclophane-bridged imidazole dimer with tetrapodal urea moieties" Dyes Pigm 89: 254-59; Mutoh and Abe (2011) "Photochromism of a water-soluble vesicular [2.2]paracyclophane bridged imidazole dimer" Chem Comm 47:8868-70; Yamashita and Abe (2011) "Photochromic properties of [2.2]paracyclophane-bridged imidazole dimer with increased photosensitivity by introducing pyrenyl moiety" J Phys Chem A 115: 13332-37: Kawai et al. (2012) "Entropy-controlled thermal back-reaction of photochromic [2.2]paracyclophane-bridged imidazole dimer" Dyes Pigm 92: 872-76; Mutoh et al. (2012) "Spectroelectrochemistry of a photochromic [2.2]paracyclophane-bridged imidazole dimer: Clarification of the electrochemical behavior of HABG J Phys Chem A 116: 6792-97; Mutoh et al. (2013) "Photochromism of a naphthalene-bridged imidazole dimer constrained to the 'anti' conformation" Org Lett 15: 29-3841; Shima et al (2014) "Enhancing the versatility and functionality of fast photochromic bridged-imidazole dimers by flipping imidazole ring" J Am Chem Soc 136: 3796-99: Iwasaki et al. (2014) "A chiral BINOL-bridged imidazole dimer possessing sub-millisecond fast photochromism" Chem Commun 50: 7481-84: and Yamaguchi et al. (2015) "Nanosecond photochromic molecular switching of a biphenyl-bridged imidazole dimer revealed by wide range transient absorption spectroscopy" Chem Commun 5L 1375-78, each of which is incorporated herein by reference in its entirety.

A photoinhibitor can come from the group described in: Continuous AM by Volumetric Polymerization Inhibition Patterning, Jan. 11, 2019 by M. P. de Beer et. al.; *Science Adv.* 5:eaau8723+ *Supplementary Materials*, International Publication No. WO 2019/164808A1 in the name of T. F. Scott et. al., U.S. patent Ser. No. 10/213,956B2 and U.S. Patent 101667525B2 in the name of K. Willis and B. J. Adzima, U.S. patent Ser. No. 10/144,181B2 in the name of J. M. DeSimone et. al., U.S. Pat. No. 9,205,601B2 in the name of J. M. DeSimone et. al., U.S. Publication No. 2018/0243976A1 in the name of B. Feller; International Publication WO 2019/161299A1 in the name of S. Das et. al., U.S. Publication No. 2020/0001531A1 in the name of B. D. Moran, U.S. Publication No. 2018/0015661A1 in the name of X. Xu et. al., International Publication WO 2019/043529A1 in the name of D. Loterie et. al., U.S. Pat. No. 8,697,346B2 in the name of R. McLeod et. al., U.S. Pat. No. 7,527,915B2 issued May 5, 2009 in the name of T. Mutoh, and U.S. Pat. No. 7,618,766B2 issued Nov. 17, 2009 in the name of T. Mutoh. Photoinhibitors may be selected from the group that can create free radicals but due to a close bridging moiety prevent diffusion of said radicals and are able to recombine by fast back reactions to participate in still more photoinhibition as described in: Y. Kishimoto and J. Abe. 2009. A fast photochromic molecule that colors only under UV light. J. Am. Chem. Soc. 131(12):4227-4229, International Publication No. WO 2019/164808A1 in the name of T. F. Scott et. al. A. Kimoto et. al. 2010; Fast photochromic polymers carrying [2,2]paracyclophane-bridged imidazole dimer Macromolecules 43(8):3764-3769; K. Fujita et. al. 2008. Photochromism of a radical diffusion-inhibited hexaarylbiimidazole derivative with intense coloration and fast decoloration performance Organic Letters 10(14):3105-3108; and Y. Harada et. al. 2010. Remarkable acceleration for back-reaction of a fast photochromic molecule J. Phys. Chem. Lett. 1(7):1112-1115.

Photoinhibitors of the present disclosure may include one or more of: zinc dimethyl dithiocarbamate: zinc dimethyl dithiocarbamate; zinc diethyl dithiocarbamate; zinc dibutyl dithiocarbamate; nickel dibutyl dithiocarbamate: zinc dibenzyl dithiocarbamate, tetramethylthiuram disulfide, tetraethylthiuram disulfide (TEDS)-tetramethylthiuram monosulfide; tetrabenzylthiuram disulfide: tetraisobutylthiuram disulfide: dipentamethylene thiuram hexasulfide; N,N'-dimethyl N,N'-di(4-pyridinyl)thiuram disulfide, 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol, Cyanomethyl dodecl trithiocarbonate; Cyanomethyl [3-(trimethoxysilyl)propyl]trithiocarbonate; 2-Cyano-2-propyl dodecyl trithiocarbonate. S,S-Dibenzyl trithiocarbonate, 2-(Dodecylthiocarbonothioylthio)-2-methylpropionic acid, 2-(Dodecylthiocarbnothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl) carbamodithioate; Methyl 2-[methyl(4-pyridinyl)carbamothioylthio]propionate; 1-Succinimidyl-4-cyano-4-[N-methyl-N-(4-pyridyl)carbamothioylthio]pentanoate; Benzyl benzodithoate; Cyanomethyl benzodithioate; 4-Cyano-4-(phenylcarbonothioylthio)pentanoic acid, 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate, 2-Cyanopropan-2-yl N-methyl-N-(pyridin-4-yl)carbamodithioate: Methyl 2-[methyl(4-pyridinyl)carbamothioylthio]propionate: 1,1'-Bi-1H-imidazole; and functional variants thereof and more as described in Continuous AM by Volumetric Polymerization Inhibition Patterning, Jan. 11, 2019 by M. P. de Beer et. al.; *Science Adv.* 5:*eaau*8723+ *Supplementary Materials*; International Publication No. WO 2019/164808A1 in the name of T. F. Scott et. al.; U.S. patent Ser. No. 10/213,956B2 and U.S. patent Ser. No. 10/667,525B2 in the name of K. Willis and B. J. Adzima; U.S. patent Ser. No. 10/144,181B2 in the name of J. M. DeSimone et. al., U.S. Pat. No. 9,205,601B2 in the name of J. M. DeSimone et. al.; U.S. Publication No. 2018/0243976A1 in the name of B. Feller; International Publication WO 2019/161299A1 in the name of S. Das et. al.; U.S. Publication No. 2020/0001531A1 in the name of B. D. Moran; U.S. Publication No. 2018/0015661A1 in the name of X. Xu et. al.; International Publication WO 2019/043529A1 in the name of D. Loterie et. al.; U.S. Patent 8697346B2 in the name of R. McLeod et. al.; U.S. Pat. No. 7,527,915B2 issued May 5, 2009 in the name of T. Mutoh; and U.S. Pat. No. 7,618, 766B2 issued Nov. 17, 2009 in the name of T. Mutoh. In some cases, photoinhibitors (e.g. pseudogem-bisDPI[2.2] PC, 1-NDPI-8-TPI-naphthalene) are selected from the group that can create free radicals but due to a close bridging moiety prevent diffusion of said radicals and are able to recombine by fast back reactions to participate in still more photoinhibition as described in Y. Kishimoto and J. Abe. 2009. A fast photochromic molecule that colors only under UV light. J. Am. Chem. Soc. 131(12):4227-4229; International Publication No. WO 2019/164808A1 in the name of T. F. Scott et. al.; A. Kimoto et. al. 2010. Fast photochromic polymers carrying [2,2]paracyclophane-bridged imidazole dimer Macromolecules 43(8):3764-3769; K. Fujita et. al. 2008. Photochromism of a radical diffusion-inhibited hexaarylbiimidazole derivative with intense coloration and fast decoloration performance Organic Letters 10(14):3105-3108; and Y. Harada et. al. 2010. Remarkable acceleration for back-reaction of a fast photochromic molecule J. Phys. Chem. Lett. 1(7):1112-1115.

Photoinhibitor of the present disclosure may be present in the photopolymer resin at an amount 0 to about 6 weight percent, from about 0 to about 5 weight percent, or from about) to about 4 weight percent. Photoinhibitors of the present disclosure may be present in the photopolymer resin at amount greater than or equal to about 0.001 wt. %, 0.002 wt. %, 0.003 wt. %. 0.004 wt. %, 0.005 wt. %, 0.006 wt. %, 0.007 wt. %, 0.008 wt. %, 0.009 wt. %, 0.01 wt. %, 0.02 wt. %, 0.03 wt. %, 0.04 wt. %0.05 wt. %, 0.1 wt. %, 0.5 wt. %, 1 wt. %, 5 wt. %, or more. Further, photoinhibitors of the present disclosure may be present in the photopolymer resin at an amount less than or equal to about 5 wt. %, 1 wt. %, 0.5 wt. %, 0.1 wt. % 0.05 wt. %, 0.04 wt. %, 0.03 wt. %, 0.02 wt. %, 0.01 wt. %, 0.009 wt. %, 0.008 wt. %, 0.007 wt. %, 0.006 wt. %0.005 wt. %, 0.004 wt. %, 0.003 wt. %, 0.002 wt. %, 0.001 wt. %, or less.

In some cases, a photoinhibitor can function as a photoinitiator in the presence of a co-initiator but in that absence function to inhibit photopolymerization as International Publication No. WO 2019/164808A1 in the name of T. F. Scott et. al. Some photoactivated radicals can preferentially terminate free radical polymerization, rather than initiating polymerizations, and the species that become such photoactivated radicals upon photoactivation may be used as photoinhibitors. For example, ketyl radicals may terminate rather than initiate photopolymerizations. Most controlled radical polymerization techniques utilize a radical species that selectively terminates growing radical chains. Examples of such radical species include sulfanylthiocarbonyl and other radicals generated in photoiniferter (photo-initiator, transfer agent, and terminator) mediated polymerizations: sulfanylthiocarbonyl radicals used in reversible addition-fragmentation chain transfer polymerization; and nitrosyl radicals used in nitroxide mediate polymerization. In addition, lophyl radicals may be non-reactive towards the polymerization of acrylates in the absence of strong chain transfer agents. Other non-radical species that may be generated to terminate growing radical chains may include the numerous metal/ligand complexes used as deactivators in atom-transfer radical polymerization (ATRP). Non-limiting examples of the photoinhibitor include thiocarbamates, xanthates, dithiobenzoates, photoinititators that generate ketyl and other radicals that tend to terminate growing polymer chains radicals (i.e., camphorquinone and benzophenones), ATRP deactivators, and polymeric versions thereof.

In some cases, a photoinhibitor may comprise a hexaarylbiimidazole (HABI) or a functional variant thereof. In some cases, the hexaarylbiimidazole may comprise a phenyl group with a halogen and/or an alkoxy substitution. The phenyl group may comprise an ortho-chloro-substitution. Further, the phenyl group may comprise an ortho-methoxy-substitution. Further, the phenyl group may comprise an ortho-ethoxy-substitution. Examples of the functional variants of the hexaarylbiimidazole include: 2,2'-Bis(2-chlorophenyl)-4,4',5,5'-tetraphenyl-1,2'-biimidazole; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; and 2,2',4-tris-(2-Chlorophenyl)-5-(3,4-dimethoxyphenyl)-4',5'-diphenyl-1,1'-biimidazole and as described in U.S. patent Ser. No. 10/245,785B2 issued Apr. 2, 2019 in the name of Adzima.

Photoabsorbers

In some cases, the photopolymer resin may further comprise a light absorber configured to, when exposed to certain wavelengths of radiation, be functional such that it absorbs at least the first wavelength of the first light, the second wavelength of the second light and/or the third wavelength of the third light or combinations thereof where the light is multi-spectral as for a non-limiting example of visible light as a mixture of red, green and blue. In some cases, the light absorber may be a dye or pigment. The light absorber can be used to both attenuate light and to transfer energy (e.g., via Förster resonance energy transfer (FRET)) to photoactive species (e.g., the photoinitiator or the photoinhibitor), thereby to increase the sensitivity of the resulting mixture to a given wavelength suitable for the photoinitiation and/or the photoinhibition process. A concentration of the light absorber may be highly dependent on the light absorption properties of the light absorber, as well as the optical attenuation from other components in the mixtures. In an example, the light absorber may be configured to absorb at the second wavelength, and exposing the mixture to the second light having the second wavelength may initiate the light absorber to reduce an amount of the second light exposed to at least a portion of the mixture. One skilled in the art will understand how to utilize of one or more light sources at a plurality of intensities with one or more light absorbers at a plurality of concentrations to restrict the penetration of the photoinhibition light to a given thickness such that the photoinhibition layer is thick enough to permit separation of the newly formed layer of the 3D object from the print surface (e.g., the window) or to affect volumetric photoinhibition at one or more depths. Additionally, one skilled in the art will understand how to utilize the one or more light absorbers at the plurality of concentrations to restrict penetration and/or propagation of the photoinitiating light during printing at least a portion of the 3D object. In some cases, a plurality of light absorbers may be used to independently control both photoinhibition and photoinitiation processes as described in U.S. patent Ser. No. 10/245,785B2 issued Apr. 2, 2019 in the name of Adzima; International Publication No. WO 2019/164808A1 in the name of T. F. Scott et. al.; U.S. patent Ser. No. 10/213,956B2 and U.S. patent Ser. No. 10/667,525B2 in the name of K. Willis and B. J. Adzima; U.S. Publication No. 2018/0243976A1 in the name of B. Feller; International Publication WO 2019/161299A1 in the name of S. Das et. al.; U.S. Publication No. 2020/0001531A1 in the name of B. D. Moran; and U.S. Publication No. 2018/0015661A1 in the name of X. Xu et. al.

Photoabsorbers of the present disclosure may be selected from examples as described in U.S. patent Ser. No. 10/245,785 issued Apr. 2, 2019 in the name of Adzima (e.g., UV absorbers such as: 2-hydroxyphenyl-benzophenones; 2-(2-hydroxyphenyl)-benzotriazoles (and chlorinated derivatives); and 2-hydroxyphenyl-s-triazines; visible light absorbers include those used for histological staining or dying of fabrics; pigments such as carbon black, pthalocyanine, toluidine red, quinacridone, titanium dioxide, and functional variants thereof may also be used as light absorbers in the mixture. It may be desirable to use non-reactive dyes. dyes that may be used as light absorbers include: Martius yellow; Quinolone yellow: Sudan red. Sudan 1, Sudan IV, eosin, eosin Y, neutral red, acid red. Sun Chemical UVDS 150: Sun Chemical UVDS 350; Penn Color Cyan; Sun Chemical UVDJ107: 2-tert-Butyl-6-(5-chloro-2H-benzotriazol-2-yl)-4-methylphenol; 2-(2H-Benzotriazol-2-yl)-4,6-di-tert-pentylphenol: 7-diethylamino-4-methyl coumarin; 9,10-Dibutoxyanthracene; 9-phenyl acridine; Epolight 5675 and functional variants thereof). Further photoabsorber examples are non-reactive dyes or colorants may be selected from examples as described in International Publication No. WO 2019/164808A1 in the name of T. F. Scott et. al.; U.S. patent Ser. No. 10/213,956B2 and U.S. patent Ser. No. 10/667,525B2 in the name of K. Willis and B. J. Adzima; U.S. Publication No. 2018/0243976A1 in the name of B. Feller; International Publication WO 2019/161299A1 in the name of S. Das et. al.; U.S. Publication No. 2020/0001531A1 in the name of B. D. Moran; and U.S. Publication No. 2018/0015661A1 in the name of X. Xu et. al.

Additional light absorbing dyes can be used in photopolymer resins of the present disclosure as described in U.S. Publication No. 2013/0342888A1 and U.S. Pat. No. 9,268,158B2 issued Feb. 23, 2016 in name of Donval et al (examples for light absorbing dyes are commercial dyes made by Epolin Inc, like Epolight 5699 and Epolight 5447, or American Dye Source Inc. made ADS 1065A dye). Further examples for visible light absorbing dyes are described in U.S. Pat. No. 9,493,666B2 issued Nov. 15, 2016 in the name of Banning et al. It may be desirable for light absorbers to have abrupt absorption-transmission characteristics as described in U.S. Pat. No. 7,278,737B2 issued Oct. 9, 2007 in the name of Mainster et al. for Eastman Yellow 035 MA dye [transitioning between 400 nm to 450 nm].

Additional UV absorbers for use in photopolymer resins of the present disclosure can be used as described in U.S. Pat. No. 6,974,850B2 issued in Dec. 2, 2005 in the name of McMan et al; and as described in U.S. Pat. No. 5,576,141A issued Nov. 19, 1996 in the name of Neumann and Henzel for benzotriazole UV dyes or for UV light absorbers from benzotriazoles, benzophenones and/or phenol substituted triazines as described in U.S. Pat. No. 6,391,065B1 issued May 21, 2002 in the name of Cooke. Representative benzotriazoles include, but are not limited to, those described in U.S. Pat. No. 3,004,896 (Heller et al. '896), U.S. Pat. No. 3,055,896 (Boyle et al.), U.S. Pat. No. 3,072,585 (Milionis et al.), U.S. Pat. No. 3,074,910 (Dickson, Jr.), U.S. Pat. No. 3,189,615 (Heller et al. '615), U.S. Pat. No. 3,230,194 (Boyle), U.S. Pat. No. 4,127,586 (Rody et al. '586), U.S. Pat. No. 4,226,763 (Dexter et al. '763), U.S. Pat. No. 4,275,004 (Winter et al. '004), U.S. Pat. No. 4,315,848 (Dexter et al. '848), U.S. Pat. No. 4,347,180 (Winter et al. '180), U.S. Pat.

No. 4,383,863 (Dexter et al. '863), U.S. Pat. No. 4,675,352 (Winter et al. '352), U.S. Pat. No. 4,681,905 (Kubota et al.), U.S. Pat. No. 4,853,471 (Rody et al. '471), U.S. Pat. No. 5,436,349 (Winter et al. '349), U.S. Pat. No. 5,516,914 (Winter et al. '914), U.S. Pat. No. 5,607,987 (Winter et al. '987), U.S. Pat. No. 5,977,219 (Ravichandran et al. '219), U.S. Pat. No. 6,187,845 (Renz et al.) and U.S. Pat. No. 6,262,151 (Ravichandran et al. '151). Polymerizable benzotriazoles can be employed if desired. It may be desirable if the benzotriazole is substituted in the 5-position of the benzo ring by a thio ether, alkylsulfonyl or phenylsulfonyl moiety such as the benzotriazoles described in U.S. Pat. No. 5,278,314 (Winter et al. '314), U.S. Pat. No. 5,280,124 (Winter et al. '124), Winter et al. '349 and Winter et al. '914, or substituted in the 5-position of the benzo ring by an electron withdrawing group such as the benzotriazoles described in Ravichandran et al. '219. Further benzotriazoles that may be used in photopolymer resins of the present disclosure include 2-(2-hydroxy-3,5-di-alpha-cumylphenyl)-2H-benzotriazole (TINUVIN™ 234 or TINUVIN 900, both commercially available from Ciba Specialty Chemicals), 5-chloro-2-(2-hydroxy-3-tert-butyl-5-methylphenyl)-2H-benzotriazole (TINUVIN 326, commercially available from Ciba Specialty Chemicals), 5-chloro-2-(2-hydroxy-3,5-di-tert-butylphenyl)-2H-benzotriazole (TINUVIN 327, commercially available from Ciba Specialty Chemicals), 2-(2-hydroxy-3,5-di-tert-amylphenyl)-2H-benzotriazole (TINUVIN 328, commercially available from Ciba Specialty Chemicals), 2-(2-hydroxy-3-alpha-cumyl-5-tert-octylphenyl)-2H-benzotriazole (TINUVIN 928, commercially available from Ciba Specialty Chemicals) and 5-trifluoromethyl-2-(2-hydroxy-3-alpha-cumyl-5-tert-octylphenyl)-2H-benzotriazole (CGL-139, commercially available from Ciba Specialty Chemicals). Mixtures of benzotriazoles can be employed. TINUVIN 328, TINUVIN 928 and CGL-139 may be desirable benzotriazoles due to their high solubility in monomers such as isobornyl acrylate. Due to its relatively low cost, TINUVIN 928 may be a desirable choice for use on PET and HSPET supports. Due to its performance, CGL-139 may be a desirable choice for use on naphthalate polyester supports, which require special UV protection at certain wavelengths.

Photoabsorbers of the present disclosure may be present in the photopolymer resin in an amount from about 0 wt. % to about 5 wt. %, from about 0 to about 3.5 weight percent, from about 0 to about 2 weight percent, or from about 0 to about 1 weight percent.

Solvents

Solvents of the present disclosure may be organic compounds such as acetone or tetrahydrofuran (THF) that are compatible with one or more chemicals in the photopolymer resin. The solvent enables a compound to be dissolved possibly a priori and dispersed in the resin system—including with active mixing. Mixing may be performed under vacuum and/or a vacuum can be used to degas the photopolymer resin after the final resin mixture is complete or in a series of mixture steps. The vacuum system may be comprised of a condensation loop to recover solvents that are evaporated.

In some cases, water may be used as a solvent. In other cases, materials may not be soluble and must be dispersed in the photopolymer resin—wet milling is another way to reduce particles—solids, vesicles or encapsulates—such that these can be reduced in size (i.e. about 10 to 2 microns or less) to be partially or wholly stable under use and storage conditions. Active mixing prior to use may be needed to redisperse any particles that have partitioned or separated.

Solvents of the present disclosure may be present in the photopolymer resin in an amount from about 0 to about 100 weight percent or more, from about 0.01 to about 50 weight percent, or from about 0.1 to about 25 weight percent.

Excipients

Excipients of the present disclosure function to add bulk and/or volume to the photopolymer resin and may be selected from non-limiting groups consisting of low boiling point volatiles, isoparaffin fluids, oils, silicas, metal oxides, fumed metal oxides, modified calcium sulfates, and nanocellulosic materials. Non-limiting examples include butane, pentane and volatile isoparaffin (e.g. volatile Isopar-E, ExxonMobil Chemical, Irving, Tex.); mineral oil (e.g. Drakeol Supreme, Pennzoil, Penrenco Division, Karns City, Pa.); silicon dioxide, colloidal silica, titanium dioxide, aluminum oxide (e.g. Evonik Corporation, Parsippany, N.J.); calcium sulfate whiskers and/or particles as described in Y. Liu et. al., 2019 and T. Jaio et. al. 2020; and cellulose nanocrystals (CNC) as described in M. K. Aranguren et. al. 2013; cellulose nanofibers (CNF) as described in Cheng et al 2016; and bacterial cellulose (BC). In some cases, the excipient may have a function such as a photoabsorber (e.g. titanium dioxide) and/or be chemically bonded at part of the polymer network (e.g. acryloyl chloride modified chitosan coated calcium sulfate whiskers and acryloyl chloride modified chitosan coated calcium sulfate particles).

Excipients of the present disclosure may be present in the photopolymer resin in an amount from about 0 to about 90 weight percent or more (e.g. mineral oils, oils, volatile fluids, pentane, butane, isoparaffin fluid, volatile isoparaffin fluid), from about 0 to about 75 weight percent (e.g. mineral oils, oils, volatile fluids, pentane, butane, isoparaffin fluid, volatile isoparaffin fluid), from about 0 to about 20 weight percent (e.g. acryloyl chloride modified chitosan coated calcium sulfate particles, acryloyl chloride modified chitosan coated calcium sulfate whiskers, chitosan coated calcium sulfate particles, chitosan coated calcium sulfate whiskers, calcium sulfate particles, calcium sulfate whiskers), or from about 0 to about 6 weight percent (e.g. cellulose nanofibers, cellulose nanocrystals, titanium dioxide, fumed metal oxides, silicone dioxide, silicas, colloidal silica, bacterial cellulose).

Stabilizers

Stabilizers of the present disclosure function to increase the longevity or stability of the photopolymer resin material properties and may be selected from the non-limiting groups (with non-limiting examples) consisting of antioxidants (e.g. Irganox 1010 from BASF Corporation, Florham Park, N.J.) and thermal stabilizers or flame retardants (e.g. phosphorus containing acrylates and phosphorus-containing photoinitiators as described in U.S. Pat. No. 7,527,915B2 issued May 5, 2009 in the name of T. Mutoh; and U.S. Pat. No. 7,618,766B2 issued Nov. 17, 2009 in the name of T. Mutoh.). Stabilizers of the present disclosure may be present in the photopolymer resin in an amount from about 0 to about 3 weight percent or more, from about 0.1 to about 2.5 weight percent, or from about 0.5 to about 1 weight percent. In some cases, the stabilizer is incorporated into another resin component (e.g., phosphorus containing monomers or phosphorus containing photoinitiators) and efficacy is determined by elemental amount present in the mixture as described in U.S. Pat. No. 7,527,915B2 issued May 5, 2009 in the name of T. Mutoh; and U.S. Pat. No. 7,618,766B2 issued Nov. 17, 2009 in the name of T. Mutoh. A stabilizer of the present disclosure includes co-stabilizers, which chemically regenerate one or more phenolic structure on the stabilizer.

Reinforcing Members

The reinforcing members applicable for the additive manufacturing methods detailed herein may be any of the reinforcing members detailed herein. A reinforcing member of the present disclosure may comprise one or more materials selected from the group consisting of woven, Spun or Bonded filaments; composed of natural and/or synthetic fibers; metallic fibers, carbon fibers, silicon carbide fibers, fiberglass, mineral fibers, and] or polymer fibers including polyethylene terephthalate ("PET") or PBT polyester, phenol-formaldehyde (PF); polyvinyl chloride fiber (PVC); polyolefins (PP and PE); acrylic polyesters; aromatic polyamids (aramids) such as Twaron®, Kevlar® and Nomex®; polytetrafluoroethylene such as Teflon® commercially available from DuPont®; polyethylene (PE), including with extremely long chains HMPE (e.g. Dyneema or Spectra); polyphenylene sulfide ("PPS"); and] or elastomers. In one non-limiting form, the woven filaments of reinforcing member are filaments as disclosed in U.S. Pat. No. 9,453,303 issued Sep. 27, 2016 in the name of Aberg et. al. and described by Brent, Jr. et. al., 2018 in U.S. Application 2018/0119347.

Reinforcing member can include any woven or nonwoven supporting substrate (i.e., base fabric)—such as woven yarns, nonwovens, yarn arrays, spiral links, knits, braids; spiral wound strips of any of above-listed forms, independent rings, and other extruded element forms. For example, the reinforcing member can be made from polymers such as polyethylene terephthalate ("PET"), polyamide ("PA"), polyethylene ("PE"), polypropylene ("PP"), polyphenylene sulfide ("PPS"), polyether ether ketone ("PEEK"), polyethylene naphthalate ("PEN") metal, or a combination of polymers and metal.

In some cases, the reinforcing member surface comprises a surface material, the material being selected from the surface material group of: a coating, a laminated film, a melt fiber, and foam. In some cases, the surface material has sufficient pliability to conform to the reinforcing member. The coating is selected from the group consisting essentially of: acrylic, silicone, a coating containing a fluorocarbon, polyurethane, each of which may be reinforced with polymeric or cellulosic fibers, or filled with inorganic particles, wherein the particles are adapted to provide the structure with improved sheet release, resistance to abrasion, or resistance to contamination. The coating can be adapted to be porous or is a porous foam. The reinforcing member is not permeable to air or water except by the voids. The reinforcing member can further comprise a layer of batt fiber under the surface of the reinforcing member wherein the batt layer is adapted to allow the surface material to penetrate wholly or at least partially into the batt layer. In some cases, the protuberance(s) are wholly or partially locked on to the reinforcing member prior to adapting in the batt layer.

Methods of Manufacturing a Deflection Member

First Method:

In one method for manufacturing a deflection member, an additive manufacturing apparatus 100 is provided that includes at least one radiation source 130 and a vat 140 containing photopolymer resin 150. A reinforcing member 106 is provided that has a first surface 120 and a second surface 122 opposite the first surface. Second surface 122 of reinforcing member 106 is contacted with photopolymer resin 150 contained in vat 140. In some embodiments, such contact may be only slight contact between second surface 122 of reinforcing member 106 and photopolymer resin 150 contained within vat 140. In other embodiments, the contact may be a result of the entire reinforcing member being submerged within photopolymer resin 150 contained in vat 140. In other embodiments, the contact between second surface 122 of reinforcing member 106 and photopolymer resin 150 may be of an amount in between these two extremes, for example, reinforcing member 106 may be a quarter, or half, or three-quarters submerged within photopolymer resin 150.

Figure 6:
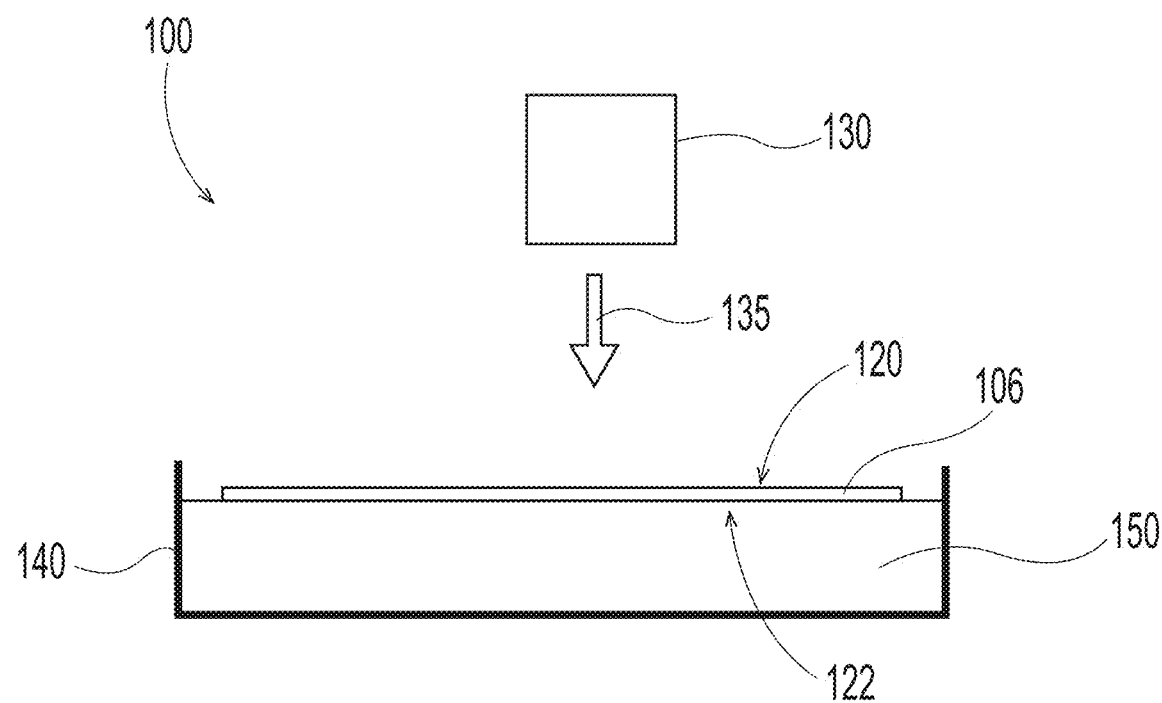
FIG. 6 is a schematic representation of system set up to employ in the additive methods as detailed herein.
Figure 7:
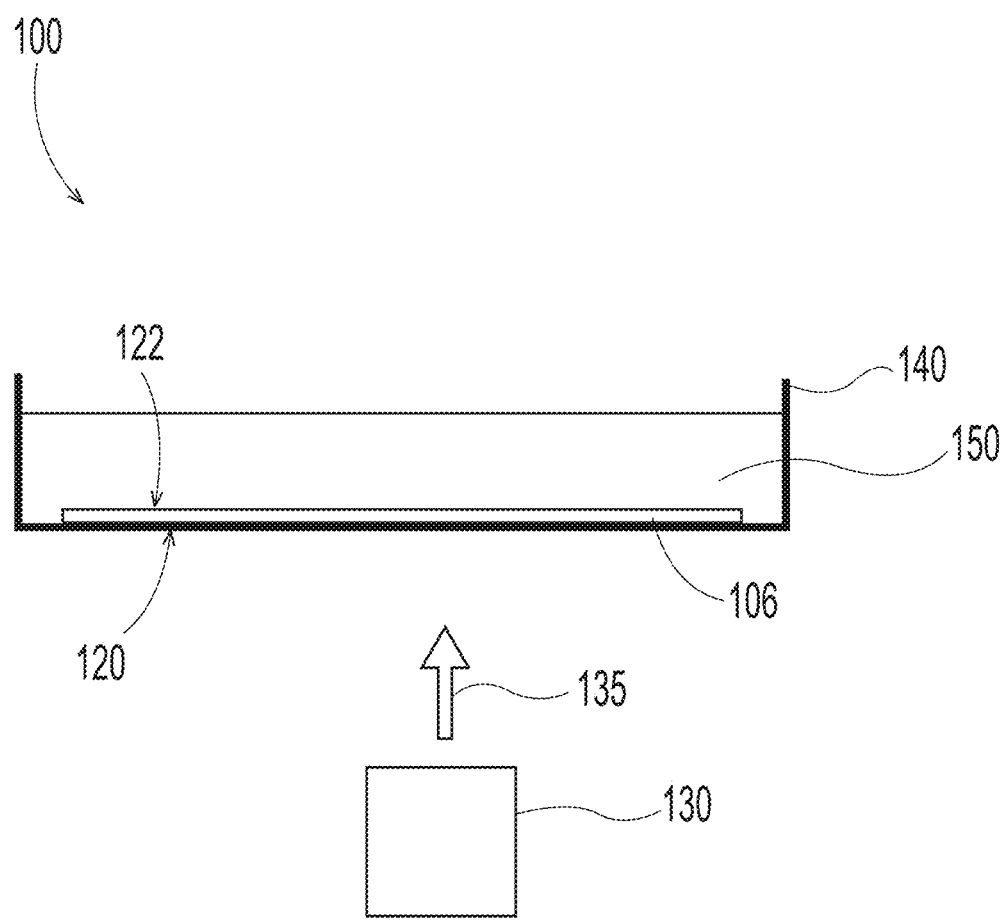
FIG. 7 is a schematic representation of system set up to employ in the additive methods as detailed herein.

Once contact is made between reinforcing member 106 and the photopolymer resin 150, a setup as illustrated in the exemplary embodiments of FIG. 6 or 7 is achieved. FIG. 6 illustrates an embodiment where at least one radiation source 130 is located above vat 140 containing photopolymer resin 150 and the contact between second surface 122 of reinforcing member 106 and the photopolymer resin contained in the vat is only between the second surface and the photopolymer resin. FIG. 7 illustrates an embodiment where at least one radiation source 130 is located below vat 140 containing photopolymer resin 150 and the contact between second surface 122 of reinforcing member 106 and the photopolymer resin contained in the vat is the result of the entire reinforcing member being submerged in the photopolymer resin. In either exemplary embodiment, the utilized reinforcing member may be wholly or partially translucent so that radiation may pass through the reinforcing member; or the reinforcing member may be opaque (as detailed in FIG. 12 and FIG. 13) or partially opaque so that radiation passes through the voids in the reinforcing member.

Radiation 135 may then be created by at least one radiation source 130 and directed from the at least one radiation source towards first surface 120 of reinforcing member 106 such that the radiation passes through the first surface of the reinforcing member to at least partially cure photopolymer resin in contact with second surface 122 of the reinforcing member to create at least a portion of a lock-on layer. In some embodiments, radiation 135 is enough to create the entire lock-on layer. The term "lock-on layer" is used to describe the layer of at least partially cured photopolymer resin that surrounds the reinforcing member. Lock-on layer may include the at least partially cured resin that surrounds first surface 120, second surface 122, the sidewall surfaces 42 of any foramina 40 (as detailed in FIG. 5), the side surfaces 30 of any voids 18 of reinforcing member 106 (as detailed in FIGS. 1-4), and or any other surface of the reinforcing member, such as the outer edges of the overall member. The radiation may be assisted to cure the photopolymer resin in contact with the second surface through any means known in the art, including, but not limited to, radiation strength or intensity, opaque photopolymer resin, and/or a build plate adjacent to or in contact with the second surface of the reinforcing member that stops/reflects the radiation once it travels through the reinforcing member.

Once the first portion of the lock-on layer is cured, in the embodiment illustrated in FIG. 6, reinforcing member 106 can be submerged into and/or the volume increased for the photopolymer resin 150. Reinforcing member 106 movement can be carried out through utilization of a reinforcing member support assembly such as a build plate (not shown) or a tensioned reinforcing member (i.e., between rollers not shown) moving by manual or computer control, or any other way known in the art of additive manufacturing—in order to facilitate this, computers may be programmed to move the reinforcing member 106 to move between or along predefined coordinates to form protuberance(s)/resinous framework. In the embodiment of FIG. 7, reinforcing member 106 is already submerged in photopolymer resin 150, so the reinforcing member and lock-on layer may be backed away from the bottom of vat 140, allowing photopolymer resin to flow between the lock-on layer and the bottom of the vat. In alternate embodiments, the upper surface of the photopolymer resin can be moved relative to the upper surface of the reinforcing member by adding an additional volume of resin and/or further submerging the build plate and reinforcing member, and optionally may accelerate leveling, filling and bubble removal by mechanical (e.g., wiping, extrusion, slot extrusion not shown) or thermal (e.g., pre-heating or heating the resin) means or combinations thereof. This reinforcing layer movement can be carried out through utilization of a reinforcing member support assembly such as a build plate (not shown) or a tensioned reinforcing member (i.e., between rollers not shown), moving by manual or computer control, or any other way known in the art of additive manufacturing—in order to facilitate this, computers may be programmed to move the reinforcing member and/or the build plate between or along predefined coordinates to form projection(s)/resinous framework. Build plate may be made of any material known in the art that can assist in reflecting/stopping the utilized radiation, for example, an opaque film, stainless steel, brushed aluminum or other metals known in the art. In either embodiment, photopolymer resin 150 is now in contact with first surface 120. In alternate embodiments, a build plate could be a clear film or solid material such as glass, quartz or polymer to enable transmission of radiation or polymer to allow diffusion of gas such as oxygen laminate, composite, rubber, hard rubber, rubber and polyurethane coated rolls (e.g. Ebonite brand, Goodyear Rubber, Rancho Cucamonga, Calif.), stainless steel, brushed aluminum or other metals known in the art. In either embodiment, photopolymer resin 150 is now in contact with first surface 120. In alternate embodiments, a build plate could be a clear film or solid material such as glass, quartz or polymer to enable transmission of radiation or polymer to allow diffusion of gas such as oxygen and/or as described in U.S. patent Ser. No. 10/414,090B2 issued on Sep. 17, 2019 in the name of A. El-Siblani et. al. or combinations thereof.

In a further embodiment of FIG. 7, the reinforcing member 106 may be submerged in photopolymer resin 150 to be above the bottom of vat 140, so that the reinforcing member 106 is wholly or partially above a dead zone (not shown) created by photoinhibitors (e.g., diffused gas such as oxygen, actinic radiation activated chemicals, and/or a dewetting phase (e.g. solid, aqueous solid, ice, solid tetraethylene glycol, solid PEG-200, solid PEG-400, solid PEG-600, solid polyethylene glycol, per-fluorinated solid, per-fluorinated solid comprising a solid perfluoropolyether, fluoro-gel comprises 2-(per-fluoroheyxl)ethyl acrylate swelled with per-fluoropolyether, fluorinated based liquids, perfluoro-n-alkanes, perfluoropolyethers, perfluoralkylethers, co-polymers of substantially fluorinated molecules, fluid with contact angle above 60° or above 90°, silicone liquids, liquid polymerized siloxanes, silicon oils, fluorinated oils, organic oils, oils, immiscible fluids with respect to photopolymer resin, insoluble fluids with respect to the photopolymer resin, densified salt solutions, densified sugar solutions, silicon-gel, organo-gel, aqueous hydro-gel, fluoro-gel, agar, agarose gels, polyacrylamide gels, starch gels, cationic gels, anionic gels, surfactants, fluorinated acrylic polymers (such as Capstone FS-22 and Capstone FS-83 from Dupont (Wilmington, Del., USA)), ionic surfactants, CTAB (hexadecyl-trimethylammonium bromide), CPC (cetylpyridinium chloride), DOAB (dimethyldioctadecylammonium bromide), SDS (sodium dodecyl sulfonate), SDBS (sodium dodecyl-benzenesulfonate), non-ionic surfactants, hexaethylene glycol mono-n-dodecyl ether, polyoxyethylene (2) sorbitan monolaurate (Tween-20; Polysorbate 20), Tyloxapol, or when present as liquid, optionally mobile or flowing; and combinations thereof) that is optionally optically transparent allowing 1% to 100% transmittance of actinic radiation, that is optionally cooled, that is optionally oxygenated; and combinations thereof) as described in U.S. Publication No. 2019/0160733A1 published on May 30, 2019 and International Publication No. WO 2017/210298A1 filed on May 31, 2017 in the name of C. Mirkin et. al. Once a lock-on layer is created with the reinforcing member 106, the reinforcing member and lock-on layer may be backed away from the bottom of vat 140 in a stepwise layer-by-layer or continuous manner as described in U.S. Publication No. 2019/0160733A1 published on May 30, 2019 and International Publication No. WO 2017/210298A1 filed on May 31, 2017 in the name of C. Mirkin et. al. International Publication No. WO 2019/164808A1 filed on Feb. 19, 2019 in the name of T. F. Scott et. al.; U.S. Publication No. 2018/0243976A1 published on Aug. 30, 2018 in the name of B. E. Feller; International Publication No. WO 2019/164808A1; U.S. patent Ser. No. 10/213,956B2 and U.S. patent Ser. No. 10/667,525B2 to K. Willis and B. J. Adzima; U.S. Patent Publication Nos. 2019/0134888 and 2019/0126534 to DeSimone et al.; WO2014/126837 to DeSimone et al.; and U.S. Patent Publication No. 2017/0120515 to J. P. Rolland et al. allowing photopolymer resin to flow between the lock-on layer and the bottom of the vat. Depending on the viscosity of the photopolymer resin, this flow may be aided by positive displacement of resin through the permeable reinforcing member and lock-on layer from a flow-through controlled build plate or via injection nozzles placed near the build plane (e.g., perpendicular to, angled to and/or planarly adjacent to).

Orientations embodied in FIG. 7 include a reinforcing member 106 that may supported by a build plate (not shown) that resembles a roller or drum. The build plate can be oriented to be horizontal, vertical or at any angle to promote travel of the reinforcing member into and out of or within the vat 140. This type of build plate can be driven and thereby controlled to rotate and advance the reinforcing member. One or more actinic radiation sources can be placed on either side or both sides of the upper and lower plane of the reinforcing member and create three-dimensional protuberances or shapes. The process of creating shapes may be adapted from partial and/or whole tomographic back projections as described in International Publication No. WO 2019/043529A1 filed on Aug. 23, 2018 in the name of D. Loterie et. al. and U.S. patent Ser. No. 10/647,061B2 issued on May 12, 2020 in the name of B. Kelly et. al.; U.S. Pat. No. 8,207,886B2 issued on Jun. 26, 2012 in the name of D. H. Chambers et. al.; and International Publication No. WO 2018/208378A3 filed on Mar. 27, 2018 in the name of B. Kelly et. al.

Radiation 135 may then be created by at least one radiation source 130 and directed from the at least one radiation source towards first surface 120 of reinforcing member 106 such that the radiation at least partially cures photopolymer resin in contact with the first surface of the reinforcing member to create at least a portion of a lock-on layer (not shown). In some embodiments, this portion of the lock-on layer in addition to the previously described portion of the lock-on layer (cured photopolymer resin in contact with second surface 122 of reinforcing member 106) will make up the entire lock-on layer.

In embodiments where reinforcing member 106 includes voids 18, radiation 135 may also be created by at least one radiation source 130 and directed from the at least one radiation source towards first surface 120 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portions of the lock-on layer (cured photopolymer resin in contact with the first and/or second surfaces of the reinforcing member) will make up the entire lock-on layer. In some embodiments, radiation 135 may be repeated to create at least a portion of the lock-on layer or make-up the entire lock-on layer.

In embodiments where reinforcing member 106 includes foramina 40, radiation 135 may also be created by at least one radiation source 130 and directed from the at least one radiation source towards first surface 120 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portions of the lock-on layer (cured photopolymer resin in contact with the first and/or second surfaces of the reinforcing member) will make up the entire lock-on layer. In some embodiments where reinforcing member 106 includes foramina 40, radiation 135 may be repeated to create at least a portion of the lock-on layer or make-up the entire lock-on layer.

After the lock-on layer is created through one or more of the steps described above, radiation 135 may be created by at least one radiation source 130 and directed towards first surface 120 of reinforcing member 106 to at least partially cure photopolymer in contact with the lock-on layer to create a build layer (not shown). In some embodiments, radiation 135 may be repeated with at least one radiation source 130 to create at least a portion of the build-up layer or make-up the entire build-up layer. An exemplary embodiment is that a portion of the lock-on layer and build layer can be created almost simultaneously or the entire lock-on layer and build layer can be created almost simultaneously and in some cases, is described as simultaneous photoinhibition and photoinitiation for three-dimensional printing in International Publication No. WO. 2019/164808A1 filed on Feb. 19, 2019 in the name of T. F. Scott et al. The term "build layer" is used to describe the layer(s) of at least partially cured photopolymer resin that is/are created upon the lock-on layer. The lock-on layer can be backed away from the bottom of vat 140, allowing photopolymer resin to flow between the lock-on layer and the bottom of the vat. In alternate embodiments of FIG. 6 and FIG. 7, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

The build layers stack on top of each other and create a structure that will resemble the resinous framework of traditional deflection members. The build layers may be individually identifiable, such that they appear to have seams between the individual build layers; alternatively, the build layers may stack on top of each other such that one build layer flows into the other, such that one build layer cannot be distinguished from another, such that the protuberance(s)/resinous framework formed resembles one that has been molded (i.e., the build layers forming the protuberance(s) are continuous and undefinable from each other). As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or may be between 1 and about 50,000. When creating the build layer(s), the reinforcing member/lock-on layer is moved further from radiation source 130 with creation of each successive or continuous build layer. Alternatively, the radiation source may be moved further away from the reinforcing member/lock-on layer may with creation of each successive or continuous build layer. This reinforcing layer/lock-on layer movement can be carried out through utilization of a build plate (not shown) moving by manual or computer control, or any other way known in the art of additive manufacturing—in order to facilitate this, computers may be programmed to move the reinforcing layer/lock-on layer and/or the build plate between or along predefined coordinates to form protuberance(s) and/or adjust (e.g. increase, decrease) the volume of photopolymer resin in the polymerization zone. Further, in embodiments where the radiation source moves or is reflected, the radiation source movement or reflection, or combination thereof, may be carried out through utilization of any means known in the art. Individual build layer thickness may represent incremental distance on the order of microns or linear distance rates—examples include, but are not limited to, 1000, 100, 10, 1 and/or 0.1 microns; or polymerized linear distance rates such as microns/sec, millimeters/min; polymerized area rates such as $micron^2/sec$, $millimeter^2/min$, $centimeter^2/min$; or volumetric polymerization rates $micron^3/sec$, $millimeter/min$, $centimeter^3/min$ or equivalent engineering conversions thereof respectively. Normalization procedures can be used to express performance as % of build (e.g., if volume of part V is set to equal 100%, then at a polymerized volume of 0.5V the part is 50% built). Build volume V and volumetric polymerization rate V/sec are divisible and used to determine the minimum total build time in seconds. Build time can be converted to be expressed in any unit of time (e.g. minutes, hours etc.).

While creating the lock-on layer and/or build layer(s), reinforcing member 106 may be tensioned to control warp while curing. Tension may occur in both planar and non-planar configurations where non-planar non-limiting example can be provided by hoop tension on a curved surface such as drum or roll. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical. Registration can be controlled or verified during a three-dimensional build by active control systems leveraging non-limiting control variables from imaging analysis (e.g., machine vision) or photosensors.

After the at least a portion of the lock-on layer is created, or after the entire lock-on layer is created, or after the entire lock-on layer and a portion of the build layer(s) are created, or after the entire lock-on layer and the entire build layer(s) are created, supplemental radiation may be created and directed towards the deflection member to further cure at least one of at least a portion of the lock-on layer and/or at least a portion of the build layer(s). The supplemental radiation may be created by at least one radiation source 130 described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

It should be understood for this First Method that the radiation source 130 may emit a first wavelength of radiation 135 and may also emit a second wavelength of radiation 135; the first and second wavelengths, which may be different, may each at least partially cure the photopolymer resin; or the first wavelength may (for example, in combination with a photoinhibitor and/or a photoabsorber) prevent curing or partial curing of the photopolymer resin in a first zone where the first wavelength reaches; but the second wavelength may, in a second zone where the second wavelength reaches, at least partially cure the photopolymer resin. In a non-limiting example, zones may be separated by a region that can resemble a plane (e.g., a X-Y plane parallel to an upper surface of the reinforcing member); or in some cases, zones can be volumetric regions that can traverse a plane (e.g., plane at the mid-point of the current build layer; or in the case of continuous layers, a layer distance can be calculated by a finite amount of elapsed time). The radiation source 130 may emit the first wavelength simultaneously with the second wavelength, or, alternatively, the radiation source 130 may emit the first wavelength for a first period of time, then emit the second wavelength for a second period of time; the first period of time and the second period of time may be the same, or the first period of time may be different than the second period of time. One or more elements at or near 130 may be employed and/or may function as/be a lens (e.g. condensing, bi-concave, bi-convex, plano-concave, plano-convex, aspheric condensing, etc) to aid in distributing the actinic radiation in a desired manner.

Figure 8:
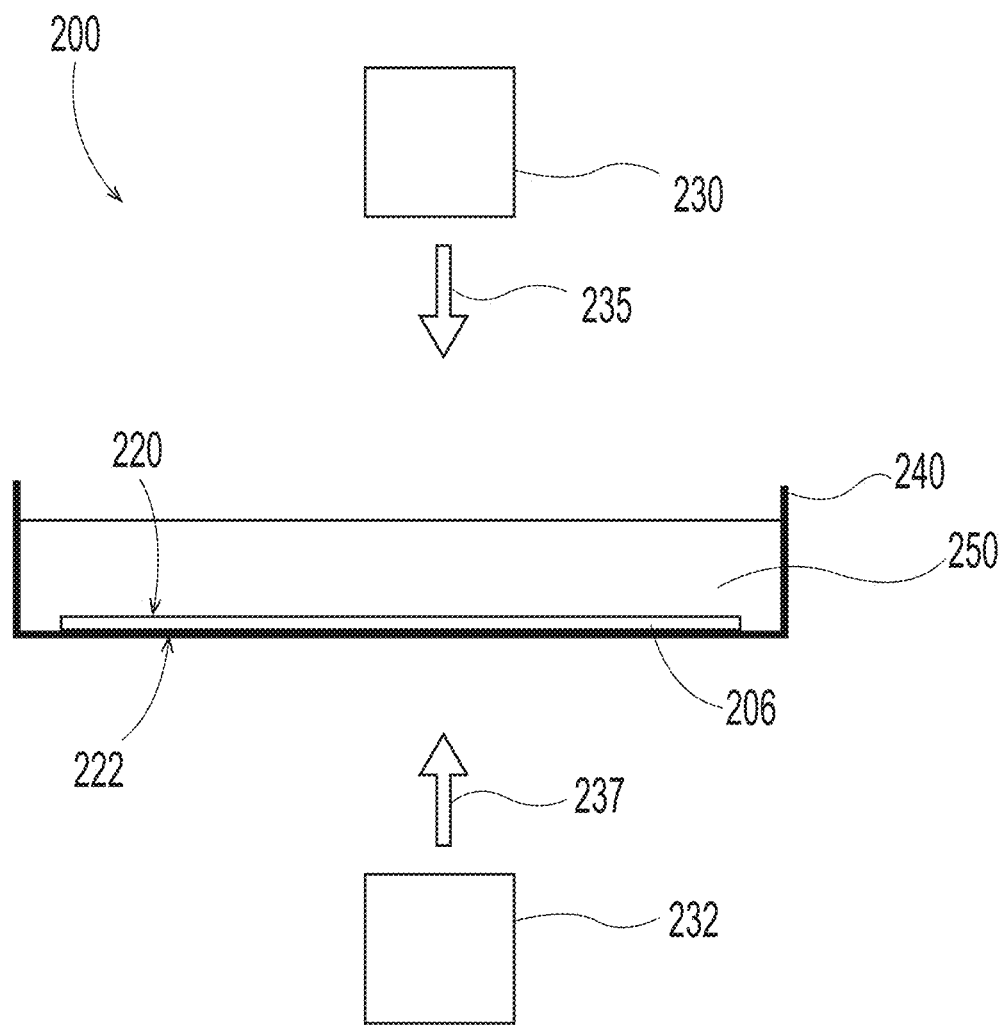
FIG. 8 is a schematic representation of system set up to employ in the additive methods as detailed herein.

Second Method:

In another method for manufacturing a deflection member depicted in FIG. 8, an additive manufacturing apparatus 200 is provided that includes at least one upper radiation source 230 and at least one lower radiation source 232 and a vat 240 containing photopolymer resin 250. A reinforcing member 206 is provided that has an upper surface 220 and a lower surface 222 opposite the upper surface. Reinforcing member 206 is submerged in photopolymer resin 250 contained in vat 240, such that lower surface 222 is in contact with the bottom of the vat. In some cases, the lower surface 222 may be parallel to and above the bottom of the vat 240 (e.g., above or partially within a dead zone). Adjusting the distance between the lower surface 222 and the bottom of vat 240 or above the dead zone (not shown) can eliminate adhesion to the bottom of the vat 240 and be used to control the thickness of the lock-on layer below the lower surface 222. A further embodiment of this method includes moving the reinforcing member during or after creation of the lock-on layer and/or protuberance(s). Relative to the vat 240, movement of the reinforcing member 206 may be in the MD and/or CD directions to enable discrete, semi-continuous or continuous creation of lock-on layers and protuberance(s). In a non-limiting example, movement of the reinforcing member may be achieved by at least two rollers (not shown) or at least one rotating drum (not shown). In this exemplary embodiment, the utilized reinforcing member may be wholly or partially translucent so that radiation may pass through the reinforcing member, but it may also be opaque.

Radiation 237 may then be created by at least one lower radiation source 232 and directed from the at least one lower radiation source towards lower surface 222 of reinforcing member 206 such that the radiation at least partially cures photopolymer resin in contact with lower surface 222 of the reinforcing member to create at least a portion of a lock-on layer (not shown). In some embodiments, radiation 237 is enough to create the entire lock-on layer. In some embodiments, radiation 237 from at least one lower radiation source 232 can be repeated to create the entire lock-on layer. The term "lock-on layer" is used to describe the layer of at least partially cured photopolymer resin that surrounds the reinforcing member. Lock-on layer may include the at least partially cured resin that surrounds upper surface 220, lower surface 222, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outer sides of the overall member. In some methods, radiation 237 from at least one lower radiation source 232 may create a lock-on layer that includes at least partially cured resin that contacts at least one of the upper surface 220, lower surface 222, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outers sides of the overall member. Accordingly, radiation 237 from at least one lower radiation source 232 may create the entire lock-on layer. In other methods, the portion of the lock-on layer described above may be combined with one or more of the portions of the lock-on layer described below to form the complete lock-on layer.

After (or during) the first portion of the lock-on layer is at least partially cured, in the embodiment illustrated in FIG. 8, reinforcing member 206 can be raised to the top of the vat containing photopolymer resin 250 so that the upper surface 220 is just below the upper surface of the photopolymer resin. Reinforcing member 206 movement can be carried out through utilization of a reinforcing member support assembly such as a build plate (not shown) or a tensioned reinforcing member (i.e., between rollers not shown) moving by manual or computer control, or any other way known in the art of additive manufacturing—in order to facilitate this, computers may be programmed to move the reinforcing member 206 between or along predefined coordinates to form protuberance(s). In alternate embodiments of FIG. 8, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

Radiation 235 may be optionally created by at least one upper radiation source 230 and directed from the at least one upper radiation source towards upper surface 220 of reinforcing member 206 such that the radiation at least partially cures photopolymer resin in contact with the upper surface of the reinforcing member to create at least a portion of a lock-on layer (not shown). In some embodiments, this portion of the lock-on layer in addition to the previously described portion of the lock-on layer (cured photopolymer resin in contact with lower surface 222 of reinforcing member 206) will make up the entire lock-on layer. In some embodiments, radiation 235 from at least one upper radiation source 230 can be repeated to create the entire lock-on layer.

In embodiments wherein reinforcing member 206 includes voids 18, radiation 235 and/or 237 may also be created by at least one radiation source 230,232 and directed from the at least one radiation source towards upper surface 220 and/or lower surface 222 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 206 includes voids 18, radiation 235 and/or 237 may be repeated simultaneously or alternating to create at least a portion of the lock-on layer or make-up the entire lock-on layer.

In embodiments wherein reinforcing member 306 includes foramina 40, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 206 includes foramina 40, radiation 235 and/or 237 may be repeated simultaneously or alternating to create at least a portion of the lock-on layer or make-up the entire lock-on layer.

After the lock-on layer is created through one or more of the steps described above, radiation 235 may be created by at least one upper radiation source 230 and directed towards upper surface 220 of reinforcing member 206 to at least partially cure photopolymer in contact with the lock-on layer to create one or more build layer(s) (not shown). The term "build layer" is used to describe the layer(s) of at least partially cured photopolymer resin that is/are created upon of the lock-on layer. In some embodiments, radiation 235 may be repeated with at least one upper radiation source 230 to create at least a portion of the build-up layer or make-up the entire build-up layer. An exemplary embodiment is that a portion of the lock-on layer and build layer can be created about simultaneously or the entire lock-on layer and build layer can be created about simultaneously. The term "build layer" is used to describe the layer(s) of at least partially cured photopolymer resin that is/are created upon the lock-on layer. The lock-on layer can be backed away from the top of the vat 222, allowing photopolymer resin to flow between the lock-on layer and the top of the vat. In alternate embodiments of FIG. 8, the upper surface of the photopolymer resin can be moved relative to the upper surface of the reinforcing member by adding an additional volume of resin and optionally may accelerate leveling and bubble removal by mechanical (e.g. wiping, not shown) or thermal (e.g. pre-heating or heating the resin) means or combinations thereof.

The build layers stack on top of each other and create a structure that will resemble the resinous framework of traditional deflection members. The build layers may be individually identifiable, such that they appear to have seams between the individual build layers; alternatively, the build layers may stack on top of each other such that one build layer flows into the other, such that one build layer cannot be distinguished from another, such that the protuberance formed resembles one that has been molded (i.e., the build layers forming the protuberance(s)/resinous framework are continuous and undefinable from each other). As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or between 1 and about 50,000. When creating the build layer(s), the reinforcing member/lock-on layer is moved further from radiation source 230 with creation of each successive build layer. Alternatively, the radiation source may be moved further away from the reinforcing member/lock-on layer may with creation of each successive build layer. This reinforcing layer/lock-on layer movement can be carried out through utilization of a build plate (not shown) moving by manual or computer control, or any other way known in the art of additive manufacturing—in order to facilitate this, computers may be programmed to move the reinforcing member/lock-on layer and/or the build plate between or along predefined coordinates to form protuberance(s) and the resinous framework. Further, in embodiments where the radiation source moves or is reflected, the radiation source movement or reflection, or combinations thereof, may be carried out through utilization of any means known in the art. Individual build layer thickness may represent incremental distance on the order of microns—examples include, but are not limited to, 1000, 100, 10, 1 and/or 0.1 microns.

While creating the lock-on layer and/or build layer(s), reinforcing member 106 may be tensioned to control warp while curing. Tension may occur in both planar and non-planar configurations. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical.

After the at least a portion of the lock-on layer is created, or after the entire lock-on layer is created, or after the entire lock-on layer and a portion of the build layer(s) are created, or after the entire lock-on layer and the entire build layer(s)

are created, supplemental radiation may be created and directed towards the deflection member to further cure at least one of at least a portion of the lock-on layer and/or at least a portion of the build layer(s). The supplemental radiation may be created by at least one radiation source 130 as described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

It should be understood for this Second Method that the upper radiation source 230 may emit a first wavelength of first radiation 235 and the lower radiation source 232 may emit a second wavelength of second radiation 237; and the first and second wavelengths 235, 237 may each cure or at least partially cure the photopolymer resin; or the first wavelength 235 may (for example, in combination with a photoinhibitor and/or a photoabsorber) prevent curing or partial curing of the photopolymer resin in a first zone where the first wavelength 235 reaches; but the second wavelength 237 may, in a second zone where the second wavelength 237 reaches, at least partially cure the photopolymer resin.

Figure 8A:
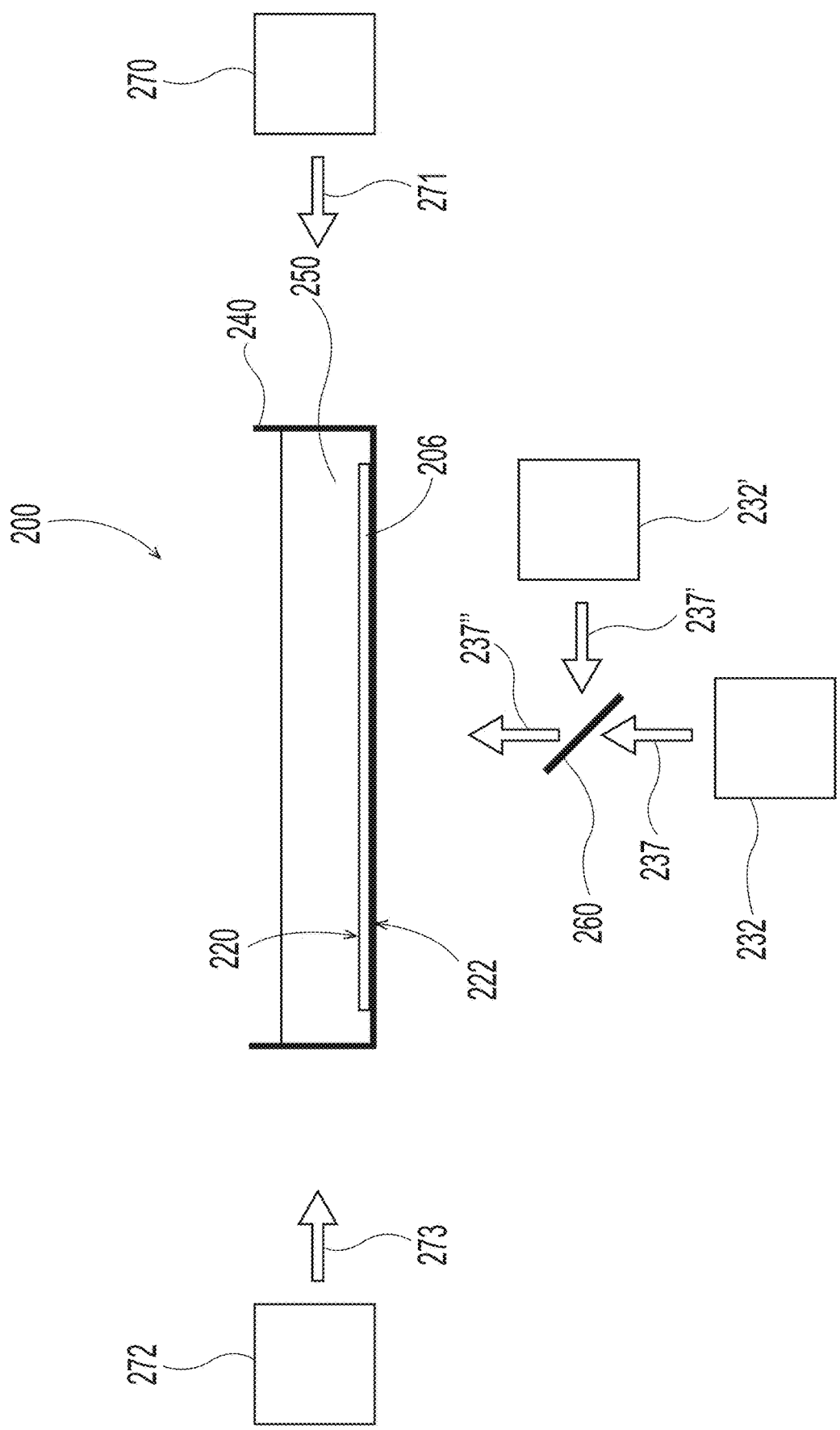
FIG. 8A is a schematic representation of system set up to employ in the additive methods as detailed herein.

It should also be understood for this Second Method that instead of an upper and lower radiation sources, that, as shown in FIG. 8A, there may be two lower radiation sources 232 and 232' and that a first lower radiation source 232 may emit a first wavelength of radiation 237 and that a second lower radiation source 232' may emit a second wavelength of radiation 237' to form a combined emission 237"; and the first and second wavelengths 237, 237' may each cure or at least partially cure the photopolymer resin; or the first wavelength 237 may (for example, in combination with a photoinhibitor and/or a photoabsorber) prevent curing or partial curing of the photopolymer resin in a first zone where the first wavelength 237 reaches; but the second wavelength 237' may, in a second zone where the second wavelength 237' reaches, at least partially cure the photopolymer resin; or the second wavelength 237' may (for example, in combination with a photoinhibitor and/or a photoabsorber) prevent curing or partial curing of the photopolymer resin in a second zone where the second wavelength 237' reaches; but the first wavelength 237 may, in a first zone where the first wavelength 237 reaches, at least partially cure the photopolymer resin. In some cases, the first zone and the second zone may at least partially overlap.

Likewise, for this Second Method, instead of using upper and lower radiation sources, that, as shown in FIG. 8B, there may be two upper radiation sources 230 and 230' and that a first upper radiation source 230 may emit a first wavelength of radiation 235 and that a second upper radiation source 230' may emit a second wavelength of radiation 235' to form a combined emission 235"; and the first and second wavelengths 235, 235' may each cure or at least partially cure the photopolymer resin; or the first wavelength 235 may (for example, in combination with a photoinhibitor and/or a photoabsorber) prevent curing or partial curing of the photopolymer resin in a first zone where the first wavelength 235 reaches; but the second wavelength 235' may, in a second zone where the second wavelength 235' reaches, at least partially cure the photopolymer resin; or the second wavelength 235' may (for example, in combination with a photoinhibitor and/or a photoabsorber) prevent curing or partial curing of the photopolymer resin in a second zone where the second wavelength 235' reaches; but the first wavelength 235 may, in a first zone where the first wavelength 235 reaches, at least partially cure the photopolymer resin. In some cases, the first zone and the second zone may at least partially overlap.

Figure 8C:
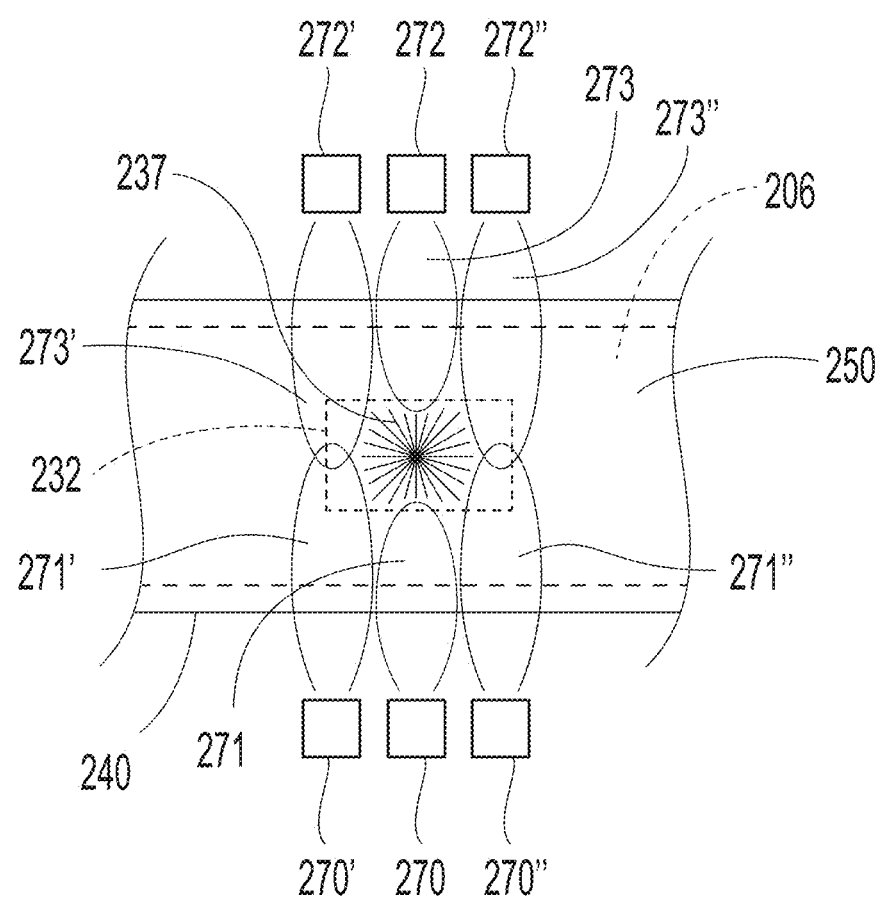
FIG. 8C is a schematic representation of system set up to employ in the additive methods as detailed herein.

With any of the embodiments described or illustrated in this Second Method, side radiation sources 270 and 272 (as illustrated in FIGS. 8A, B, and C) may be used to emit radiation 271 and 273. Radiation 271, 273 may be the same wavelength and may cure or partially cure the photopolymer resin, or may prevent curing or partial curing of the photopolymer resin. It may be desirable to use an upper and/or a lower radiation source (e.g., 230 and/or 232) to cure the photopolymer resin while using side radiation sources (e.g., 270 and 272, 270' 272' 270", 272") to prevent curing, such that protuberance shapes may be formed. It may also be desirable to use an upper radiation source to emit two wavelengths of radiation, one that cures and one that prevents curing of the photopolymer resin, in combination with side radiation sources that emit wavelengths that prevent curing of the photopolymer resin. Further, it may be desirable to use upper and lower radiation sources, each of which to emit two wavelengths of radiation, each having a wavelength that cures and each having a wavelength that prevents curing, in combination with two, three, four, five, six, or more side radiation sources (six side radiation sources illustrated in FIG. 8C). The combination of various curing (e.g., 237 in FIG. 8C) and cure preventing wavelengths (e.g., 271, 271', 272", 272, 272', 272" in FIG. 8C, which may be the same wavelength ranges or may have different wavelength ranges that prevent curing) as described may be used to form complex three-dimensional shapes of the protuberances 7 such as those disclosed in FIGS. 3A-D. The complex shapes (that may include cross-sectional shapes that have curved sidewalls, cross-sectional shapes that have non-linear side walls, cross-sectional shapes that have round or oval sidewalls, cross-sectional shapes that have sidewalls that extend at other than right angles from a support structure, and conical shapes), of the protuberances 7 disclosed in FIGS. 3A-D may be formed as described above, where photopolymer curing zone(s) (e.g. 237 in FIG. 8C) are formed and where zone(s) of curing inhibition (e.g., 271, 271', 272", 272, 272', 272" in FIG. 8C) are formed; these zones may be formed at the same time or may run in certain intervals, such that certain first zone(s) are on, then off, while certain other second zone(s) are off, when the first zone(s) are on, and are on when the first zone(s) are off—such first and second zones may pulse at intervals that last less than 2 seconds, 1 second, 0.5 seconds, 0.25 seconds, 0.1 seconds, 0.01 seconds, or 0.001 seconds.

Further, the radiation sources (e.g., 230, 230', 232, 232', 270, 270', 270", 272, 272', 272") may emit wavelengths of radiation (e.g., 235, 235', 237, 237', 271, 271', 271", 273, 273', 273") that are reflected and/or filtered by an element 260 (e.g., filters (such as dichroic filters), lenses (such as collimating lenses, condenser lenses, projection lenses, etc.), mirrors, optical integrators, prisms, etc.). For instance, FIG. 8A may be used to illustrate the following: where element 260 may filter out certain wavelengths of radiation from a first wavelength 237 and/or from a second wavelength 237' such that the combined emission 237" does not comprise certain wavelengths present in the first and/or second wavelengths 237 and 237'. Element 260 may be part of any of the Methods illustrated in FIGS. 6 and 7, as well, such that filters, concentrates, reflects, etc. wavelength 135. Multiple elements at or near 230, 230', 232, 232', 270, 270', 270", 260, 272, 272', and/or 272" may be employed and/or may function as/be a lens (e.g. condensing, bi-concave, bi-convex, plano-concave, plano-convex, aspheric condensing, etc) to aid in distributing the actinic radiation in a desired manner.

Figure 9:
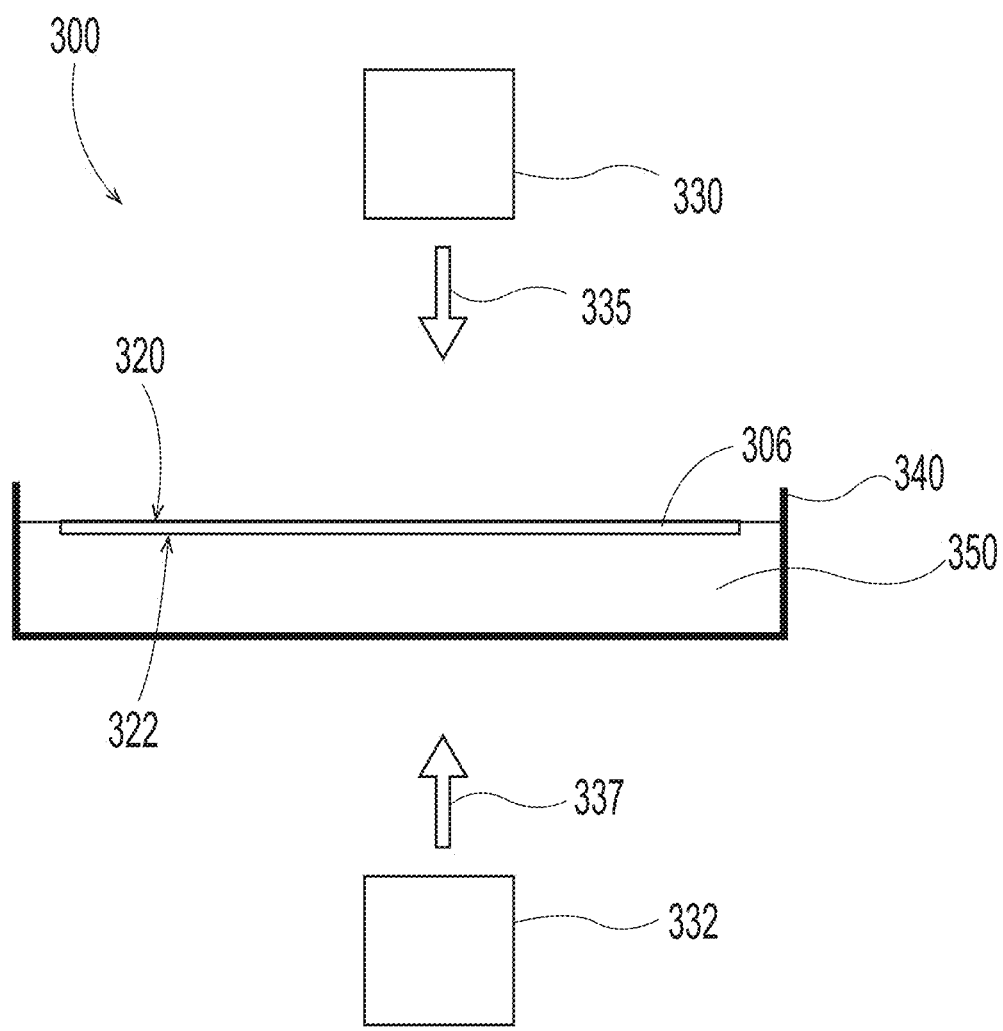
FIG. 9 is a schematic representation of system set up to employ in the additive methods as detailed herein.

Third Method:

In another method for manufacturing a deflection member depicted in FIG. 9, an additive manufacturing apparatus 300 is provided that includes at least one upper radiation source 330 and at least one lower radiation source 332 and a vat 340 containing photopolymer resin 350. A reinforcing member 306 is provided that has an upper surface 320 and a lower surface 322 opposite the upper surface. Reinforcing member 306 is submerged in photopolymer resin 350 contained in vat 340, such that the upper surface 320 is just below the upper surface of the photopolymer resin or at the upper surface of a dead zone (not shown) near the bottom of the vat 340. In this exemplary embodiment, the utilized reinforcing member may be wholly or partially translucent so that radiation may pass through the reinforcing member, but it may also be opaque.

Radiation 335 may then be created by at least one upper radiation source 330 and directed from the at least one upper radiation source towards upper surface 320 of reinforcing member 306 such that the radiation at least partially cures photopolymer resin in contact with upper surface 320 of the reinforcing member to create at least a portion of a lock-on layer (not shown). In some embodiments, radiation 335 is enough to create the entire lock-on layer. In some embodiments, radiation 335 from at least one upper radiation source 330 can be repeated to create the entire lock-on layer. The term "lock-on layer" is used to describe the layer of at least partially cured photopolymer resin that surrounds the reinforcing member. Lock-on layer may include the at least partially cured resin that surrounds upper surface 320, lower surface 322, the sidewall surfaces 42 of any foramina 40 (as detailed in FIG. 5), the side surfaces 30 of any voids 18 of reinforcing member 206 (as detailed in FIGS. 1-4), and or any other surface of the reinforcing member, such as the outers sides of the overall member. In some methods, radiation 335 from at least one upper radiation source 330 may create a lock-on layer that includes at least partially cured resin that contacts at least one of the upper surface 320, lower surface 322, the sidewall surfaces 42 of any foramina 40 (as detailed in FIG. 5), the side surfaces 30 of any voids 18 of reinforcing member 306 (as detailed in FIGS. 1-4), and or any other surface of the reinforcing member, such as the outers sides of the overall member. Accordingly, radiation 335 from at least one upper radiation source 330 may create the entire lock-on layer. In other methods, the portion of the lock-on layer described above may be combined with one or more of the portions of the lock-on layer described below to form the complete lock-on layer.

After (or during) the first portion of the lock-on layer is at least partially cured, in the embodiment illustrated in FIG. 9, reinforcing member 306 can be lowered to the bottom of vat 340 containing photopolymer resin 350 so that the lower surface 322 is in contact with the bottom of the vat or when present, raised above the dead zone to continuously cure and may create undefined layers. Reinforcing member 306 movement can be carried out through utilization of a reinforcing member support assembly such as a build plate (not shown) or a tensioned reinforcing member (i.e., between rollers not shown), moving by manual or computer control, or any other way known in the art of additive manufacturing—in order to facilitate this, computers may be programmed to move the reinforcing member 306 between or along predefined coordinates to form protuberance(s) and the resinous framework.

Radiation 337 may be optionally created by at least one lower radiation source 332 and directed from the at least one lower radiation source towards lower surface 322 of reinforcing member 306 such that the radiation at least partially cures photopolymer resin in contact with the lower surface of the reinforcing member to create at least a portion of a lock-on layer (not shown). In some embodiments, this portion of the lock-on layer in addition to the previously described portion of the lock-on layer (cured photopolymer resin in contact with upper surface 320 of reinforcing member 306) will make up the entire lock-on layer. In some embodiments, radiation 337 from at least one lower radiation source 332 can be repeated to create the entire lock-on layer.

In embodiments wherein reinforcing member 306 includes voids 18, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one side surface 30 of at least some of the voids to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 306 includes voids 18, radiation 335 and/or 337 may be repeated simultaneously or alternating to create at least a portion of the lock-on layer or make-up the entire lock-on layer.

In embodiments wherein reinforcing member 306 includes foramina 40, radiation 335 and/or 337 may also be created by at least one radiation source 330,332 and directed from the at least one radiation source towards upper surface 320 and/or lower surface 322 of the reinforcing member such that the radiation at least partially cures photopolymer resin in contact with at least one sidewall 42 of at least some of the foramina to create at least a portion of the lock-on layer (not shown). In some embodiments, this portion of the lock-on layer in addition to at least one of the previously described portion(s) of the lock-on layer (cured photopolymer resin in contact with the upper and/or lower surfaces of the reinforcing member) will make up the entire lock-on layer. In some embodiments where reinforcing member 306 includes foramina 40, radiation 335 and/or 337 may be repeated simultaneously or alternating to create at least a portion of the lock-on layer or make-up the entire lock-on layer.

After the lock-on layer is created through one or more of the steps described above, radiation 337 may be created by at least one lower radiation source 332 and directed towards lower surface 322 of reinforcing member 306 to at least partially cure photopolymer in contact with the lock-on layer to create a build layer (not shown). The term "build layer" is used to describe the layer(s) of at least partially cured photopolymer resin that is/are created upon of the lock-on layer. In some embodiments, radiation 337 may be repeated with at least one lower radiation source 332 to create at least a portion of the build-up layer or make-up the entire build-up layer. An exemplary embodiment is that a portion of the lock-on layer and build layer can be created about simultaneously or the entire lock-on layer and build layer can be created about simultaneously. The term "build layer" is used to describe the layer(s) of at least partially cured photopolymer resin that is/are created upon the lock-on layer. The lock-on layer can be backed away from the bottom of the vat, allowing photopolymer resin to flow between the lock-on layer and the bottom of the vat. In alternate embodiments of FIG. 9, the lower surface of the photopolymer resin can be moved relative to the upper surface of the reinforcing member by moving of the entire vat, or the bottom portion of the vat.

The build layers stack on top of each other and create a structure that will resemble the resinous framework of traditional deflection members. The build layers may be individually identifiable, such that they appear to have seams between the individual build layers; alternatively, the build layers may stack on top of each other such that one build layer flows into the other, such that one build layer cannot be distinguished from another, such that the protuberance/resinous framework formed resembles one that has been molded (i.e., the build layers forming the protuberance/resinous framework are continuous and undefinable from each other). As described above, the build layers created by additive manufacturing in the methods detailed herein that form the resinous framework equivalent of traditional deflection members may be in any shape, style or structure now known, or known in the future. The number of build layers that build on top of one another (with the bottom build layer contacting the lock-on layer) may be between 1 and about 500, or may be between 1 and about 300, or may be between 1 and about 200, or may be between 1 and about 150, or may be between 1 and about 100, or may be between 1 and about 75, or may be between 1 and about 50, or may be between 1 and about 25, or may be between 1 and about 50,000. When creating the build layer(s), the reinforcing member/lock-on layer is moved further from radiation source 332 with creation of each successive build layer. Alternatively, the radiation source may be moved further away from the reinforcing member/lock-on layer may with creation of each successive build layer. This reinforcing layer/lock-on layer movement can be carried out through utilization of a build plate (not shown) moving by manual or computer control, or any other way known in the art of additive manufacturing—in order to facilitate this, computers may be programmed to move the reinforcing layer/lock-on layer and/or the build plate between or along predefined coordinates to form protuberance(s)/resinous framework. Further, in embodiments where the radiation source moves or is reflected, the radiation source movement or reflection, or combination thereof, may be carried out through utilization of any means known in the art. Individual build layer thickness may represent incremental distance on the order of microns—examples include, but are not limited to, 1000, 100, 10, 1 and/or 0.1 microns.

While creating the lock-on layer and/or build layer(s), reinforcing member 306 may be tensioned to control warp while curing. Tension may occur in both planar and non-planar configurations. The build layers may be registered with the previous layer. Other shapes may be created by practicing one or more layers in an unregistered fashion relative to the previous layer. Registration is defined as positioning an X-Y region along a Z axis that is common to all layers within a shape—an example would be stacking layers to create a symmetrical shape. Other methods of stacking may require positioning that is off-center for a given X-Y region but registered with the previous layer to preserve continuity in one or more side walls. Lastly, it is possible that registered stacking is substantially symmetrical rather than perfectly symmetrical.

After the at least a portion of the lock-on layer is created, or after the entire lock-on layer is created, or after the entire lock-on layer and a portion of the build layer(s) are created, or after the entire lock-on layer and the entire build layer(s) are created, supplemental radiation may be created and directed towards the deflection member to further cure at least one of at least a portion of the lock-on layer and/or at least a portion of the build layer(s). The supplemental radiation may be created by at least one radiation source 330 or 332 described above, or may be created by at least one supplemental radiation source (not shown). The at least one supplemental radiation source may be located on the same side of the reinforcing member as the at least one radiation source, or may be located on the opposite side of the reinforcing member of the at least one radiation source, or in some embodiments on both sides.

It should be understood for this Third Method that the upper radiation source 330 may emit a first wavelength of first radiation 335 and the lower radiation source 332 may emit a second wavelength of second radiation 337; and the first and second wavelengths 335, 337 may each at least partially cure the photopolymer resin; or the first wavelength 335 may (for example, in combination with a photoinhibitor and/or a photoabsorber) prevent curing or partial curing of the photopolymer resin in a first zone where the first wavelength 335 reaches; but the second wavelength 337 may, in a second zone where the second wavelength 337 reaches, at least partially cure the photopolymer resin; or the second wavelength 337 may (for example, in combination with a photoinhibitor and/or a photoabsorber) prevent curing or partial curing of the photopolymer resin in a second zone where the second wavelength 337 reaches; but the first wavelength 335 may, in a first zone where the first wavelength 335 reaches, at least partially cure the photopolymer resin. In some cases, the first zone and the second zone may at least partially overlap.

Figure 9A:
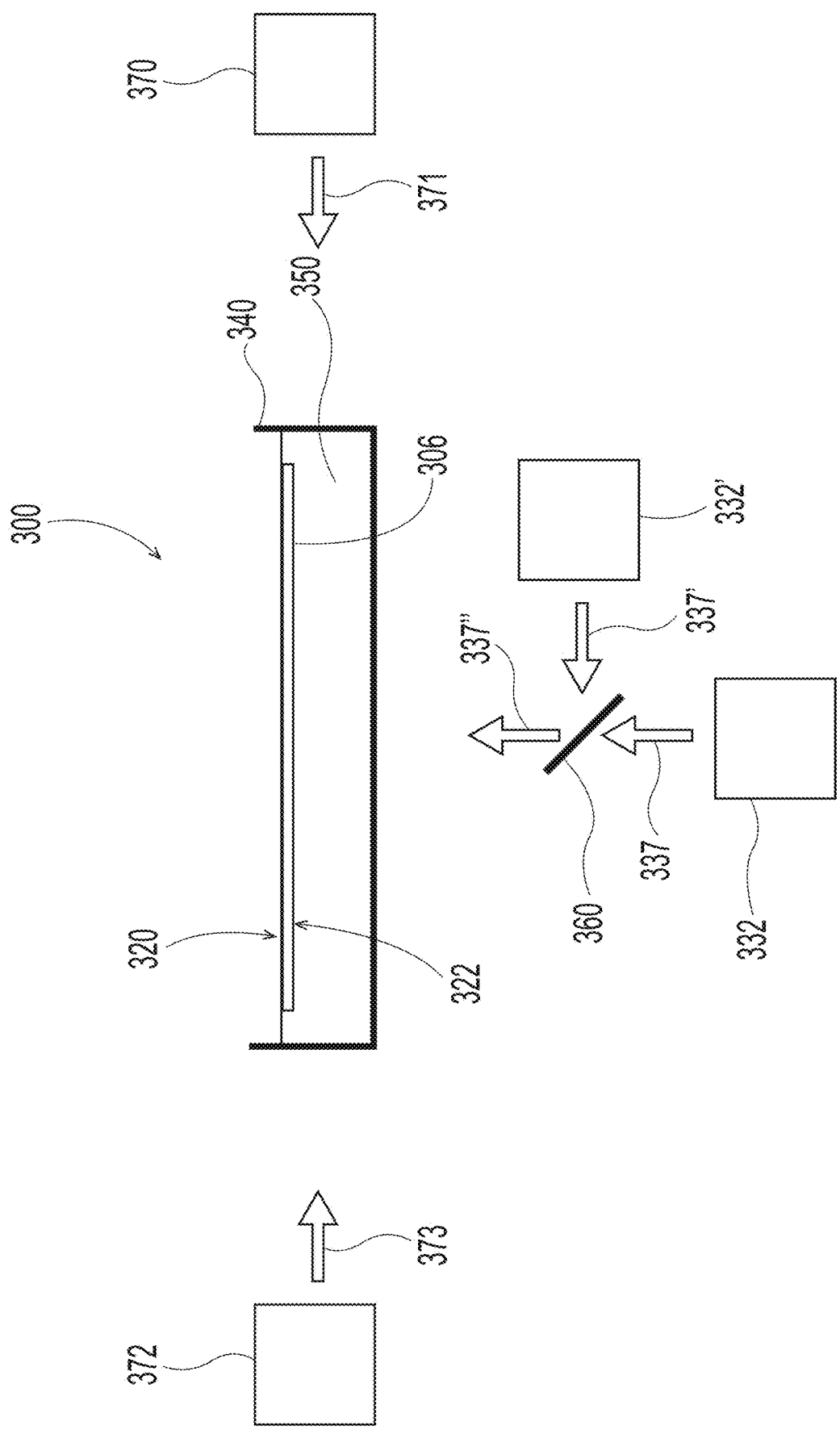
FIG. 9A is a schematic representation of system set up to employ in the additive methods as detailed herein.

It should also be understood for this Third Method that instead of an upper and lower radiation sources, that, as shown in FIG. 9A, there may be two lower radiation sources 332 and 332' and that a first lower radiation source 332 may emit a first wavelength of radiation 337 and that a second lower radiation source 332' may emit a second wavelength of radiation 337' to form a combined emission 337"; and the first and second wavelengths 337, 337' may each cure or at least partially cure the photopolymer resin; or the first wavelength 337 may (for example, in combination with a photoinhibitor and/or a photoabsorber) prevent curing or partial curing of the photopolymer resin in a first zone where the first wavelength 337 reaches; but the second wavelength 337' may, in a second zone where the second wavelength 337' reaches, at least partially cure the photopolymer resin; or the second wavelength 337' may (for example, in combination with a photoinhibitor and/or a photoabsorber) prevent curing or partial curing of the photopolymer resin in a second zone where the second wavelength 337' reaches; but the first wavelength 337 may, in a first zone where the first wavelength 337 reaches, at least partially cure the photopolymer resin. In some cases, the first zone and the second zone may at least partially overlap.

Figure 9B:
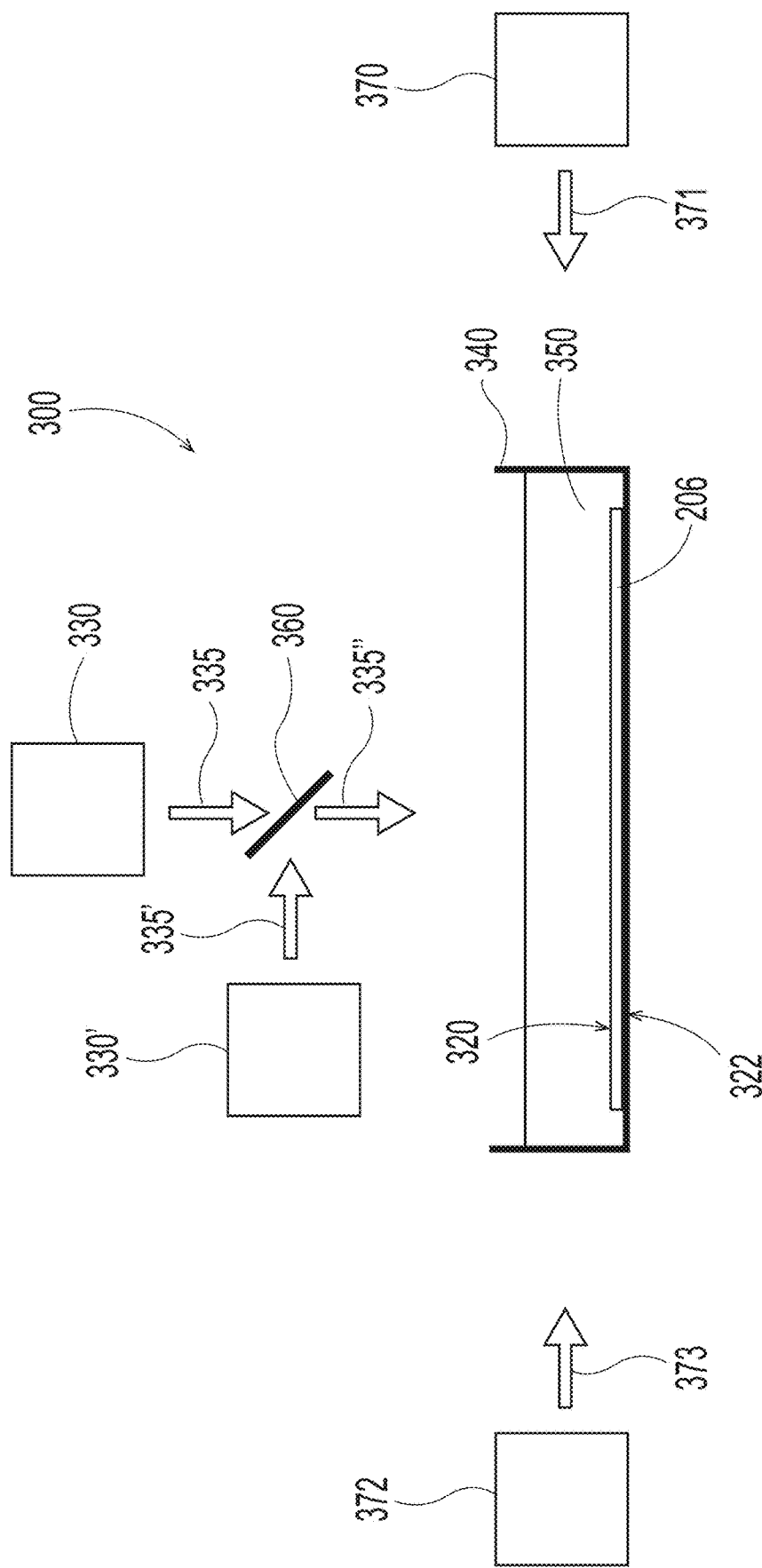
FIG. 9B is a schematic representation of system set up to employ in the additive methods as detailed herein.

Likewise, for this Third Method, instead of using upper and lower radiation sources, that, as shown in FIG. 9B, there may be two upper radiation sources 330 and 330' and that a first upper radiation source 330 may emit a first wavelength of radiation 335 and that a second upper radiation source 330' may emit a second wavelength of radiation 335' to form a combined emission 335"; and the first and second wavelengths 335, 335' may each cure or at least partially cure the photopolymer resin; or the first wavelength 335 may (for example, in combination with a photoinhibitor and/or a photoabsorber) prevent curing or partial curing of the photopolymer resin in a first zone where the first wavelength 335 reaches; but the second wavelength 335' may, in a second zone where the second wavelength 335' reaches, at least partially cure the photopolymer resin; or the second wavelength 335' may (for example, in combination with a photoinhibitor and/or a photoabsorber) prevent curing or partial curing of the photopolymer resin in a second zone where the second wavelength 335' reaches; but the first wavelength 335 may, in a first zone where the first wavelength 335 reaches, at least partially cure the photopolymer resin. In some cases, the first zone and the second zone may at least partially overlap. With any of the embodiments described or illustrated in this Third Method, side radiation sources 370 and 372 (as illustrated in FIGS. 9A, B, and C) may be used to emit radiation 371 and 373. Radiation 371, 373 may be the same wavelength and may cure or partially cure the photopolymer resin, or may prevent curing or partial curing of the photopolymer resin. It may be desirable to use an upper and/or a lower radiation source (e.g., 330 and/or 332) to cure the photopolymer resin while using side radiation sources (e.g., 370 and 372) to prevent curing, such that protuberance/resinous framework shapes may be formed.

Figure 9C:
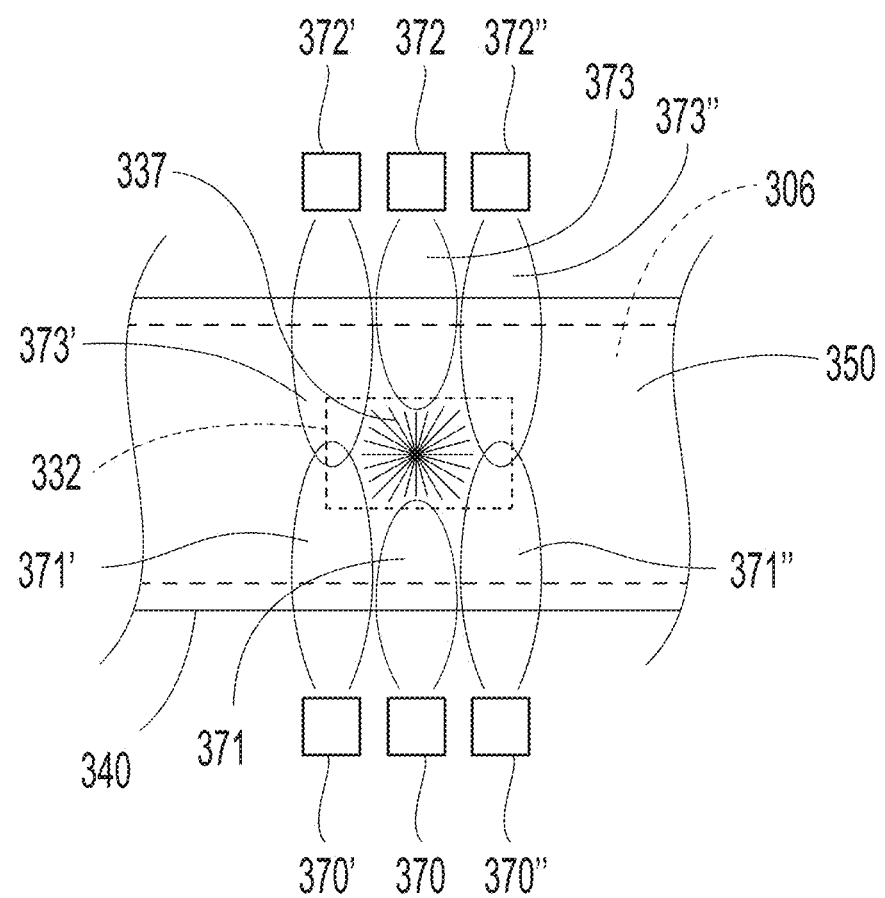
FIG. 9C is a schematic representation of system set up to employ in the additive methods as detailed herein.

It may also be desirable to use an upper radiation source to emit two wavelengths of radiation, one that cures and one that prevents curing of the photopolymer resin, in combination with side radiation sources that emit wavelengths that prevent curing of the photopolymer resin. Further, it may be desirable to use upper and lower radiation sources, each of which to emit two wavelengths of radiation, each having a wavelength that cures and each having a wavelength that prevents curing, in combination with two, three, four, five, six, or more side radiation sources (six side radiation sources illustrated in FIG. 9C). The combination of various curing (e.g., 337 in FIG. 9C) and cure preventing wavelengths (e.g., 371, 371', 372'', 372, 372', 372'' in FIG. 9C) as described may be used to form complex three-dimensional shapes of the deflection elements such as those disclosed in FIGS. 3A-D.

Further, the radiation sources (e.g., 330, 330', 332, 332', 370, 370', 370'', 372, 372', 372'') may emit wavelengths of radiation (e.g., 335, 335', 337, 337', 371, 371', 371'', 373, 373', 373'') that are reflected and/or filtered by an element 360 (e.g., filters (such as dichroic filters), lenses (such as collimating lenses, condenser lenses, projection lenses, etc.), mirrors, optical integrators, prisms, etc.). For instance, FIG. 9A may be used to illustrate the following: where element 360 may filter out certain wavelengths of radiation from a first wavelength 337 and/or from a second wavelength 337' such that the combined emission 337'' does not comprise certain wavelengths present in the first and/or second wavelengths 337 and 337'. Element 360 may be part of any of the Methods illustrated in FIGS. 6 and 7, as well, such that filters, concentrates, reflects, etc. wavelength 135. Multiple elements at or near 330, 330', 332, 332', 370, 370', 370'', 360, 372, 372', and/or 372'' may be employed and/or may function as/be a lens (e.g. condensing, bi-concave, bi-convex, plano-concave, plano-convex, aspheric condensing, etc) to aid in distributing the actinic radiation in a desired manner.

Example Methods

Examples I, II, III and IV use real-time FT-IR to demonstrate actinic radiation control of photopolymerization through photoinhibition processes. External UV- and/or Blue-light source assemblies were placed on top of an ATR sans a specimen anvil.

Light intensities (as Output, milliwatts (mW)) at the specified wavelength were measured using Thorlabs PM160T s/n 401749 power meter at a distance about equal to the distance of the resin from the source.

Real-time Fourier Transform Infrared (FT-IR) spectra of the photopolymer resins, were recorded before, during and after exposure to actinic radiation. Background scans were performed on each sample holder (i.e. 2 layers of about 1-in$^2$ polyester film—about optically transparent to actinic radiation sources). One drop of photopolymer resin was placed between the film layers while centered above the diamond crystal window of the ATR. The actinic radiation sources and FTIR/ATR were shrouded from ambient light and room lights were turned off. A Nicolet iS50 FT-IR spectrometer (Omnic version 9.5.9) with a Smart Golden Gate Diamond ATR (attenuated total reflectance) with ZnSe Lenses (ThermoScientific, Madison, Wis., USA) was used and collected in the range of 525-4000 cm$^{-1}$ with a resolution of 2 cm$^{-1}$ and 2 co-added scans per spectrum. Automatic atmospheric suppression was used in the experimental setup and final spectral format was reported as Absorbance. The number of scans were 2 for each spectrum. The data collection type was "real time" with a sampling interval of 5.02 seconds with 192 spectra collected in the time series. Time series data were exported to Excel. In Excel, an average baseline was determined as the average absorbance between about 1575 and 1660 cm$^{-1}$. An average value was calculated for all 192 spectra and used as an adjusted baseline. Peak height values at about 1601 and 1637 cm$^{-1}$ were calculated from the adjusted baseline. The peak height at about 1637 cm$^{-1}$ was monitored for aliphatic C=C conversion related to polymerization. The peak height at about 1601 cm$^{-1}$ was used as an internal standard to calculate the degree of conversion described by changes in peak height at about 1637 cm$^{-1}$ using the following equation:

% Degree of conversion (DC %)=100−[(peak height 1637 cm$^{-1}$/peak height 1601 cm$^{-1}$)$_{after\ cure}$/ (peak height 1637 cm$^{-1}$/peak height 1601 cm$^{-1}$)$_{before\ cure}$]×100.

Example I

This Example I discloses an inventive method within the scope of the present disclosure where Example IA demonstrates curing due to photoinitiation in the absence of a radiation source for photoinihibition; and other examples demonstrate photoinitiation slowed due to a UV radiation source, UV absorber and photoinhibitor (Example IB: about 10×UV mW to Blue mW ratio; Example IC: about 2×UV mW to Blue mW ratio):

| Radiation | Position[1] | Type | Wavelength Range (nm), Peak (nm) | Output (mW) | Time (min) Source turned ON | Time (min) Source turned OFF | Result[2] |
|---|---|---|---|---|---|---|---|
| Example IA | | | | | | | |
| Source 1 | Upper Reflected | UV | 350-400, 367 | N\A | N\A | N\A | Growth Rate |
| Source 2 | Upper | Blue | 425-525, 465 | 3.5 | 2 | 16 | 0.2067/min; % DC: 80.9 |

-continued

| Radiation | Position[1] | Type | Wavelength Range (nm), Peak (nm) | Output (mW) | Time (min) Source turned ON | Time (min) Source turned OFF | Result[2] |
|---|---|---|---|---|---|---|---|
| Example IB ||||||||
| Source 1 | Upper Reflected | UV | 350-400, 367 | 34 | 4 | 16 | 4.84 min Inhibition; Growth Rate 0.2776/min; % DC: 82.9 |
| Source 2 | Upper | Blue | 425-525, 465 | 3.5 | 2 | 16 | |
| Example IC ||||||||
| Source 1 | Upper Reflected | UV | 350-400, 367 | 7 | 4 | 16 | 4.06 min Inhibition; Growth Rate 0.2082/min; % DC: 79.9 |
| Source 2 | Upper | Blue | 425-525, 465 | 3.5 | 2 | 16 | |

Radiation Source 1: ThorLabs M365LP1 LED equipped with a ThorLabs aspherical collimating lens (SM2F32-A) passed light through an iris (about 25% closed, Thorlabs SM2D25D) with custom pulsed-width modulator to supply about maximum forward voltage 4 V and about maximum 1700 mA and output ranging from minimum 1150 mW to typical 1400 mW.
Radiation Source 2: Thorlabs M470 L4-C4 LED (465 nm centered) with Zeiss COP4-A lens and output ranging from minimum 760 mW to typical 965 mW at maximum current 1000 mA. Thorlabs LED D1B LED driver set to regulate to a maximum current of 1000 mA.
Radiation Sources 1 and 2 were coupled using a Thorlabs LC6W cage cube with LB3C/M kinematic stage holding a dichroic cut-on filter (longpass, DMLP425L) at 45° to each Radiation Source.
[1]Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250).
[2]"Growth" is the curing or partial curing of the photopolymer resin resulting from monomer polymerization and photoinitiators interacting with the radiation source as measured at a composition dependent frequency absorbance height ratio (e.g. internal standard/1637 cm$^{-1}$); "inhibition" is the delay or prevention of curing or partial curing of the photopolymer resulting from photoinhibitors and/or photoabsorbers interacting with the radiation source. The growth rate is determined from ATR FT-IR (attenuated total reflectance Fourier transform-infra-red) spectral series result for the time evolved height ratio after performing a non-linear regression in JMP Pro 15.0.0 (390308) to fit as a Gompertz 4P sigmoid curve between 4 min and 16 min. Growth rate is one of four parameter estimates from the Gompertz 4P fit (others are lower asymptote, upper asymptote and inflection point). First, second and third derivatives (by central difference as described by W. J. Orvis, 1987) can be used to characterize the non-linear regression. Other models can be used to characterize - a non-limiting example is described in Bentea et al (2017) as the Finke-Watzky model; for polymerization processes interrupted by inhibition, a step-wise modeling approach (e.g. 2 partial sigmoids or 2 partially overlapping sigmoids) may be needed rather than one sigmoid. The third derivative can be used to describe where the acceleration is zero as growth dominates inhibition or inhibition ceases in favor of growth.
JMP Prediction Model: Gompertz 4P sigmoid
Height Ratio (Predictor) = $a + (b - a) \times \mathrm{Exp}(-\mathrm{Exp}(-c \times (\mathrm{Time} - d)))$ where a = lower asymptote, b = upper asymptote, c = growth rate, and d = inflection point
W. J. Orvis. 1987. Ch 7. Summation of Series in "1-2-3 for Scientists & Engineers". Sybex, San Francisco, CA. p. 208
L. Bentea, M. A. Watzky, and R. G. Finke. 2017. Sigmoidal Nucleation and Growth Curves Across Nature Fit by the Finke-Watzky Model of Slow Continuous Nucleation and Autocatalytic Growth: Explicit Formulas for the Lag and Growth Times Plus Other Key Insights. J. Phys. Chem. C. 121: 5302-5312.

Photopolymer Resin (e.g., 150, 250, 350) (in a Vat)
1. 92.08 (monomer)(about 92.07-92.09% by weight)
2. 4.99 (photoinhibitor)(about 4.98-5.00% by weight)
3. 1.48 (photoinitiator system)(about 1.47-1.49% by weight)
4. 0.99 (second wavelength photoabsorber)(0.98-1.00% by weight)
5. 0.46 (stabilizer)(0.45-0.47% by weight)
5. Negligible (solvent)(about 0% by weight due to overnight vacuum evaporation)

Reinforcing Member (e.g., 106, 206, 306)

Alternately to placing resin between two film layers, a reinforcing member can be incorporated in this embodiment in any form described in this specification and may be fully or partially submerged in the photopolymer resin of this Example I.

Deflection Member (e.g., 2)

Alternately to a drop of resin, a larger volume (i.e., in a vat) can be used to make a deflection member by the curing or partial curing of the photopolymer resin of this Example I by the radiation source(s) of this Example I to form lock-on and build layers; and the deflection member of this Example I may be in any form described in this specification.

Example II

This Example II discloses an inventive method within the scope of the present disclosure where Example IIA demonstrates curing due to photoinitiation in the absence of a radiation source for photoinihibition; and other examples demonstrate photoinitiation slowed due to a UV radiation source and a photoinhibitor.

| Radiation | Position[1] | Type | Wavelength Range (nm), Peaks (nm) | Output (mW) | Time (min) Source turned ON | Time (min) Source turned OFF | Result[2] |
|---|---|---|---|---|---|---|---|
| Example IIA ||||||||
| Source 1 | Upper Reflected | UV | 350-400, 367 | N\A | N\A | N\A | Growth Rate 0.79/min; % DC: 91.5 |
| Source 2 | Upper | DLP (white-BGR) | 425-660; 462, 523, 630 | 33 | 2 | 16 | |

-continued

| Radiation | Position[1] | Type | Wavelength Range (nm), Peaks (nm) | Output (mW) | Time (min) Source turned ON | Time (min) Source turned OFF | Result[2] |
|---|---|---|---|---|---|---|---|
| | | | Example IIB | | | | |
| Source 1 | Upper Reflected | UV | 350-400, 367 | 38 | 2.25 | 16 | 1.24 min Inhibition; |
| Source 2 | Upper | DLP (white-BGR) | 425-660; 462, 523, 630 | 33 | 2 | 16 | Growth Rate 1.28/min; % DC: 89.0 |

Radiation Source 1: ThorLabs M365LP1 LED equipped with a ThorLabs aspherical collimating lens (SM2F32-A) passed light through an iris (about 25% closed, Thorlabs SM2D25D) with custom pulsed-width modulator to supply about maximum forward voltage 4 V and about maximum 1700 mA and output ranging from minimum 1150 mW to typical 1400 mW.
Radiation Source 2: Optoma ML750 WXGA 700 Lumen DLP LED projector with 255 white grayscale image. A condensing lens was placed in the side of Thorlabs LC6W cage cube to focus the DLP projected image on the plane parallel to opposite face of the cage cube.
Radiation Sources 1 and 2 were coupled using a Thorlabs LC6W cage cube with LB3C/M kinematic stage holding a dichroic cut-on filter (longpass, DMLP425L) at 45° to each Radiation Source.
[1]Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250).
[2]"Growth" is the curing or partial curing of the photopolymer resin resulting from monomer polymerization and photoinitiators interacting with the radiation source as measured at a composition dependent frequency absorbance height ratio (e.g. internal standard/1637 $cm^{-1}$); "inhibition" is the delay or prevention of curing or partial curing of the photopolymer resulting from photoinhibitors and/or photoabsorbers interacting with the radiation source. The growth rate is determined from ATR FT-IR (attenuated total reflectance Fourier transform-infra-red) spectral series result for the time evolved height ratio after performing a non-linear regression in JMP Pro 15.0.0 (390308) to fit as a Gompertz 4P sigmoid curve between 4 min and 16 min. Growth rate is one of four parameter estimates from the Gompertz 4P fit (others are lower asymptote, upper asymptote and inflection point). First, second and third derivatives (by central difference as described by W. J. Orvis, 1987) can be used to characterize the non-linear regression. Other models can be used to characterize - a non-limiting example is described in Bentea et al (2017) as the Finke-Watzky model; for polymerization processes interrupted by inhibition, a step-wise modeling approach (e.g. 2 partial sigmoids or 2 partially overlapping sigmoids) may be needed rather than one sigmoid.. The third derivative can be used to describe where the acceleration is zero as growth dominates inhibition or inhibition ceases in favor of growth.
JMP Prediction Model: Gompertz 4P sigmoid
Height Ratio (Predictor) = $a + (b - a) \times Exp(-Exp(-c \times (Time - d)))$ where a = lower asymptote, b = upper asymptote, c = growth rate, and d = inflection point Photopolymer Resin (e.g., 150, 250, 350) (in a Vat)
1. 97.53 (monomer)(about 96.50-98.50% by weight)
2. 0.99 (photoinhibitor)(about 0.98-1.00% by weight)
3. 1.48 (photoinitiator system)(about 1.47-1.49% by weight)
4. Negligible (solvent)(about 0% by weight due to overnight vacuum evaporation)

Reinforcing Member (e.g., 106, 206, 306)

Alternately to placing resin between two film layers, a reinforcing member can be incorporated in this embodiment in any form described in this specification and may be fully or partially submerged in the photopolymer resin of this Example II.

Deflection Member (e.g., 2)

Alternately to a drop of resin, a larger volume (i.e., in a vat) can be used to make a deflection member by the curing or partial curing of the photopolymer resin of this Example II by the radiation source(s) of this Example II to form lock-on and build layers; and the deflection member of this Example II may be in any form described in this specification.

Example III

This Example III discloses an inventive method within the scope of the present disclosure where Example IIIA demonstrates no photoinitiation from UV source as formulated; and Examples IIIB and IIIC demonstrate photoinitiation slowed due to a UV radiation source and photoinhibitor.

| Radiation | Position[1] | Type | Wavelength Range (nm), Peak (nm) | Output (mW) | Time (min) Source turned ON | Time (min) Source turned OFF | Result[2] |
|---|---|---|---|---|---|---|---|
| | | | Example IIIA | | | | |
| Source 1 | Upper Reflected | UV | 350-400, 367 | 6.05 | 2 | 16 | Growth Rate |
| Source 2 | Upper | Blue | 427-533, 462 | N/A | N/A | N/A | 0.00/min; % DC: −0.73 |
| | | | Example IIIB | | | | |
| Source 1 | Upper Reflected | UV | 350-400, 367 | 1.95 | 4 | 16 | 4.03 min Inhibition; |
| Source 2 | Upper | Blue | 427-533, 462 | 4.2 | 2 | 16 | Growth Rate 0.296/min; % DC: 86.4 |

-continued

| Radiation | Position[1] | Type | Wavelength Range (nm), Peak (nm) | Output (mW) | Time (min) Source turned ON | Time (min) Source turned OFF | Result[2] |
|---|---|---|---|---|---|---|---|
| | | | Example IIIC | | | | |
| Source 1 | Upper Reflected | UV | 350-400, 367 | 39.2 | 4 | 16 | 2.21 min Inhibition; |
| Source 2 | Upper | Blue | 427-533, 462 | 4.2 | 2 | 16 | Growth Rate 0.834/min; % DC: 89.2 |

Radiation Source 1: ThorLabs M365LP1 LED equipped with a ThorLabs aspherical collimating lens (SM2F32-A) passed light through an iris (about 25% closed, Thorlabs SM2D25D) with custom pulsed-width modulator to supply about maximum forward voltage 4 V and about maximum 1700 mA and output ranging from minimum 1150 mW to typical 1400 mW.
Radiation Source 2: Blue LED source with spectral range about 427-533 nm (462 nm peak) and about 4.2 mW. The Blue LED source sat on top of the LC6W cage cube and spanned the opening above the antireflective coating of the dichroic mirror.
Radiation Sources 1 and 2 were coupled using a Thorlabs LC6W cage cube with LB3C/M kinematic stage holding a dichroic cut-on filter (longpass, DMLP425L) at 45° to each Radiation Source.
[1]Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250).
[2]"Growth" is the curing or partial curing of the photopolymer resin resulting from monomer polymerization and photoinitiators interacting with the radiation source as measured at a composition dependent frequency absorbance height ratio (e.g. internal standard/1637 cm$^{-1}$); "inhibition" is the delay or prevention of curing or partial curing of the photopolymer resulting from photoinhibitors and/or photoabsorbers interacting with the radiation source. The growth rate is determined from ATR FT-IR (attenuated total reflectance Fourier transform-infra-red) spectral series result for the time evolved height ratio after performing a non-linear regression in JMP Pro 15.0.0 (390308) to fit as a Gompertz 4P sigmoid curve between 4 min and 16 min. Growth rate is one of four parameter estimates from the Gompertz 4P fit (others are lower asymptote, upper asymptote and inflection point). First, second and third derivatives (by central difference as described by W. J. Orvis, 1987) can be used to characterize the non-linear regression. Other models can be used to characterize - a non-limiting example is described in Bentea et al (2017) as the Finke-Watzky model; for polymerization processes interrupted by inhibition, a step-wise modeling approach (e.g. 2 partial sigmoids or 2 partially overlapping sigmoids) may be needed rather than one sigmoid. The third derivative can be used to describe where the acceleration is zero as growth dominates inhibition or inhibition ceases in favor of growth.
JMP Prediction Model: Gompertz 4P sigmoid
Height Ratio (Predictor) = a + (b − a) × Exp(−Exp(−c × (Time − d))) where a = lower asymptote, b = upper asymptote, c = growth rate, and d = inflection point Photopolymer Resin (e.g., 150, 250, 350) (in a Vat)
1. 97.53 (monomer)(about 96.50-98.50% by weight)
2. 0.99 (photoinhibitor)(about 0.98-1.00% by weight)
3. 1.48 (photoinitiator system)(about 1.47-1.49% by weight)
4. Negligible (solvent)(about 0% by weight due to overnight vacuum evaporation)

Reinforcing Member (e.g., 106, 206, 306)

Alternately to placing resin between two film layers, a reinforcing member can be incorporated in this embodiment in any form described in this specification and may be fully or partially submerged in the photopolymer resin of this Example III.

Deflection Member (e.g., 2)

(Except for Example IIIA) Alternately to a drop of resin, a larger volume (i.e., in a vat) can be used to make deflection member by the curing or partial curing of the photopolymer resin of this Example III by the radiation source(s) of this Example III to form lock-on and build layers; and the deflection member of this Example III may be in any form described in this specification.

Example IV

This Example IV discloses an inventive method within the scope of the present disclosure where Examples IVA and IVB demonstrate curing due to photoinitiation in the absence of a radiation source for photoinihibition.

| Radiation | Position[1] | Type | Wavelength Range (nm), Peaks (nm) | Output (mW) | Time (min) Source turned ON | Time (min) Source turned OFF | Result[2] |
|---|---|---|---|---|---|---|---|
| | | | Example IVA | | | | |
| Source 1 | Upper Reflected | UV | 350-400, 367 | N/A | N/A | N/A | 1.08 min Induction; |
| Source 2 | Upper | DLP (BGR) | 425-660; 462, 523, 630 | Blue: 19 Green: 0 Red: 0.39 | 2 N/A 0 | 16 N/A 2 | Growth Rate 0.573/min; % DC: 90.7 |

-continued

| Radiation | Position[1] | Type | Wavelength Range (nm), Peaks (nm) | Output (mW) | Time (min) Source turned ON | Time (min) Source turned OFF | Result[2] |
|---|---|---|---|---|---|---|---|
| Example IVB | | | | | | | |
| Source 1 | Upper Reflected | UV | 350-400, 367 | N/A | N/A | N/A | 1.45 min Induction; |
| Source 2 | Upper | DLP (BGR) | 425-660; 462, 523, 630 | Blue: 19 Green: 29 Red: 0.39, 39 | 2 2.5 0, 3.5 | 16 10.3 2, 10.3 | Growth Rate 0.492/min; % DC: 91.3 |

Radiation Source 1: ThorLabs M365LP1 LED equipped with a ThorLabs aspherical collimating lens (SM2F32-A) passed light through an iris (about 25% closed, Thorlabs SM2D25D) with custom pulsed-width modulator to supply about maximum forward voltage 4 V and about maximum 1700 mA and output ranging from minimum 1150 mW to typical 1400 mW.
Radiation Source 2: Optoma ML750 WXGA 700 Lumen DLP LED projector with 255 white grayscale image. A condensing lens was placed in the side of Thorlabs LC6W cage cube to focus the DLP projected image on the plane parallel to opposite face of the cage cube.
Radiation Sources 1 and 2 were coupled using a Thorlabs LC6W cage cube with LB3C/M kinematic stage holding a dichroic cut-on filter (longpass, DMLP425L) at 45° to each Radiation Source.
[1]Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250).
[2]"Growth" is the curing or partial curing of the photopolymer resin resulting from monomer polymerization and photoinitiators interacting with the radiation source as measured at a composition dependent frequency absorbance height ratio (e.g. internal standard/1637 $cm^{-1}$); "induction" is the time before onset of the growth rate and first exposure of a first wavelength to polymerize a photopolymer. The growth rate is determined from ATR FT-IR (attenuated total reflectance Fourier transform-infra-red) spectral series result for the time evolved height ratio after performing a non-linear regression in JMP Pro 15.0.0 (390308) to fit as a Logistic 4P Hill sigmoid model between 4 min and 16 min. Growth rate is one of four parameter estimates from the Gompertz 4P fit (others are lower asymptote, upper asymptote and inflection point). First, second and third derivatives (by central difference as described by W. J. Orvis, 1987) can be used to characterize the non-linear regression. Other models can be used to characterize - a non-limiting example is described in Bentea et al (2017) as the Finke-Watzky model; for polymerization processes interrupted by inhibition, a step-wise modeling approach (e.g. 2 partial sigmoids or 2 partially overlapping sigmoids) may be needed rather than one sigmoid. The third derivative can be used to describe where the acceleration is zero as growth dominates inhibition or inhibition ceases in favor of growth.
JMP Prediction Model: Logistic 4P Hill sigmoid
Height Ratio (Predictor) = c + (d − c)/[1 + 10$^{(a \times (b - Time(min)))}$] × Exp(−Exp(−c × (Time − d))) where a = growth rate, b = inflection point, c = lower asymptote, and d = upper asymptote Photopolymer Resin (e.g., 150, 250, 350) (in a Vat)
1. 97.53 (monomer)(about 96.50-98.50% by weight)
2. 0.99 (photoinhibitor)(about 0.98-1.00% by weight)
3. 1.48 (photoinitiator system)(about 1.47-1.49% by weight)
4. Negligible (solvent)(about 0% by weight due to overnight vacuum evaporation)

Reinforcing member (e.g., 106, 206, 306)

Alternately to placing resin between two film layers, a reinforcing member can be incorporated in this embodiment in any form described in this specification and may be fully or partially submerged in the photopolymer resin of this Example IV.

Deflection Member (e.g., 2)

Alternately to a drop of resin, a larger volume (i.e., in a vat) can be used to make a deflection member by the curing or partial curing of the photopolymer resin of this Example IV by the radiation source(s) of this Example IV to form lock-on and build layers; and the deflection member of this Example IV may be in any form described in this specification.

Example V

Example VA and Example VB disclose an inventive method within the scope of the present disclosure to demonstrate lock-on to a reinforcing member:

| Radiation | Position1 | Type | Wavelength Range (nm); At Output (nm) | Output (mW) in 3 grayscale image | Time (sec) Source turned ON | Time (sec) Source turned OFF | Result |
|---|---|---|---|---|---|---|---|
| Example VA | | | | | | | |
| Source 1 | Upper | Blue | 425-526; 470 | 9.32, 10.6, 14.4 | 10 | 310 | Lock-on curing of resin above and below the top and bottom plane of reinforcing member; and textured backside |
| Source 2 | Upper | Red | 580-680; 650 | <1, >1 | 0, 300 | 10, 310 | |
| Source 3 | Upper | UV | 350-400; | 25.4 | 30 | 310 | |

-continued

| Radiation | Position[1] | Type | Wavelength Range (nm); At Output (nm) | Output (mW) in 3 grayscale image | Time (sec) Source turned ON | Time (sec) Source turned OFF | Result |
|---|---|---|---|---|---|---|---|
| Example VB ||||||||
| Source 1 | Upper | Blue | 425-526 523 | 7.3, 6.9, 6.4 | 10 | 250 | Lock-on curing |
| Source 2 | Upper | Red | 580-680; 630 | <1, >1 | 0, 240 | 10, 250 | of resin above |
| Source 3 | Upper Reflected | UV | 350-400, 367 | 9 | 30 | 250 | and below the top and bottom plane of reinforcing member |

Radiation Source 1: ThorLabs M365LP1 LED equipped with a ThorLabs aspherical collimating lens (SM2F32-A) passed light through an iris (about 100% open, Thorlabs SM2D25D) with custom pulsed-width modulator to supply about maximum forward voltage 4 V and about maximum 1700 mA and output ranging from minimum 1150 mW to typical 1400 mW.
Radiation Source 2: Radiation Source 2: Modified Optoma ML750 WXGA 700 Lumen DLP LED projector modified with independent power output controller for each LED (Red, Green and Blue) and with an image comprised of three grayscales. A custom LabView application was designed with a graphical user interface to control the sequence, power and duration of each LED via a personal computer to initiate photopolymerization. A condensing lens was placed in the side of Thorlabs LC6W cage cube to focus the DLP projected image on the plane parallel to opposite face of the cage cube.
Radiation Sources 1 and 2 were coupled using a Thorlabs LC6W cage cube with LB3C/M kinematic stage holding a dichroic cut-on filter (longpass, DMLP425L) at 45° to each Radiation Source.
[1]Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250). The reinforcing member (206) is submerged fully in the vat (240) of photopolymer resin. The vat is placed such that the reinforcing member (206) is at the focal plane of the projected grayscale image where the grayscale controls the intensity of the activated DLP LEDs as either blue, green, red or combinations thereof. Alternatives can place the focal plane near the top (220) or bottom (222) of the reinforcing member. Alternatively, more than three grayscales can be included in the projected image. The number of grayscales is non-limiting - e.g. for 256 levels of grayscale, black is 0 and white is 255 and mixtures thereof form a defined gradient between the scale limits.

Photopolymer Resin (e.g., 150, 250, 350) (in a Vat)

1. 94.68 (monomer)(93.7-95.7% by weight)

2. 2.72 (photoinhibitor)(2.62-2.82% by weight)

3. 1.41 (photoinitiator system)(1.31-1.51% by weight)

4. 0.49 (second wavelength photoabsorber)(0.48-0.50% by weight)

5. 0.22 (first wavelength photoabsorber)(0.21-0.23% by weight)

6. 0.48 (stabilizer)(0.47-0.49% by weight)

7. Negligible (solvent) (about 0% by weight due to overnight vacuum evaporation)

Reinforcing Member (e.g., 106, 206, 306)

A reinforcing member of this embodiment may be in any form described in this specification and may be fully or partially submerged in the photopolymer resin of this Example V.

Deflection Member (e.g., 2)

A deflection member may be formed by the curing or partial curing of the photopolymer resin of this Example V by the radiation source(s) of this Example V to form lock-on and build layers; and the deflection member of this Example V may be in any form described in this specification.

Examples VI and VII are hypothetical:

Example VI

Example VI discloses an inventive method within the scope of the present disclosure to demonstrate lock-on to a reinforcing member:

| Radiation | Position[1] | Type | Wavelength Range (nm); At Output (nm) | Output (mW) in 5 grayscale image | Time (sec) Source turned ON | Time (sec) Source turned OFF | Expected Result |
|---|---|---|---|---|---|---|---|
| Hypothetical Example VI ||||||||
| Source 1 | Upper | Blue | 425-526; 470 | 0, 8, 10, 12, 14 | 10 | 280 | Lock-on curing |
| Source 2 | Upper | Red | 580-680; 650 | <1, >1 | 0, 270 | 10, 280 | of resin above and below the |

-continued

Hypothetical Example VI

| Radiation | Position1 | Type | Wavelength Range (nm); At Output (nm) | Output (mW) in 5 grayscale image | Time (sec) Source turned ON | Time (sec) Source turned OFF | Expected Result |
|---|---|---|---|---|---|---|---|
| Source 3 | Upper Reflected | UV | 350-400; 367 | 20 | 30 | 280 | top and bottom plane of reinforcing member |

Radiation Source 1: ThorLabs M365LP1 LED equipped with a ThorLabs aspherical collimating lens (SM2F32-A) passed light through an iris (about 100% open, Thorlabs SM2D25D) with custom pulsed-width modulator to supply about maximum forward voltage 4 V and about maximum 1700 mA and output ranging from minimum 1150 mW to typical 1400 mW.
Radiation Source 2: Radiation Source 2: Modified Optoma ML750 WXGA 700 Lumen DLP LED projector modified with independent power output controller for each LED (Red, Green and Blue) and with an image comprised of five grayscales. A custom LabView application was designed with a graphical user interface to control the sequence, power and duration of each LED via a personal computer to initiate photopolymerization. A condensing lens was placed in the side of Thorlabs LC6W cage cube to focus the DLP projected image on tire plane parallel to opposite face of the cage cube.
Radiation Sources 1 and 2 were coupled using a Thorlabs LC6W cage cube with LB3C/M kinematic stage holding a dichroic cut-on filter (longpass, DMLP425L) at 45° to each Radiation Source.
1Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250). The reinforcing member (206) is submerged fully in the vat (240) of photopolymer resin. The vat is placed such that the reinforcing member (206) is at the focal plane of the projected grayscale image where the grayscale controls the intensity of the activated DLP LEDs as either blue, green, red or combinations thereof. Alternatives can place the focal plane near the top (220) or bottom (222) plane of the reinforcing member. Alternatively, more than five grayscales can be included in the projected image. The number of grayscales is non-limiting - e.g. for 256 levels of grayscale, black is 0 and white is 255 and mixtures thereof form a defined gradient between the scale limits.

Photopolymer Resin (e.g., 150, 250, 350) (in a Vat)
1. 92.60 (monomer)(91.6-93.6% by weight)
2. 4.53 (photoinhibitor)(4.52-4.63% by weight)
3. 1.465 (photoinitiator system)(1.45-1.47% by weight)
4. 0.89 (second wavelength photoabsorber)(0.88-0.87% by weight)
5. 0.045 (first wavelength photoabsorber)(0.044-0.046% by weight)
6. 0.47 (stabilizer)(0.46-0.48% by weight)
7. Negligible (solvent) (about 0% by weight due to overnight vacuum evaporation)

Reinforcing Member (e.g., 106, 206, 306)

A reinforcing member may be in any form described in this specification and may be fully or partially submerged in the photopolymer resin of this Example VI.

Deflection Member (e.g., 2)

A deflection member may be formed by the curing or partial curing of the photopolymer resin of this Example VI by the radiation source(s) of this Example VI to form lock-on and build layers; and the deflection member of this Example VI may be in any form described in this specification.

Example VII

This Example VII is hypothetical but illustrates use of two or more stratified layers of varying composition to create zones of differing reactivity such that multiple actinic radiation sources create deflection members. Non-limiting examples can optionally distribute differing reactive resins in other patterns besides stratified or layered (e.g., circular deposits, sinusoidal lines, diagonal lines, parallel lines, intersecting lines, etc.). A reinforcing member of this embodiment may be in any form described in this specification and may be fully or partially submerged in the photopolymer resin of this Example VII. Example VII discloses an inventive method within the scope of the present disclosure to demonstrate lock-on to a reinforcing member:

Hypothetical Example VII - extruded lower layer of low inhibitor concentration and extruded upper layer of high inhibitor concentration

| Radiation | Position1 | Type | Wavelength Range (nm); At Output (nm) | Output (mW) in 5 grayscale Image | Time (sec) Source turned ON | Time (sec) Source turned OFF | Expected Result |
|---|---|---|---|---|---|---|---|
| Source 1 | Upper | Blue | 425-526; 470 | 0, 8, 10, 12, 14 | 10 | 280 | Structured deflection member; and in the presence of a reinforcing member, a result of polymerized and locked-on resin above and below the |
| Source 2 | Upper | Red | 580-680; 650 | <1, >1 | 0, 270 | 10, 280 | |
| Source 3 | Upper Reflected | UV | 350-400; 367 | 20 | 30 | 280 | |

| | | | | Output | | | |
|---|---|---|---|---|---|---|---|
| Radiation | Position1 | Type | Wavelength Range (nm); At Output (nm) | (mW) in 5 grayscale Image | Time (sec) Source turned ON | Time (sec) Source turned OFF | Expected Result |

Hypothetical Example VII - extruded lower layer of low inhibitor concentration and extruded upper layer of high inhibitor concentration top and bottom plane of reinforcing member -Radiation Source 1: ThorLabs M365LP1 LED equipped with a ThorLabs aspherical collimating lens (SM2F32-A) passed light through an iris (about 100% open, Thorlabs SM2D25D) with custom pulsed-width modulator to supply about maximum forward voltage 4 V and about maximum 1700 mA and output ranging from minimum 1150 mW to typical 1400 mW.
-Radiation Source 2: Radiation Source 2: Modified Optoma ML750 WXGA 700 Lumen DLP LED projector modified with independent power output controller for each LED (Red, Green and Blue) and with an image comprised of five grayscales. A custom LabView application was designed with a graphical user interface to control the sequence, power and duration of each LED via a personal computer to initiate photopolymerization. A condensing lens was placed in the side of Thorlabs LC6W cage cube to focus the DLP projected image on the plane parallel to opposite face of the cage cube.
-Radiation Sources 1 and 2 were coupled using a Thorlabs LC6W cage cube with LB3C/M kinematic stage holding a dichroic cut-on filter (longpass, DMLP425L) at 45° to each Radiation Source.
1Per FIG. 8B, "upper" radiation source (230) is directed at the anti-reflective (AR) coated side of the dichroic mirror (260) and passes toward the resin (250) and the "upper reflected" source is directed at the dichroic filter coating of the dichroic mirror (260) and is reflected toward the resin (250). The reinforcing member (206) is submerged fully in the vat (240) of photopolymer resin. The vat is placed such that the reinforcing member (206) is at the focal plane of the projected grayscale image where the grayscale controls the intensity of the activated DLP LEDs as either blue, green, red or combinations thereof. Alternatives can place the focal plane near the top (220) or bottom (222) plane of the reinforcing member. Alternatively, more than five grayscales can be included in the projected image. The number of grayscales is non-limiting - e.g. for 256 levels of grayscale, black is 0 and white is 255 and mixtures thereof form a defined gradient between the scale limits.

Lower Photopolymer Resin Layer (e.g., 150, 250, 350) (in a Vat)
1. 94.68 (monomer)(93.7-95.7% by weight)
2. 2.72 (photoinhibitor)(2.62-2.82% by weight)
3. 1.41 (photoinitiator system)(1.31-1.51% by weight)
4. 0.49 (second wavelength photoabsorber)(0.48-0.50% by weight)
5. 0.22 (first wavelength photoabsorber)(0.21-0.23% by weight)
6. 0.48 (stabilizer)(0.47-0.49% by weight)
7. Negligible (solvent) (about 0% by weight due to overnight vacuum evaporation)

Upper Photopolymer Resin Layer (e.g., 150, 250, 350) (in a Vat)
1. 92.60 (monomer)(91.6-93.6% by weight)
2. 4.53 (photoinhibitor)(4.52-4.63% by weight)
3. 1.465 (photoinitiator system)(1.45-1.47% by weight)
4. 0.89 (second wavelength photoabsorber)(0.88-0.87% by weight)
5. 0.045 (first wavelength photoabsorber)(0.044-0.046% by weight)
6. 0.47 (stabilizer)(0.46-0.48% by weight)
7. Negligible (solvent) (about 0% by weight due to overnight vacuum evaporation)

Reinforcing Member (e.g., 106, 206, 306)
A reinforcing member of this embodiment may be in any form described in this specification and may be fully or partially submerged in the photopolymer resin of this Example VII.

Deflection Member (e.g., VII)
A deflection member may be formed by the curing or partial curing of the photopolymer resin of this Example VII by the radiation source(s) of this Example VII to form lock-on and build layers; and the deflection member of this Example VII may be in any form described in this specification.

Alternative Photopolymer Resins
The following photopolymer resin compositions can used for Examples I, II, III, IV, V, VI and/or VII in this embodiment, the Results and Expected Results may be varied due to the composition.

(a) Alternative Photopolymer Resin (e.g., 150, 250, 350) (in a Vat)
1. 72.5 (monomer)(71.5-73.5% by weight)
2. 0.5 (photoinhibitor)(0.4-0.6% by weight)
3. 5.0 (photoinitiator system)(4-6% by weight)
4. 5.0 (second wavelength photoabsorber)(4-6% by weight)
5. 1.0 (first wavelength photoabsorber)(0.9-1.1% by weight)
6. 0.5 (stabilizer)(0.4-0.6% by weight)
7. 15.5 (excipient)(14.5-16.5% by weight)
8. Negligible due to evaporation (solvent)(0-100% or more by weight before evaporation)

(b) Alternative Photopolymer Resin (e.g., 150, 250, 350) (in a Vat)
1. 28.5 (monomer)(27.5-29.5% by weight)
2. 0.5 (photoinhibitor)(0.4-0.6% by weight)
3. 0.5 (photoinitiator system)(0.4-0.6% by weight)
4. 0 (second wavelength photoabsorber)(0-1% by weight)
5. 0 (first wavelength photoabsorber)(0-1% by weight)
6. 0.5 (stabilizer)(0.4-0.6% by weight)
7. 70 (excipient)(69-71% by weight)
8. Negligible due to evaporation (solvent)(0-100% or more by weight before evaporation)

(c) Alternative Photopolymer Resin (e.g., 150, 250, 350) (in a Vat)
1. 53.5 (monomer)(52.5-54.5% by weight)
2. 3 (photoinhibitor)(2.9-3.1% by weight)
3. 3 (photoinitiator system)(2.9-3.1% by weight)
4. 0 (second wavelength photoabsorber)(0-1% by weight)
5. 0 (first wavelength photoabsorber)(0-1% by weight)
6. 0.5 (stabilizer)(0.4-0.6% by weight)
7. 40 (excipient)(39-41% by weight)
8. Negligible due to evaporation (solvent)(0-100% or more by weight before evaporation)

(d) Alternative Photopolymer Resin (e.g., 150, 250, 350) (in a Vat)
1. 10 (monomer)(9-11% by weight)
2. 5 (photoinhibitor)(4-6% by weight)
3. 0.5 (photoinitiator system)(0-1% by weight)
4. 0 (second wavelength photoabsorber)(0-1% by weight)
5. 0 (first wavelength photoabsorber)(0-1% by weight)
6. 0.5 (stabilizer)(0.4-0.6% by weight)
7. 84 (excipient)(83-85% by weight)

8. Negligible due to evaporation (solvent)(0-100% or more by weight before evaporation Beyond the photopolymer resins disclosed above, the following table discloses inventive photopolymer resins within the scope of the present disclosure:

| Example | Monomer % w/w | Stabilizer % w/w | Photo-initiator system % w/w | Photo-inhibitor % w/w | Photo-Absorber % w/w | Excipients % w/w | Excipient | Excipient information |
|---|---|---|---|---|---|---|---|---|
| 1 | 98.5 | 0.5 | 0.5 | 0.5 | 0 | 0 | Volatile - Isopar -E | Isoparaffin fluid; ExxonMobil Chemical, ExxonMobil, Irving, TX |
| 2 | 88.499 | 0.5 | 0.5 | 0.001 | 0.5 | 10 | Volatile - Isopar -E | Isoparaffin fluid; ExxonMobil Chemical, ExxonMobil, Irving, TX |
| 3 | 72.5 | 0.5 | 5 | 0.5 | 1.5 | 20 | Volatile - Isopar -E | Isoparaffin fluid; ExxonMobil Chemical, ExxonMobil, Irving, TX |
| 4 | 67.5 | 0.5 | 0.5 | 0.5 | 1 | 30 | Volatile - Isopar -E | Isoparaffin fluid; ExxonMobil Chemical, ExxonMobil, Irving, TX |
| 5 | 55.999 | 3 | 0.5 | 0.5 | 0.001 | 40 | Volatile - Isopar -E | Isoparaffin fluid; ExxonMobil Chemical, ExxonMobil, Irving, TX |
| 6 | 40.5 | 0.5 | 3.5 | 0.5 | 5 | 50 | Volatile - Isopar -E | Isoparaffin fluid; ExxonMobil Chemical, ExxonMobil, Irving, TX |
| 7 | 28.99 | 0.5 | 0.01 | 0.5 | 0 | 70 | Volatile - Isopar -E | Isoparaffin fluid; ExxonMobil Chemical, ExxonMobil, Irving, TX |
| 8 | 18.5 | 0.5 | 0.5 | 0.5 | 0 | 80 | Volatile - Isopar -E | Isoparaffin fluid; ExxonMobil Chemical, ExxonMobil, Irving, TX |
| 9 | 10 | 0.5 | 0.5 | 0.5 | 0 | 88.5 | Volatile - Isopar -E | Isoparaffin fluid; ExxonMobil Chemical, ExxonMobil, Irving, TX |
| 10 | 83.5 | 0.5 | 10 | 6 | 0 | 0 | mineral oil | Drakeol Supreme; Pennzoil, Penrenco Division, Karns City, PA |
| 11 | 88.5 | 0.5 | 0.5 | 0.5 | 0 | 10 | mineral oil | Drakeol Supreme; Pennzoil, Penrenco Division, Karns City, PA |
| 12 | 68.5 | 0.5 | 6 | 5 | 0 | 20 | mineral oil | Drakeol Supreme; Pennzoil, Penrenco Division, Karns City, PA |
| 13 | 65.5 | 0.5 | 0.5 | 0.5 | 3 | 30 | mineral oil | Drakeol Supreme; Pennzoil, Penrenco Division, Karns City, PA |
| 14 | 53 | 1 | 3 | 3 | 0 | 40 | mineral oil | Drakeol Supreme; Pennzoil, Penrenco Division, Karns City, PA |
| 15 | 48.5 | 0.5 | 0.5 | 0.5 | 0 | 50 | mineral oil | Drakeol Supreme; Pennzoil, Penrenco Division, Karns City, PA |
| 16 | 28 | 0.5 | 2 | 1.5 | 0 | 68 | mineral oil | Drakeol Supreme; Pennzoil, Penrenco Division, Karns City, PA |
| 17 | 18.5 | 0.5 | 0.5 | 0.5 | 2 | 78 | mineral oil | Drakeol Supreme; Pennzoil, Penrenco Division, Karns City, PA |
| 18 | 10 | 0.5 | 3 | 3.5 | 0 | 83 | mineral oil | Drakeol Supreme; Pennzoil, Penrenco Division, Karns City, PA |
| 19 | 92 | 0 | 2 | 2 | 2 | 2 | $SiO_2$ | Idisil NJ 20 peanut-shaped colloidal silica, Evonik Corporation, Parsippany, NJ |
| 19 | 96 | 0.5 | 1 | 1 | 0 | 1.5 | $SiO_2$ | Idisil KE 100 spherical colloidal silica, Evonik Corporation, Parsippany, NJ |
| 19 | 95 | 0.5 | 2 | 0 | 0 | 2.5 | $SiO_2$ | Idisil XS 200 spherical colloidal silica, Evonik Corporation, Parsippany, NJ [<200 nm to not scatter UV] |
| 19 | 87.5 | 0.5 | 2 | 5 | 4 | 1 | $SiO_2$ | Idisil KE 300 spherical colloidal silica, Evonik Corporation, Parsippany, NJ [>200 nm to scatter UV] |

-continued

| Example | Monomer % w/w | Stabilizer % w/w | Photo-initiator system % w/w | Photo-inhibitor % w/w | Photo-Absorber % w/w | Excipients % w/w | Excipient | Excipient information |
|---|---|---|---|---|---|---|---|---|
| 19 | 91.5 | 0.5 | 2 | 5 | 0 | 1 | $SiO_2$ | Idisil XS 1000 dry colloidal silica, Evonik Corporation, Parsippany, NJ [>200 nm to scatter UV] |
| 19 | 90.5 | 0.5 | 1 | 4 | 2 | 2 | $SiO_2$ | Aerosil R711 surface modified fumed silica, Evonik Corporation, Parsippany, NJ |
| 19 | 86.5 | 0.5 | 2 | 5 | 0 | 6 | $SiO_2$ | Aerosil R974 methyl surface modified fumed silica, Evonik Corporation, Parsippany, NJ as described in B-S Chiou et. al. 2001 |
| 20 | 87 | 0.5 | 1.5 | 6 | 0 | 5 | $TiO_2$ | Aeroxide $TiO_2$ P25, Evonik Corporation, Parsippany, NJ |
| 20 | 88 | 0.5 | 2 | 4.5 | 3 | 2 | $TiO_2$ | Aeroxide $TiO_2$ PF 2, Evonik Corporation, Parsippany, NJ |
| 20 | 82.5 | 0.5 | 2 | 0 | 0 | 15 | MAA-CSW | α-methacrylic acid (MMA) modified Calcium sulfate whiskers (CSW) [a]Y. Liu et. al. 2019 |
| 20 | 83.5 | 0.5 | 2 | 5 | 4 | 5 | m-CS@CSW | Acryloyl chloride modified chitosan coated calcium sulfate whisker as described in Y. Liu et. al. 2019 |
| 20 | 77.5 | 0.5 | 2 | 5 | 0 | 15 | m-CS@CSP | Acryloyl chloride modified chitosan coated calcium sulfate particle as described in [b]Y. Liu et. al. 2019 |
| 20 | 84.5 | 2 | 1.5 | 6 | 5 | 1 | m-CS@CSW | Acryloyl chloride modified chitosan coated calcium sulfate whisker as described in [c]T. Jiao et. al. 2020 |
| 21 | 98.5 | 0.5 | 0.5 | 0 | 0 | 0.5 | CNC | Cellulose nanocrystals (CNC) as described in M. I. Aranguren et. al. 2013. |
| 22 | 90.5 | 0 | 2 | 5 | 2 | 0.5 | CNF | Cellulose nanofibers (CNF) as described in Cheng et. al. 2016. |
| 23 | 89.5 | 0.5 | 2 | 5 | 2 | 1 | CNC | Cellulose nanocrystals (CNC) as described in M. I. Aranguren et. al. 2013. |
| 24 | 96.499 | 0.5 | 2 | 0.001 | 0 | 1 | CNF | Cellulose nanofibers (CNF) as described in Cheng et. al. 2016. |
| 25 | 85.5 | 0.5 | 2 | 5 | 2 | 5 | CNC | Cellulose nanocrystals (CNC) as described in M. I. Aranguren et. al. 2013. And X. Kong et. al. 2016. |
| 26 | 87 | 0.5 | 2 | 4 | 3 | 3.5 | CNF | Cellulose nanofibers (CNF) as described in Cheng et. al. 2016. |
| 27 | 79 | 0.5 | 20 | 0.5 | 0 | 0 | N/A | not applicable |
| 28 | 51.5 | 0.5 | 20 | 6 | 2 | 15 + 5 | m-CS@CSP + SiO2 | Acryloyl chloride modified chitosan coated calcium sulfate particle as described in [b]Y. Liu et. al. 2019 |

Examples of Processes for a Making Deflection Member

Most 3D printing equipment (e.g., an SLA apparatus) have options for slicing a three dimensional object in to slices or layers. The slices or layers can typically be any desired thickness up to about 200 microns, or up to about 300 microns, with some non-limiting thicknesses being 10 microns, 25 microns, 50 microns and 100 microns. Recently released from Formlabs, the new Form 3/3L increases the maximum thickness per layer to 300 microns. All slices or layers do not need to be the same thickness, as layer thickness can vary in the printing of a single object. However, the max layer thickness that 3D printing equipment can typically build is less than a normal reinforcing member thickness. Accordingly, the operation of the equipment expects a Z distance equivalent to the layer thickness, and thus methods have been developed to work with a physically constraining reinforcing member present within the object being printed.

Example 1

A Form 2 SLA (laser) printer from Formlabs, Inc.® was modified to enable inclusion of a reinforcing member in the build process. A reinforcing member was constructed using 100% combed cotton needle point canvas (12 mesh and about 540 micron thick). The X-Y strands of the reinforcing member were white and opaque in appearance. The resin vat was loaded with Formlabs Flexible V2 resin which is gray in color. A hoop was additively manufactured using an Objet 30 Prime PolyJet 3D printer—where the hoop enabled tension to be applied in both the MD and CD direction holding the reinforcing member against an upper build platform made of brushed aluminum. A continuous crosshatch pattern was constructed in Solidworks (3D CAD) and exported as an STL file. The STL file was sliced into layers using PreForm; and PreForm launched the build. The reinforcing member-modified platform was submerged to the bottom of the resin vat and a single laser was driven by galvo mirrors to cure resin for the lock-on layer and subsequent build layers. Between such layers, the reinforcing member-modified build platform was separated from the bottom of the vat, raised, and incrementally repositioned above the previous layer position. During this repositioning, a mechanical wiper removed debris and redistributed resin across the build area. The laser was positioned beneath the vat and transmitted the radiation through the transparent vat.

Example 2

Figure 11:
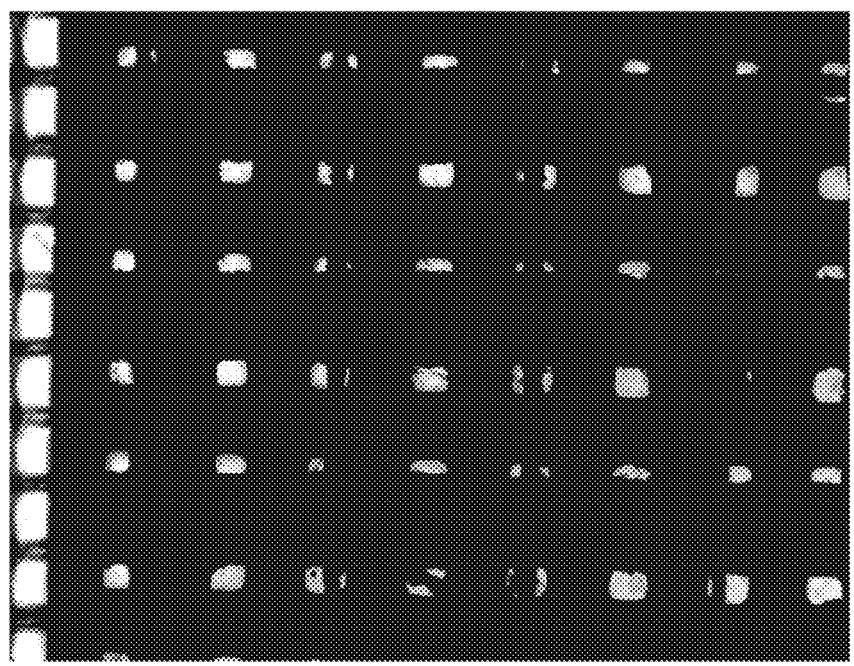
FIG. 11 is a photograph of a deflection member produced by the methods detailed herein.
Figure 12:
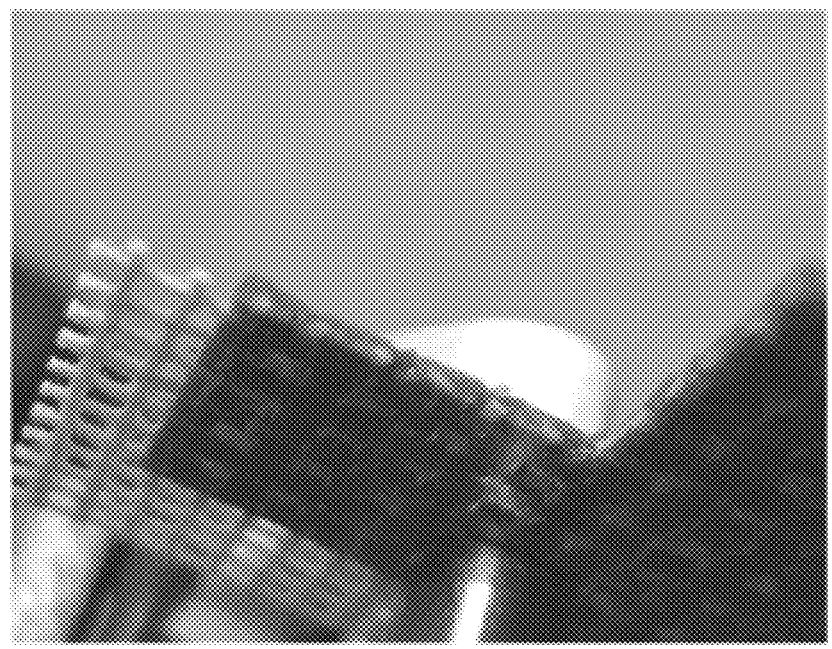
FIG. 12 is a photograph of a cross-section of the deflection member FIG. 11.
Figure 13:
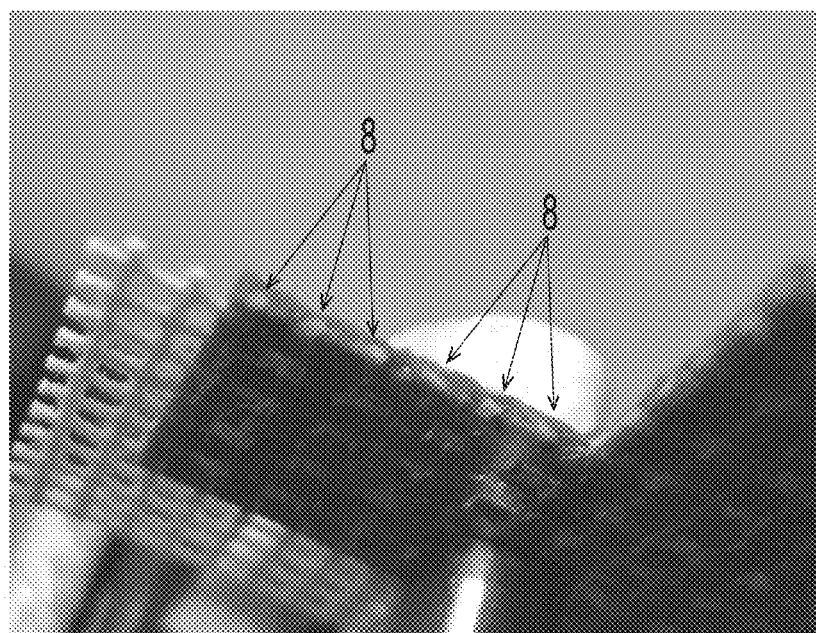
FIG. 13 is a photograph of a cross-section of the deflection member FIG. 11 with arrows to indicate the filaments of the reinforcing member.

In another example similar to Example 1, the build platform was modified to include the reinforcing member at the 7$^{th}$ layer in the build sequence of 14×50 micron thick layers. Operation was paused to insert the reinforcing member and hoop on to and around the build platform. A portion of the result is shown in FIGS. 11, 12 and 13, such that the pattern is locked on to the reinforcing member by partially surrounding the strands.

Example 3

In another example similar to Example 2, the build platform was modified to include a reinforcing member at the 14$^{th}$ layer in the build sequence of 28×50 micron thick layers. Operation was paused to insert the reinforcing member and hoop on to and around the build platform. This resulted in a 3D pattern wholly locked onto the reinforcing member.

Example 4

Using a Form 1+ SLA from Formlabs in a bottom up configuration (laser also beneath the vat), a reinforcing member was affixed to the build platform via black Gorilla tape. The tape was pressed against a PPS-reinforcing member and wrapped around the edges of the build platform. A second layer of tape was added to increase the depth of resin between the first surface of the reinforcing member and the inner bottom surface of the vat. The distance was about 0.81 mm. Improved resolution was achieved by covering the reflective aluminum build platform with red 3M tape or flat black Formica prior to printing. Black Formica is preferred due to slight solubility of the red component of the 3M tape into the resin. An improved build platform is achieved when the radiation is absorbed on the build platform surface. Repetitive passes of energy were exposed to essentially the same thick pool of resin while the SLA printer executed a build. Build layers were not created by successive layers of uncured resin but rather successive exposures of energy according to the 3D CAD model. A pumping action of resin into the fixed space and movement of the reinforcing member can cause the reinforcing member to shift and reduce the number of exposures locally within the resin.

Example 5

To account for undesired resin and reinforcing member displacement, a Form 1+ SLA was inverted to enable the laser to radiate a stationary vat of resin beneath the laser (similar to the upper laser in FIG. 8), and the build plate was removed. Since the vat was stationary, the reinforcing member in the vat was also stationary. The vat was constructed from a square petri dish and was transparent to the radiation. Successive pattern exposures of the laser cured the fixed resin volume in the desired pattern with both regions equivalent to lock-on and build layers. The thickness of each build layer was determined by the height of the photopolymer resin in the vat.

Example 6

In another example similar to Example 5, to facilitate removal from the vat (petri dish), a transparent barrier film was used on the bottom of the vat. This kept the vat clean from uncured resin.

Example 7

In another example similar to Example 6, to increase the thickness of the overall build layer region or to alter the shape of the cured resin pattern, additional resin is added to increase the fixed resin volume after the first set of exposures. The steps can be repeated to achieve the final thickness or shape.

Example 8

In another example similar to Example 7, to improve the final layer, a barrier film can be added which limits further diffusion of atmospheric oxygen into the resin and enables depletion of the dissolved oxygen in free radial photopolymerization. The barrier film can be smooth creating a planar surface on the top of protuberances or resinous framework. Optionally, the film can be textured to impart a textured surface to the resinous framework consistent with U.S. Pat. No. 9,909,258 issued Mar. 6, 2018 in the name of Seger et al.

Example 9

A MakeBlock LaserBot Engraving Kit (part RB-Mab-240 from RobotShop Inc, Swanton, Vt.) was modified to point up rather than down and include a 405 nm (450-500 mW) laser, to orient a Form1+ vat above the laser plane and operate similar to FIG. 7. The laser was controlled in the XY coordinate direction to create the letters TEST as a pattern using a transparent photopolymer. Besides galvo and mirror controlled lasers (as in Example 5), this demonstrated the potential to use a laser mounted on an XY gantry motion controlled table.

Example 10

Using configurations as shown in FIGS. 6 and 7, and combining techniques from Examples 5-8, Peopoly Moai SLA (models Moai 130 and Moai 200) were modified to operate without the moving build plate in FIG. 6 and the laser was inverted similar to FIG. 7. These used a fixed volume of resin with repeated radiation exposures up to 26 times at about 59% to 69% laser power to demonstrate simultaneous lock-on layer creation and build layer creation. This demonstrated capability for XY galvo mirror control only rather than Formlabs Form 1+ which has galvo mirror control and a 45 degree reflecting mirror.

While the methods and examples above disclose embodiments where the reinforcing member has a planar disposition in a vat, the vat may alternatively comprise a cylinder (or like reinforcing member support assembly) that a reinforcing member is wrapped at least partially around an exterior surface of, and where a photopolymer resin fills a volume between an inside surface of the vat and an outside surface of the cylinder. The inside volume of the cylinder may be free from the photopolymer resin. The vat may be cylindrical as well. The cylinder may be concentrically disposed within the vat. The vat and the cylinder may rotate. The outer diameter of the inner concentric cylinder that the reinforcing member is wrapped around may be from about 0.5 to about 100 ft, from about 4 to about 20 ft, or from about 2 to about 12 ft, specifically reciting all 1 foot increments within the above-recited ranges and all ranges formed therein or thereby. The inner diameter of the vat that is concentrically disposed may be a greater diameter than inner cylinder from about 0.018 in to about 0.300 in, from about 0.024 in to about 0.250 in, or from about 0.029 in to about 0.200 in, specifically reciting all 0.001 inch increments within the above-recited ranges and all ranges formed therein or thereby, where at least resin and a reinforcing member would occupy the gap formed within the vat between the inner wall of the outer cylinder and the outer wall of the inner cylinder. Further embodiments include the use of a sleeve such that the inner cylinder is comprised of more than one part into an inner cylinder assembly—thereby enabling additional control of the gap distance between the inner wall of the outer cylinder of the vat and the outer wall of the inner cylinder assembly. Further embodiments include the use of barrier film adjacent to inner wall of the outer cylinder and/or the outer wall of the inner cylinder. The barrier films can be at least partially transparent to actinic radiation and in some cases provide regions that are at most optically opaque and/or gradients therebetween. Lubricating fluids (e.g. mineral oil, silicone fluids, etc.) may be used to reduce friction on stationary surfaces or be used to create a dead zone. One or more radiation sources may be disposed within the volume of the inner cylinder and/or may be disposed outside the vat. At least a portion of the walls of the vat and the cylinder may be transparent or translucent. The outer cylinder, inner cylinder and/or inner cylinder assembly can be rotated relative to the reinforcing member. The reinforcing member and/or barrier films can be at least partially rotated relative to outer cylinder, inner cylinder and/or inner cylinder assembly.

The vat is not limited to symmetric geometric configurations but can be asymmetric such as the pool that can be formed by at least two tangential rolls (e.g. first tangential roll, second tangential roll). A gap (e.g. proximate space) can be configured when at least two rolls are offset from one another from about 0.018 in to about 0.300 in, from about 0.024 in to about 0.250 in, or from about 0.029 in to about 0.200 in, specifically reciting all 0.001 inch increments within the above-recited ranges and all ranges formed therein or thereby, where at least resin and a reinforcing member would occupy the gap formed between the proximately spaced outer wall of the first tangential roll and the outer wall of the second tangential roll. Further embodiments include the use of position control to adjust the gap distance between the rolls before, during and/or after photopolymerization. Further embodiments include the optional use of barrier film adjacent to outer wall of the first tangential roll and/or the outer wall of the second tangential roll. The barrier films can be at least partially transparent to actinic radiation and in some cases provide regions that are at most optically opaque and/or gradients therebetween. Lubricating fluids (e.g. mineral oil, silicone fluids, etc.) may be used to reduce friction on stationary surfaces or be used to create a dead zone. One or more radiation sources may be disposed within the volume of the first tangential roll and/or second tangential roll; and/or one or more radiation sources may be disposed adjacent to the outer wall of first tangential roll and/or outer wall of second tangential roll. Optionally at least a third tangential roll and/or a fourth tangential roll may be disposed outside the vat to provide support and handling. Optionally, first, second, third and fourth tangential rolls can vary in diameter. Tangential roll diameter may be from about 0.25 to about 27 ft, from about 0.25 to about 18 ft, or from about 0.25 to about 9 ft, specifically reciting all 1 foot increments within the above-recited ranges and all ranges formed therein or thereby.

Fibrous Structure

One purpose of the 3-D printed deflection member (produced as detailed herein) is to provide a forming surface on which to mold fibrous structures such as paper products including paper towels, toilet tissue, and facial tissue, as well as mold nonwovens including diaper, adult incontinence and feminine care topsheet materials, and the like. When used in a papermaking process, the deflection member can be utilized in the "wet end" of a papermaking process, as described in more detail below, in which fibers from a fibrous slurry are deposited on the web side surface of the deflection member. Similarly, the deflection member can be used to catch and mold fibers in a nonwoven making process.

Thus, as can be understood from the description herein, a fibrous structure can be shaped to the general shape of the deflection member such that the shape and size of the 3-D features of the fibrous structure are a close approximation of the size and shape of the 3-D objects printed on the resinous framework of the deflection member.

Processes for Making Fibrous Structure

Figure 10:
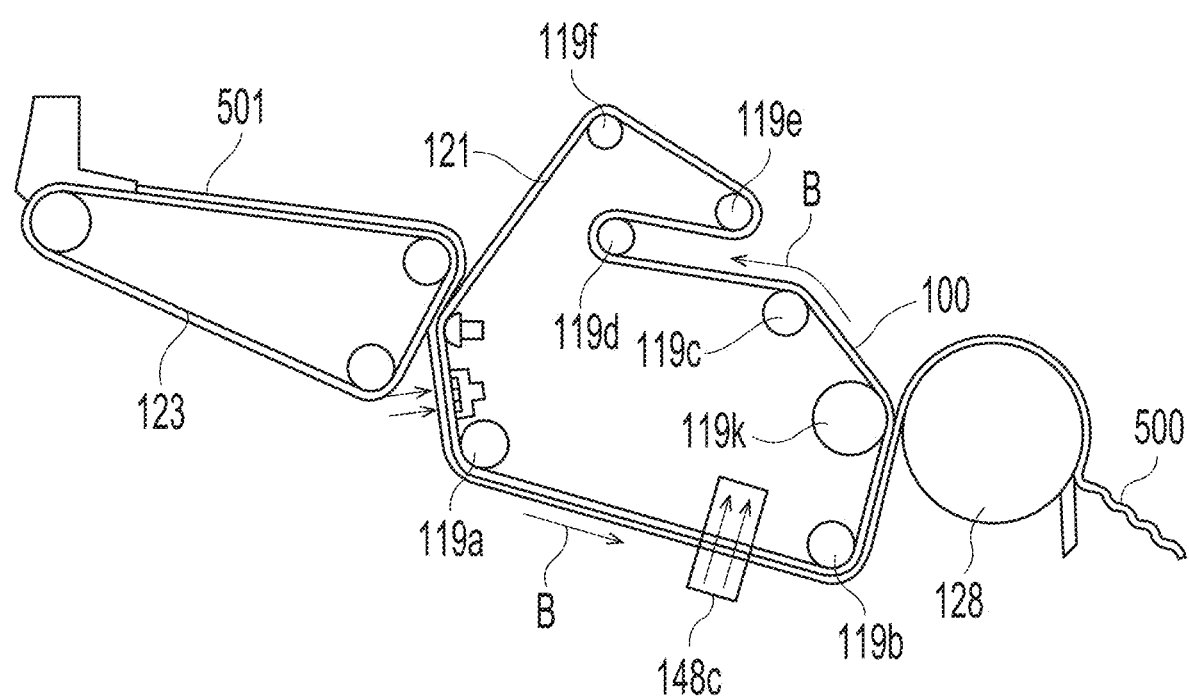
FIG. 10 is a schematic representation of a papermaking process.

In one form, deflection members as disclosed herein may be used in a papermaking process. With reference to FIG. 10, one exemplary form of a process for producing a paper web 500 comprises the following steps. First, a plurality of fibers 501 are provided and deposited on a forming wire 123 of a papermaking machine, as is known in the art.

The present disclosure contemplates the use of a variety of fibers, such as, for example, cellulosic fibers, synthetic fibers, or any other suitable fibers, and any combination thereof. Papermaking fibers useful in the present disclosure include cellulosic fibers commonly known as wood pulp fibers. Fibers derived from soft woods (gymnosperms or coniferous trees) and hard woods (angiosperms or deciduous trees) are contemplated for use in this disclosure. The particular species of tree from which the fibers are derived is immaterial. The hardwood and softwood fibers can be blended, or alternatively, can be deposited in layers to provide a stratified web. U.S. Pat. No. 4,300,981 issued Nov. 17, 1981 in the name of Carstens; and U.S. Pat. No. 3,994,771 issued Nov. 30, 1976 in the name of Morgan et al.

are incorporated herein by reference for the purpose of disclosing layering of hardwood and softwood fibers.

The wood pulp fibers can be produced from the native wood by any convenient pulping process. Chemical processes such as sulfite, sulfate (including the Kraft) and soda processes are suitable. Mechanical processes such as thermomechanical (or Asplund) processes are also suitable. In addition, various semi-chemical and chemi-mechanical processes can be used. Bleached as well as unbleached fibers are contemplated for use. When the fibrous web of this invention is intended for use in absorbent products such as paper towels, bleached northern softwood Kraft pulp fibers may be used. Wood pulps useful herein include chemical pulps such as Kraft, sulfite and sulfate pulps as well as mechanical pulps including for example, ground wood, thermomechanical pulps and Chemi-ThermoMechanical Pulp (CTMP). Pulps derived from both deciduous and coniferous trees can be used.

In addition to the various wood pulp fibers, other cellulosic fibers such as cotton linters, rayon, and bagasse can be used in this invention. Synthetic fibers, such as polymeric fibers, can also be used. Elastomeric polymers, polypropylene, polyethylene, polyester, polyolefin and nylon can be used. The polymeric fibers can be produced by spunbond processes, meltblown processes and/or other suitable methods known in the art.

The paper furnish can comprise a variety of additives, including but not limited to fiber binder materials, such as wet strength binder materials, dry strength binder materials, chemical softening compositions, latexes, bicomponent fibers with a soften-able or melt-able outer shell, and thermoplastic fibers. Suitable wet strength binders include, but are not limited to, materials such as polyamide-epichlorohydrin resins sold under the trade name of KYMENE™ 557H by Hercules Inc., Wilmington, Del. Suitable temporary wet strength binders include but are not limited to synthetic polyacrylates. A suitable temporary wet strength binder is PAREZ™ 750 marketed by American Cyanamid of Stanford, Conn. Suitable dry strength binders include materials such as carboxymethyl cellulose and cationic polymers such as ACCO™ 711. The CYPRO/ACCO family of dry strength materials are available from CYTEC of Kalamazoo, Mich. Forms of fiber bonding may also be utilized, including, but not limited to, carding and hydroentangling.

The paper furnish can comprise a debonding agent to inhibit formation of some fiber to fiber bonds as the web is dried. The debonding agent, in combination with the energy provided to the web by the dry creping process, results in a portion of the web being debulked. In one form, the debonding agent can be applied to fibers forming an intermediate fiber layer positioned between two or more layers. The intermediate layer acts as a debonding layer between outer layers of fibers. The creping energy can therefore debulk a portion of the web along the debonding layer. Suitable debonding agents include chemical softening compositions such as those disclosed in U.S. Pat. No. 5,279,767 issued Jan. 18, 1994 in the name of Phan et al., the disclosure of which is incorporated herein by reference. Suitable biodegradable chemical softening compositions are disclosed in U.S. Pat. No. 5,312,522 issued May 17, 1994 in the name of Phan et al.; U.S. Pat. Nos. 5,279,767 and 5,312,522, the disclosures of which are incorporated herein by reference. Such chemical softening compositions can be used as debonding agents for inhibiting fiber to fiber bonding in one or more layers of the fibers making up the web. One suitable softener for providing debonding of fibers in one or more layers of fibers forming the web is a papermaking additive comprising DiEster Di (Touch Hardened) Tallow Dimethyl Ammonium Chloride. A suitable softener is ADOGEN® brand papermaking additive available from Witco Company of Greenwich, Conn.

The embryonic web can be typically prepared from an aqueous dispersion of papermaking fibers, though dispersions in liquids other than water can be used. The fibers are dispersed in the carrier liquid to have a consistency of from about 0.1 to about 0.3 percent. Alternatively, and without being limited by theory, it is believed that the present disclosure is applicable to moist forming operations where the fibers are dispersed in a carrier liquid to have a consistency less than about 50 percent.

Conventional papermaking fibers can be employed, and the aqueous dispersion can be formed in conventional ways. Conventional papermaking equipment and processes can be used to form the embryonic web on the Fourdrinier wire. The association of the embryonic web with the deflection member can be accomplished by simple transfer of the web between two moving endless belts as assisted by differential fluid pressure. The fibers may be deflected into the deflection member by the application of differential fluid pressure induced by an applied vacuum. Any technique, such as the use of a Yankee drum dryer or through air dryers, can be used to dry the intermediate web. Foreshortening can be accomplished by any conventional technique such as creping or rush transfer.

The plurality of fibers can also be supplied in the form of a moistened fibrous web (not shown), which should preferably be in a condition in which portions of the web could be effectively deflected into the deflection conduits of the deflection member and the void spaces formed between the suspended portions and the X-Y plane.

As depicted in FIG. 10, embryonic web comprising fibers 501 is transferred from forming wire 123 to belt 121 on which the deflection member, produced as detailed herein, can be disposed. Alternatively, or additionally, a plurality of fibers or fibrous slurry, can be deposited onto the deflection member directly from a headbox or otherwise, including in a batch process (not shown). Papermaking belt 100 comprising the deflection member held between the embryonic web and belt 121 can travel past optional dryers/vacuum devices and about rolls 119*a*, 119*b*, 119*k*, 119*c*, 119*d*, 119*e*, and 119*f* in the direction schematically indicated by the directional arrow "B".

A portion of fibers 501 can be deflected onto the deflection member such as to cause some of the deflected fibers to be disposed within any voids printed in the 3-D printed resinous member of the deflection member. Depending on the process, mechanical and fluid pressure differential, alone or in combination, can be utilized to deflect a portion of fibers 501 into any voids of the deflection member. For example, in a through-air drying process, vacuum apparatus 148*c* can apply a fluid pressure differential to the embryonic web disposed on the deflection member, thereby deflecting fibers into the deflection conduits of the deflection member. The process of deflection may be continued with additional vacuum pressure, if necessary, to even further deflect the fibers into any voids present on the deflection member.

Finally, a partly-formed fibrous structure associated with the deflection member can be separated from the deflection member at roll 119*k* at the transfer to Yankee dryer 128. By doing so, the deflection member having the fibers thereon, is pressed against a pressing surface, such as, for example, a surface of Yankee drying drum 128. After being creped off the Yankee dryer, fibrous structure 500 results and can be further processed or converted as desired.

In another form, the deflection members as disclosed herein may be used in a nonwoven making process to capture/mold fibers in the creation of a nonwoven web, the type of which is commonly used as a top sheet and/or outercover nonwoven in diapers, adult incontinence products and feminine care products. Such processes use forced air and/or vacuum to draw fibers down into the deflection member, and are further detailed in commonly assigned U.S. patent application Ser. No. 15/879,480, filed Jan. 25, 2018 in the name of Ashraf et al.

Example Claim Embodiments

1. A method for manufacturing a deflection member, the method comprising the steps of:
   a. incorporating a monomer;
   b. incorporating a photoinitiator system;
   c. incorporating a photoinhibitor;
   d. incorporating a reinforcing member;
   e. combining the monomer, photoinitiator system, and photoinhibitor to form a photopolymer resin;
   f. exposing the photopolymer resin to a first wavelength;
   g. exposing the photopolymer resin to a second wavelength; and
   h. polymerizing the monomer to form a protuberance extending from the reinforcing member.

2. The method of claim 1, wherein the protuberance is locked-on to the reinforcing member.

3. The method according to any of the preceding claims, wherein the monomer comprises one or more materials selected from the group consisting of di-functional monomers, tri-functional monomers, multi-functional monomers, monomethacrylates, dimethacrylates, trimethacrylates, multi-functional methacrylates, monoacrylates, diacrylates, triacrylates, multi-functional acrylates, epoxy acrylates, acrylate functional polyether polyols, methacrylate functional polyether polyols, acrylate functional polyester polyols, methacrylate functional polyester polyols, acrylate functional polyurethanes, methacrylate functional polyurethanes, prepolymers, oligomers, and combinations thereof.

4. The method according to any of the preceding claims, wherein the photoinitiator system comprises one or more materials selected from the group consisting of acylphosphine oxides, bis-acyl phospine oxides, camphorquinone, benzophenone, 7-diethylamino-3-thenoylcoumarin, alkyl ethers of benzoin, diphenoxy benzophenone, benzildimethylketal, halogenated functional benzophenones, amino functional benzophenones, benzils, benzimidazozles, 2-hydroxy-2-methylphenol-1-propanone, fluorenone, fluorenone derivatives, 2,2-diethoxyacetophenone, benzoin, 9,10-phenanthrenequinone, anthraquinone derivatives, 2-benzyl-2-N,N-dimethylamino-1-(4-morpholinophenyl)butanone, zanthone, zanthone derivatives, halogenated acetophenone, halogenated acetophenone derivatives, thioxanthone, thioxanthone derivatives, sulfonyl chlorides of aromatic compounds, diacetyl, furil, anisil, 4,4'-dichlorobenzil, 4,4'-dialkoxybenzil, phenylpropanedione, acylphosphine oxides, 2-(dimethylamino)ethyl methacrylate, diphenyliodonium hexafluorophosphate, diphenyliodonium chloride, ethyl-4-(dimethylamino)benzoate, and combinations thereof.

5. The method according to any of the preceding claims, wherein the photoinhibitor comprises one or more materials selected from the group consisting of 2,2'-bis(2-chlorophenyl)-4,4',5,5'-tetraphenyl-1,2'-biimidazole; hexaarylbiimidazole (HABI); bridged HABI; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris-(2-Chlorophenyl)-5-(3,4-dimethoxyphenyl)-4',5'-diphenyl-1,1'-biimidazole; zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-[(dodecylsulfanylthiocarbonyl)sulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl] trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio] pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl) carbamodithioate; 2-Cyanopropan-2-yl N-methyl-N-(pyridin-4-yl)carbamodithioate; Methyl 2-[methyl(4-pyridinyl)carbamothioylthio]propionate; 1,1'-Bi-1H-imidazole; functional variants of any of the one or more materials; and combinations thereof.

6. The method according to any of the preceding claims, wherein the reinforcing member comprises one or more materials selected from the group consisting of woven fabric, nonwoven fabric, natural fibers, synthetic fibers, metallic fibers, carbon fibers, silicon carbide fibers, fiberglass, mineral fibers, polymer fibers, polyethylene terephthalate ("PET"), PBT polyester, phenol-formaldehyde (PF), polyvinyl chloride fiber (PVC), polyolefins (PP and PE), acrylic polyesters, aromatic polyamids (aramids), polytetrafluoroethylene, polyethylene (PE), polyphenylene sulfide ("PPS"), elastomers, and combinations thereof.

7. The method according to any of the preceding claims, wherein the monomer, photoinitiator system, photoinhibitor, and optionally a solvent form a solution.

8. The method according to any of the preceding claims, wherein the first wavelength has a first range within from about 100 nm to about 1400 nm and results in photoinitiation of the photopolymer resin.

9. The method according to any of the preceding claims, wherein the second wavelength has a second range within from about 100 nm to about 1400 nm and results in photoinhibition of the photopolymer resin.

10. The method according to any of the preceding claims, wherein the first range is different from the second range.

11. The method according to any of the preceding claims, wherein the first range and second range at least partially overlap.

12. The method according to any of the preceding claims, wherein the method further comprises a third wavelength, wherein the third wavelength has a third range within from about 100 nm to about 1400 nm and results in photoinhibition of the photopolymer resin.

13. The method according to any of the preceding claims, wherein a viscosity of the photopolymer resin is from about 100 cP to about 2000000 cP.

14. The method o according to any of the preceding claims, further comprising polymerizing the monomer to form a plurality of protuberances to form a resinous framework.

15. The method of claim 14, wherein a first portion of the plurality of protuberances are at a first elevation and wherein a second portion of the plurality of protuberances are at a second elevation, and wherein the first elevation is a greater distance than the second elevation.

16. The method of claim 15, wherein the first and second portions are separated from each other along an X axis and/or a Y axis of the deflection member.

17. The method according to any of claims 1-14, wherein the method further comprises incorporating a photoabsorber comprising one or more materials selected from the group consisting of 2,3,5-t-amyl tetrahydro benzotriazole; benzotriazoles; polymerizable benzotriazoles; benzotriazole substituted in the 5-position of the benzo ring by a thio ether; benzotriazole substituted in the 5-position of the benzo ring by a alkylsulfonyl; benzotriazole substituted in the 5-position of the benzo ring by a phenylsulfonyl moiety; benzotriazole substituted in the 5-position of the benzo ring by an electron withdrawing group; 2-(2-hydroxy-3,5-di-alpha-cumylphenyl)-2H-benzotriazole; 5-chloro-2-(2-hydroxy-3-tert-butyl-5-methylphenyl)-2H-benzotriazole; 5-chloro-2-(2-hydroxy-3,5-di-tert-butylphenyl)-2H-benzotriazole; 2-(2-hydroxy-3,5-di-tert-amylphenyl)-2H-benzotriazole; 2-(2-hydroxy-3-alpha-cumyl-5-tert-octylphenyl)-2H-benzotriazole; 5-trifluoromethyl-2-(2-hydroxy-3-alpha-cumyl-5-tert-octylphenyl)-2H-benzotriazole; mixtures of benzotriazoles; titanium dioxide; yellow dyes; blue dyes; red dyes; green dyes; dyes; non-reactive dyes; food grade dyes; cosmetic dyes; azo dyes; 4-Chloro-7-nitrobenzofurazan; and combinations thereof.

18. The method of claim 17, wherein a first photoabsorber is functional with the first wavelength, and wherein a second photoabsorber is functional with the second wavelength.

19. The method according to any of the preceding claims, wherein the reinforcing member and a radiation source, when producing at least one of the first and second wavelengths, is in movement relative to the other.

20. The method according to any of the preceding claims, wherein the protuberance has a cross-sectional shape having curved sidewalls.

21. The method according to any of the preceding claims, wherein the photopolymer resin is in a vat and wherein the vat and/or the reinforcing member is in movement during the polymerizing step (h).

22. The method according to any of the preceding claims, the method further comprising forming a dead zone between the photopolymer resin and a vat comprising the photopolymer resin.

23. The method according to any of the preceding claims, wherein the protuberance comprises multiple build layers comprising defined seams therebetween.

24. The method according to any of claims 1-22, wherein the protuberance comprises a plurality of continuous undefined layers.

25. The method according to any of the preceding claims, wherein the photopolymer resin further comprises a stabilizer comprising one or more materials selected from the group consisting of antioxidants; co-stabilizers; hindered amines; hindered phenolics; 2,6-di-tert-butylphenol; DTBP; methyl-3-(3,5-di-tert-butyl-4-hydroxyphenyl)-propionate; [Pentaerythrityl-tetrakis (3-(3',5'-di-tert. butyl-4-hydroxyphenyl)-propionate]; Irganox 1010 (BASF); bis(2,4-di-tert.-butyl-6-methylphenyl)-ethyl-phosphite; phosphoric acid, (2,4-di-butyl-6-methylphenyl)ethylester; Irgafos 38 (BASF); flame retardants; thermal stabilizers; N,N'-1,6-hexanediylbis[3,5-bis(1,1-dimethylethyl)-4-hydroxyphenyl-propanamide], Irganox 1098 (BASF); and combinations thereof.

26. The method according to any of the preceding claims, wherein the photopolymer resin further comprises an excipient comprising one or more materials selected from the group consisting of volatile fluids; isoparaffin fluids; oils, mineral oils, metal oxides; fumed metal oxides; colloidal silicas, silicas, silicone dioxide; titanium dioxide; cellulose; nanocellulose; cellulosic nanoparticles; cellulosic nanofibers; bacterial cellulose; calcium sulfate particles; calcium sulfate whiskers; modified calcium sulfate particles; modified calcium sulfate whiskers, and combinations thereof.

27. The method according to any of the preceding claims, wherein the first and second wavelengths are produced by a single radiation source.

28. The method according to any of claims 1-27, wherein the first wavelength is produced by a first radiation source, and the second wavelength is produced by a second radiation source.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application is hereby incorporated herein by reference in its entirety unless expressly excluded or otherwise limited. The citation of any document is not an admission that it is prior art with respect to any example disclosed or claimed herein or that it alone, or in any combination with any other reference or references, teaches, suggests or discloses any such example. Further, to the extent that any meaning or definition of a term in this document conflicts with any meaning or definition of the same term in a document incorporated by reference, the meaning or definition assigned to that term in this document shall govern.

While particular examples of the present disclosure have been illustrated and described, it would be obvious to those skilled in the art that various other changes and modifications can be made without departing from the spirit and scope of the present disclosure. It is therefore intended to cover in the appended Claims all such changes and modifications that are within the scope of this disclosure.

What is claimed is:

1. A method for manufacturing a deflection member, the method comprising the steps of:
   a. incorporating a monomer;
   b. incorporating a photoinitiator system;
   c. incorporating a photoinhibitor;
   d. incorporating a reinforcing member;
   e. combining the monomer, photoinitiator system, and photoinhibitor to form a photopolymer resin;
   f. exposing the photopolymer resin to a first wavelength;
   g. exposing the photopolymer resin to a second wavelength; and
   h. polymerizing the monomer to form a protuberance extending from the reinforcing member.

2. The method of claim 1, wherein the protuberance is locked-on to the reinforcing member.

3. The method of claim 1, wherein the monomer comprises one or more materials selected from the group consisting of di-functional monomers, tri-functional monomers, multi-functional monomers, monomethacrylates, dimethacrylates, trimethacrylates, multi-functional methacrylates, monoacrylates, diacrylates, triacrylates, multi-functional acrylates, epoxy acrylates, acrylate functional polyether polyols, methacrylate functional polyether polyols, acrylate functional polyester polyols, methacrylate functional polyester polyols, acrylate functional polyurethanes, methacrylate functional polyurethanes, prepolymers, oligomers, and combinations thereof.

4. The method of claim 1, wherein the photoinitiator system comprises one or more materials selected from the group consisting of acylphosphine oxides, bis-acyl phospine oxides, camphorquinone, benzophenone, 7-diethylamino-3-thenoylcoumarin, alkyl ethers of benzoin, diphenoxy benzophenone, benzildimethylketal, halogenated functional benzophenones, amino functional benzophenones, benzils, benzimidazoles, 2-hydroxy-2-methylphenol-1-propanone, fluorenone, fluorenone derivatives, 2,2-diethoxyacetophenone, benzoin, 9,10-phenanthrenequinone, anthraquinone derivatives, 2-benzyl-2-N,N-dimethylamino-1-(4-morpholinophenyl)butanone, zanthone, zanthone derivatives, halogenated acetophenone, halogenated acetophenone derivatives, thioxanthone, thioxanthone derivatives, sulfonyl chlorides of aromatic compounds, diacetyl, furil, anisil, 4,4'-dichlorobenzil, 4,4'-dialkoxybenzil, phenylpropanedione, acylphosphine oxides, 2-(dimethylamino)ethyl methacrylate, diphenyliodonium hexafluorophosphate, diphenyliodonium chloride, ethyl-4-(dimethylamino)benzoate, and combinations thereof.

5. The method of claim 1, wherein the photoinhibitor comprises one or more materials selected from the group consisting of 2,2'-bis(2-chlorophenyl)-4,4',5,5'-tetraphenyl-1,2'-biimidazole; hexaarylbiimidazole (HABI); bridged HABI; 2-(2-methoxyphenyl)-1-[2-(2-methoxyphenyl)-4,5-diphenyl-2H-imidazol-2-yl]-4,5-diphenyl-1H-imidazole; 2-(2-ethoxyphenyl)-1-[2-(2-ethoxyphenyl)-4,5-diphenyl-2H-imidazol-2-yl]-4,5-diphenyl-1H-imidazole; 2,2',4-tris-(2-Chlorophenyl)-5-(3,4-dimethoxyphenyl)-4',5'-diphenyl-1,1'-biimidazole; zinc dimethyl dithiocarbamate; zinc diethyl dithiocarbamate; zinc dibutyl dithiocarbamate; nickel dibutyl dithiocarbamate; zinc dibenzyl dithiocarbamate; tetramethylthiuram disulfide; tetraethylthiuram disulfide (TEDS); tetramethylthiuram monosulfide; tetrabenzylthiuram disulfide; tetraisobutylthiuram disulfide; dipentamethylene thiuram hexasulfide; N,N'-dimethyl N,N'-di(4-pyridinyl)thiuram disulfide; 3-Butenyl 2-(dodecylthiocarbonothioylthio)-2-methylpropionate; 4-Cyano-4-Rdodecylsulfanylthiocarbonyesulfanyl]pentanoic acid; 4-Cyano-4-[(dodecylsulfanylthiocarbonyl)sulfanyl]pentanol; Cyanomethyl dodecyl trithiocarbonate; Cyanomethyl [3-(trimethoxysilyl)propyl]trithiocarbonate; 2-Cyano-2-propyl dodecyl trithiocarbonate; S,S-Dibenzyl trithiocarbonate; 2-(Dodecylthiocarbonothioylthio)-2-methylpropionic acid; 2-(Dodecylthiocarbonothioylthio)-2-methylpropionic acid N-hydroxysuccinimide; Benzyl 1H-pyrrole-1-carbodithioate; Cyanomethyl diphenylcarbamodithioate; Cyanomethyl methyl(phenyl)carbamodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1-Succinimidyl-4-cyano-4-[N-methyl-N-(4-pyridyl)carbamothioylthio]pentanoate; Benzyl benzodithioate; Cyanomethyl benzodithioate; 4-Cyano-4-(phenylcarbonothioylthio)pentanoic acid; 4-Cyano-4-(phenylcarbonothioylthio)pentanoic acid N-succinimidyl ester; 2-Cyano-2-propyl benzodithioate; 2-Cyano-2-propyl 4-cyanobenzodithioate; Ethyl 2-(4-methoxyphenylcarbonothioylthio)acetate; 2-Phenyl-2-propyl benzodithioate; Cyanomethyl methyl(4-pyridyl)carbamodithioate; 2-Cyanopropan-2-yl N-methyl-N-(pyridin-4-yl)carbamodithioate; Methyl 2-[methyl(4-pyridinyl)carbamothioylthio]propionate; 1,1'-Bi-1H-imidazole; functional variants of any of the one or more materials; and combinations thereof.

6. The method of claim 1, wherein the reinforcing member comprises one or more materials selected from the group consisting of woven fabric, nonwoven fabric, natural fibers, synthetic fibers, metallic fibers, carbon fibers, silicon carbide fibers, fiberglass, mineral fibers, polymer fibers, polyethylene terephthalate ("PET"), PBT polyester, phenol-formaldehyde (PF), polyvinyl chloride fiber (PVC), polyolefins (PP and PE), acrylic polyesters, aromatic polyamids (aramids), polytetrafluoroethylene, polyethylene (PE), polyphenylene sulfide ("PPS"), elastomers, and combinations thereof.

7. The method of claim 1, wherein the monomer, photoinitiator system, photoinhibitor, and optionally a solvent form a solution.

8. The method of claim 1, wherein the first wavelength has a first range within from about 100 nm to about 1400 nm and results in photoinitiation of the photopolymer resin.

9. The method of claim 1, wherein the second wavelength has a second range within from about 100 nm to about 1400 nm and results in photoinhibition of the photopolymer resin.

10. The method of claim 9, wherein the first range is different from the second range.

11. The method of claim 9, wherein the first range and second range at least partially overlap.

12. The method of claim 1, wherein the method further comprises a third wavelength, wherein the third wavelength has a third range within from about 100 nm to about 1400 nm and results in photoinhibition of the photopolymer resin.

13. The method of claim 1, wherein a viscosity of the photopolymer resin is from about 100 cP to about 2000000 cP.

14. The method of claim 1, further comprising polymerizing the monomer to form a plurality of protuberances to form a resinous framework.

15. The method of claim 14, wherein a first portion of the plurality of protuberances are at a first elevation and wherein a second portion of the plurality of protuberances are at a second elevation, and wherein the first elevation is a greater distance than the second elevation.

16. The method of claim 15, wherein the first and second portions are separated from each other along an X axis and/or a Y axis of the deflection member.

17. The method of claim 1, wherein the method further comprises incorporating a photoabsorber comprising one or more materials selected from the group consisting of 2,3,5-t-amyl tetrahydro benzotriazole; benzotriazoles; polymerizable benzotriazoles; benzotriazole substituted in the 5-position of the benzo ring by a thio ether; benzotriazole substituted in the 5-position of the benzo ring by a alkylsulfonyl; benzotriazole substituted in the 5-position of the benzo ring by a phenylsulfonyl moiety; benzotriazole substituted in the 5-position of the benzo ring by an electron withdrawing group; 2-(2-hydroxy-3,5-di-alpha-cumylphenyl)-2H-benzotriazole; 5-chloro-2-(2-hydroxy-3-tert-butyl-5-methylphenyl)-2H-benzotriazole; 5-chloro-2-(2-hydroxy-3,5-di-tert-butylphenyl)-2H-benzotriazole; 2-(2-hydroxy-3,5-di-tert-amylphenyl)-2H-benzotriazole; 2-(2-hydroxy-3-alpha-cumyl-5-tert-octylphenyl)-2H-benzotriazole; 5-trifluoromethyl-2-(2-hydroxy-3-alpha-cumyl-5-tert-octylphenyl)-2H-benzotriazole; mixtures of benzotriazoles; titanium dioxide; yellow dyes; blue dyes; red dyes; green dyes; dyes; non-reactive dyes; food grade dyes; cosmetic dyes; azo dyes; 4-Chloro-7-nitrobenzofurazan; and combinations thereof.

18. The method of claim 17, wherein a first photoabsorber is functional with the first wavelength, and wherein a second photoabsorber is functional with the second wavelength.

19. The method of claim 1, wherein the reinforcing member and a radiation source, when producing at least one of the first and second wavelengths, is in movement relative to the other.

20. The method of claim 1, wherein the protuberance has a cross-sectional shape having curved sidewalls.

21. The method of claim 1, wherein the photopolymer resin is in a vat and wherein the vat and/or the reinforcing member is in movement during the polymerizing step (h).

22. The method of claim 1, the method further comprising forming a dead zone between the photopolymer resin and a vat comprising the photopolymer resin.

23. The method of claim 1, wherein the protuberance comprises multiple build layers comprising defined seams therebetween.

24. The method of claim 1, wherein the protuberance comprises a plurality of continuous undefined layers.

25. The method of claim 1, wherein the photopolymer resin further comprises a stabilizer comprising one or more materials selected from the group consisting of antioxidants; co-stabilizers; hindered amines; hindered phenolics; 2,6-di-tert-butylphenol; DTBP; methyl-3-(3,5-di-tert-butyl-4-hydroxyphenyl)-propionate; [Pentaerythrityl-tetrakis (3-(3 ', 5 '-di-tert. butyl-4-hydroxyphenyl)-propionate]; Irganox 1010 (BASF); bis(2,4-di-tert.-butyl-6-methylphenyl)-ethyl-phosphite; phosphoric acid, (2,4-di-butyl-6-methylphenyl)ethyl-ester; Irgafos 38 (BASF); flame retardants; thermal stabilizers; N,N'-1,6-hexanediylbis[3,5-bis(1,1-dimethylethyl)-4-hydroxyphenylpropanamide], Irganox 1098 (BASF); and combinations thereof.

26. The method of claim 1, wherein the photopolymer resin further comprises an excipient comprising one or more materials selected from the group consisting of volatile fluids; isoparaffin fluids; oils, mineral oils, metal oxides; fumed metal oxides; colloidal silicas, silicas, silicone dioxide; titanium dioxide; cellulose; nanocellulose; cellulosic nanoparticles; cellulosic nanofibers; bacterial cellulose; calcium sulfate particles; calcium sulfate whiskers; modified calcium sulfate particles; modified calcium sulfate whiskers, and combinations thereof.

27. The method of claim 1, wherein the first and second wavelengths are produced by a single radiation source.

28. The method of claim 1, wherein the first wavelength is produced by a first radiation source, and the second wavelength is produced by a second radiation source.

* * * * *